United States Patent [19]

Hamill, III et al.

[11] 3,878,983

[45] Apr. 22, 1975

[54] SYSTEM FOR NUMERICAL CONTROL OF A MACHINE TOOL

[76] Inventors: Samuel M. Hamill, III, 105 Gilson Rd., Scituate, Mass. 02066; James C. Kilbane, 49A Cedar Rd., Belmont, Mass. 02178

[22] Filed: Oct. 29, 1973

[21] Appl. No.: 410,315

[52] U.S. Cl. ............ 235/151.11; 318/569; 318/574
[51] Int. Cl. ............................................ G06f 15/46
[58] Field of Search ............ 235/151.11; 340/172.5; 318/569, 571, 572, 573, 574; 444/1

[56] References Cited
UNITED STATES PATENTS

| | | | |
|---|---|---|---|
| 3,596,266 | 7/1971 | Slawson et al. | 235/151.11 |
| 3,597,740 | 8/1971 | Daw et al. | 235/151.11 |
| 3,629,560 | 12/1971 | Slawson | 235/151.11 |
| 3,634,662 | 1/1972 | Slawson | 235/151.11 |
| 3,646,419 | 2/1972 | Holy et al. | 235/151.11 |
| 3,763,360 | 10/1973 | Nishimura et al. | 235/151.11 |
| 3,777,128 | 12/1973 | Kirkham | 235/151.11 |
| 3,783,253 | 1/1974 | Anderson et al. | 235/151.11 |

FOREIGN PATENTS OR APPLICATIONS

1,187,378    8/1970    United Kingdom............ 235/151.11

OTHER PUBLICATIONS

Unimation Inc., Industrial Robots Machinery, August 1968, Vol. 74, No. 12, p. 63–67.
Wortzman: A Soft Ware Interpolation Scheme for Direct Numerical Control, Proceedings of the 7th Annual Meeting and Technical Conference of the Numerical Control Society, April 8–10, 1970, Boston, Mass., p. 307–330.

*Primary Examiner*—Felix D. Gruber
*Attorney, Agent, or Firm*—Kenway & Jenney

[57] ABSTRACT

A system in which a machine tool is controlled by a digital computer and an operator to perform a sequence of machining operations. In a programming mode, the machine tool cutting element is positioned by an operator relative to an object to be machined. The relative position of the cutting element is adjusted so that the cutting element passes through a sequence of spatial points at which a subsequent machining operation is desired. In association with each point, a sequence of digital signals is generated in a programming mode in response to an operator directive and that sequence is stored in a digital computer memory. Subsequently, in a machining mode, stored sequence is translated to a machine tool control signal which drives the machine tool. An operator may direct the digital computer in an editing mode to select ones or groups of the stored sequences and to modify those selected sequences. The operator may also direct the computer in the machining mode to generate the corresponding control signals for selected ones or groups of the stored sequences so that the corresponding machining operations are performed.

101 Claims, 6 Drawing Figures

SYSTEM FOR NUMERICAL CONTROL OF A MACHINE TOOL

BACKGROUND OF THE INVENTION

This invention relates to machine tools and more particularly to computer controlled machine tools having an operator-directed editing and control function.

It is well known in the art to provide a machine tool with a controlling device for directing the cutting or milling operations to be performed by that tool. Early systems in this field produced such control by a paper tape program of machine tool instructions. In such systems, a paper tape having perforations in an encoded form is applied to a reading device which transforms the encoded field of perforations into digital signals. These digital signals are subsequently applied to an appropriate driving means to control the relative position of a cutting element with respect to the position of an object to be machined. Such devices, however, provide an extremely limited and inflexible degree of automatic machine tooling due to the difficulty associated with the programming of the device to perform the desired operations. In addition, modifying or editing an established program to provide for minor changes or to accommodate the wear of the edge of the cutting element is not practical.

A further difficulty in programming known machine tool controls is encountered due to the requirement that the programmer define each of the points of relevance, i.e., points where machining operations are to take place, with a high degree of precision. Further developments in the field have produced methods which enabled an accurate specification of machining points. In such systems, a tracing element is directed by an operator to move about a pattern related to the shape of the object to be machined. Rotary encoders in both the $x$ and $y$ directions provide digital signals representative of the points traversed by the tracing element and those signals are converted into a digital code and automatically punched on a papepr tape. As a result, such systems provide an improvement over the earlier art of numerically controlled machine tools. However, such systems continue to be subject to the substantial disadvantages due to the inflexibility of the system wherein portions of a program tape cannot be changed without great difficulty, or reconstructing the entire program commencing with the tracing operation. In addition, there is little or no operator intervention which is possible to provide variations for cutting element wear and the like.

Still further development in the art has resulted in the use of on-line digital computers for controlling the operation of one or more machine tools. In such systems, a general purpose communication link permits the operator of a machine tool to communicate with the data processor to modify the machining operations which the machine tool would otherwise perform under the control of an existing stored program or to add a stored program for a new or partly new operation for subsequent performance by a machine tool. Although such systems represent a substantial improvement in the art compared with the previous systems, there are still substantial disadvantages and consequent limitations associated therewith. While this type of system provides a considerable amount of flexibility derived from operator intervention, there exists the substantial drawback in that the operator must be specially trained to be able to use a programming language and further to operate the computer input/output device at the operator station.

In the art encompassing the operation of computer controlled machine tools, it is well known to use a linear interpolation technique where the cutting element of such a tool is directed to translate relative to the object to be machined along a series of straight line paths. Such systems however lack the required flexibility for the rapid and efficient accomplishment of many machining operations. For example, to direct a cutting element at a first point to approach a second point while avoiding a third point located along the straight line segment connecting the first and second points, the path traveled by the cutting element must be performed in at least straight line segments, i.e., in the piece-wise linear fashion. Each intermediate point at the juncture of the straight line segments must have an associated programmed instruction. Consequently a great number of programming steps are required and a large proportion of the associated memory devices must be allocated to accommodate the many points involved in a simple operation.

Numerically controlled machine tools in the prior art are subject to severe limitations in the positioning of the cutting element due to the backlash associated with the position control means. In such machine tools where the position control backlash is not taken up in a controlled manner, or otherwise accounted for, cutting element position error occurs. It is common in the art to interrupt the succession of machining operations frequently in order to control the current position of the cutting element. This procedure is both time consuming and expensive to implement.

It is further known in the art to incorporate overshoot control methods in the operations of numerical control machine tools. In such systems, the operation of the numerically controlled machine tool is controlled so that a constant deceleration factor is applied to the cutting element as it approaches the desired point for the machining operation. Often in practical situations, where, for example, the distance between a point to be approached and the cutting element is not sufficiently large so that the deceleration factor will offset the cutting element overshoot, a round-about path must be programmed for the cutting element so that the approach to the point is along a path which includes a sufficiently large line segment. As in the case of systems using linear interpolation techniques where the piece-wise linear paths are used, as described above, such overshoot control systems are required to have a substantially large number of intermediate points in the piece-wise linear decelerating approach path. As a result, considerable programmer time is required in addition to having the outstanding requirement of a substantially large capacity memory.

In addition to the above mentioned shortcomings in numerical controlled machine tools in the prior art, it is further required of the operator to generate machine tool instructions for each operation to be performed even where, for example, a simple sequence of machining operations is to be performed at a plurality of locations on a workpiece. Such instructions must be laboriously programmed on an instruction-by-instruction basis by the programmer/operator for each location on the workpiece.

SUMMARY OF THE INVENTION

An object of this invention is to provide a computer controlled machine tool which may be readily programmed by an operator-directed movement of the cutting element relative to the object to be machined through a sequence of spatial points at which a subsequent machining operation is to be performed.

Another object of the invention is to provide a computer controlled machine tool having an automatic backlash take-up control.

Still another object is to provide a computer controlled machine tool having automatic overshoot control.

A further object is to provide a computer controlled machine tool in which the cutter element may selectively approach a desired point by way of a substantially straight line path or a path following a circular arc or a combination thereof.

In accordance with the present invention, an apparatus is provided in which a machine tool may be controlled by a digital computer and an operator to perform a series of machining operations. The present invention may operate in either of two modes: a programming mode (PROGRAM-EDIT) and a machining mode (RUN). In the PROGRAM-EDIT mode, an operator manually positions the machine tool cutting element relative to the object to be machined so that the cutting element passes through a sequence of spatial points at which a subsequent machining operation is desired. Associated with each spatial point is a set of Cartesian coordinates $(x, y, z)$ to reference the distance from an origin point $(0,0,0)$ located on the object to be machined. For each of the successive spatial points the operator produces a set of digital data signals hereinafter referred to as a SEQUENCE, prior to controlling the relative position of the cutting element to approach the next sequential spatial point.

For each of the succession of spatial points, an X-Y SEQUENCE may be generated comprising digital signals which are representative of the Cartesian coordinates $x, y$ corresponding to the respective spatial point. Associated with each X-Y SEQUENCE are additional approach direction digital signals, generated for each spatial point, which are representative of the direction from which the current spatial point was approached by the cutting element during the positioning by the operator, i.e., in a one of the four combinations corresponding to the positive and negative directions along the $x$ and $y$ axes: $+x, +y; +x, -y; -x, +y; -x, -y$. In addition, a signal is generated which is representative of the speed at which the operator desires the cutting element to approach the respective point in a subsequent machining operation.

Alternatively, at a current spatial point, the operator may generate a Z SEQUENCE comprising data signals representative of the z coordinate of the cutting element and the speed at which the operator desires the cutting element to approach the stored $z$ coordinate. In addition, a peck cycle digital signal may also be entered in a SEQUENCE associated with a z coordinate.

Thus in the PROGRAM-EDIT mode, the operator may generate and store a SEQUENCE for a PROGRAM by moving the cutting element to a succession of spatial points and, for each point generating digital signals representative of either (1) an $x, y$ coordinate set, an approach direction and an approach speed for an X-Y SEQUENCE or (2) a coordinate, an approach speed and peck cycle signal for a Z SEQUENCE. A SEQUENCE may be generated by the operator for each of the successive spatial points to which the cutting element is directed. As a part of the programming operation at each point, the operator may activate a SEQUENCE ENTER control to generate a signal which is effective to enter, or store, the corresponding SEQUENCE into the memory of a digital computer, thereby providing a segment of a stored PROGRAM. In the computer, each of the sequentially entered SEQUENCES is assigned a SEQUENCE number which is used in subsequent operations as a reference designation for that SEQUENCE. The computer memory may store a plurality of PROGRAMS, each comprising at least one SEQUENCE.

The operator may also generate PROGRAM and EDIT control signals in the PROGRAM-EDIT mode. These control signals are associated with the various ones of the stored SEQUENCES and provide editing and modification of the stored PROGRAM. The stored PROGRAM may be modified by the operator directly at the times of generation and storage of the various SEQUENCES by generating an appropriate PROGRAM signal prior to activation of the SEQUENCE ENTER control. One such PROGRAM signal is a SEQUENCE DELETE signal, which is stored with the SEQUENCE data in the computer memory. A SEQUENCE DELETE signal will be subsequently identified by the computer in the RUN mode and thereon this SEQUENCE is skipped in the performance of machine tool operations.

A second type of PROGRAM control signal is a PASS signal, which is also stored in the computer memory in association with the selected SEQUENCE. When this signal is identified by the computer in subsequent operations, it indicates to the computer that the machine tool should continue operation with the next SEQUENCE in a program; the lack of a PASS signal associated with a SEQUENCE indicates that the computer should interrupt its continuing processing of the successive segments in a program until the operator intervenes to restart operation.

A third such PROGRAM control signal is an END OF PROGRAM signal. Upon identification of a SEQUENCE having a signal of this type in the RUN mode and completion of the associated operation, the computer reverts to the first SEQUENCE in the PROGRAM.

In the PROGRAM-EDIT mode, the operator may modify a previously stored SEQUENCE by selecting that SEQUENCE to be a "current" SEQUENCE by first setting a manual selection switch to the associated SEQUENCE reference number and then activating a SEQUENCE select control. In response to a SEQUENCE selection, the digital computer withdraws from its memory section and displays to the operator certain of the data signals stored in association with the SEQUENCE. More particularly, the stored data is displayed by means of a first indicator lamp which is illuminated in the case where the selected SEQUENCE is an X-Y SEQUENCE, or a second indicator lamp which is illuminated in the case of a Z SEQUENCE. In addition, indicator lamps are illuminated to respectively indicate to the operator the storage of one or more PROGRAM control signals in association with the SEQUENCE.

The operator may then add one or more PROGRAM control signals to the selected stored SEQUENCE by generating the appropriate PROGRAM control signal followed by activating the SEQUENCE ENTER control.

Also in the PROGRAM-EDIT mode, the operator may generate one of four EDIT control signals to accomplish a further desired modification of the selected SEQUENCE of the stored PROGRAM. These EDIT control signals include the SEQUENCE INSERT, MEMORY ERASE, SEQUENCE CORRECT and CANCEL signals. In response to a SEQUENCE INSERT signal followed by activation of the SEQUENCE ENTER control, the computer inserts in the stored PROGRAM a new X-Y (or Z SEQUENCE) corresponding to the operator generated PROGRAM signals for the current $x$, $y$ (or $z$) coordinates of the cutting element, with associated speed and direction signals (or speed and peck cycle signals). That new SEQUENCE is inserted prior to the current selected SEQUENCE and is assigned the SEQUENCE number formerly associated with the current SEQUENCE. The SEQUENCE numbers associated with the current and all subsequent SEQUENCES are all increased by one to accommodate the inserted SEQUENCE.

In response to an operator generated MEMORY ERASE signal, the current SEQUENCE and all SEQUENCES which follow the current SEQUENCE in the stored succession of SEQUENCES are removed from the computer memory.

A SEQUENCE CORRECT signal applied, and followed by activation of the SEQUENCE ENTER control, directs the computer to change the stored data in an X-Y (or Z) SEQUENCE in the computer memory to be representative of the $x$, $y$ (or $z$) coordinates, selected speed, and direction (or peck cycle) signals of the current coordinates of the cutting element and the corresponding parameters as indicated by the operator generated control and PROGRAM signals.

The generation of the fourth type of EDIT control signal, the CANCEL signal, following the selection of a SEQUENCE as a current SEQUENCE and the activation of the SEQUENCE ENTER control effectively removes any of the above described PROGRAM signals from the selected SEQUENCE as stored in the computer memory. The CANCEL signal does not affect the $x$, $y$ (or $z$) coordinate, selected speed and direction (or $z$) coordinate, selected speed and direction (or peck cycle) data stored with the SEQUENCE.

The operator may also program to be a TOOL OFFSET SEQUENCE. A TOOL OFFSET SEQUENCE includes a correction factor in the $x$, $y$ coordinates of the cutting element path between two spatial points to offset wear of the cutting edge during machining operations. This feature permits the operator to modify a portion of the cutting element path by storing a relatively simple data signal in conjunction with the already programmed SEQUENCE, rather than reprogramming the two entire SEQUENCES which define the endpoints of the path to be modified. Such reprogramming would involve accurately positioning the cutting element to be modified endpoints. When the TOOL OFFSET SEQUENCE is subsequently performed in the RUN mode, the cutting element is directed to follow the modified path.

The operator may also in the PROGRAM-EDIT mode, direct the computer to select a program from a conventional-type perforated plastic or paper tape and store the associated SEQUENCES in the memory for subsequent use in directing the machine tool in the RUN mode. After such storage, the SEQUENCES may be readily modified in the PROGRAM-EDIT mode (following selection by the operator) by using the above described EDIT control signals. Alternatively, the operator may direct the central processing unit to generate a punched tape from the SEQUENCES stored in the memory.

Thus, in the PROGRAM-EDIT mode the operator may first program the digital computer to perform a series of machining operations by providing relative movement of the cutting element through a succession of spatial points corresponding to points at which subsequent machining operations are desired. The operator may generate appropriate X-Y (or Z) SEQUENCES of data signals corresponding to the desired machining operation at each point. Coincident with, or subsequent to, the generation of these SEQUENCES the operator may select various ones of the X-Y (or Z) SEQUENCES and modify the instructions stored in association therewith. Further, SEQUENCES may be added to the program stored in the computer memory. These added SEQUENCES may be added so that they are interleaved with the stored succession of SEQUENCES. In addition, selected SEQUENCES may be deleted from the succession in the program. All these operations are performed in the PROGRAM-EDIT mode of operation.

In addition to the above described operator-directed programming and editing operations, the operator may in the PROGRAM-EDIT mode direct the computer to add further SEQUENCES to the stored program using a REPEAT SEQUENCE control. Using the REPEAT SEQUENCE control in the PROGRAM-EDIT mode, an operator may readily program the computer to direct the machine tool to perform an identical series of machining operations at a plurality of locations on a workpiece. The operator first programs the series of operations at a first location on the workpiece and then re-positions the cutting element to a second location on the workpiece and activates the REPEAT SEQUENCE control. In response to the latter steps, the computer selects the SEQUENCES of the stored program (for the first location on the workpiece) in the computer memory then modifies the $x$, $y$ and $z$ coordinate values associated with each selected SEQUENCE of that existing program to reflect a second location and finally adds the modified versions of the selected SEQUENCES to the existing stored program.

In the second mode, RUN mode, the operator may direct the digital computer to provide appropriate control signals to the positioning table and cutting element of a machine tool, or similar elements thereof, so that the programmed machining operations are performed. In this RUN mode, the central processing unit commences with the SEQUENCE selected by the operator via a manual selection switch and continues to sequentially process the successive SEQUENCES until either a SEQUENCE is reached having an END-OF-PROGRAM signal stored in association therewith, or a sequence is reached having no PASS signal stored in association therewith. (The PASS control signal indicates whether or not the associated SEQUENCE is to be performed followed by a direct and automatic continuation with the next higher referenced numbered SEQUENCE having no associated SEQUENCE DELETE signal). The detection of an END-OF-PROGRAM signal causes the computer to next process the first SEQUENCE in the PROGRAM, rather than the next successive SEQUENCE (which may be a part of another PROGRAM). At all times the operator may discontinue the operations performed by the digital computer by generating an appropriate STOP control signal from the operator console.

In producing control signals to direct the relative movement of the cutting element for X-Y SEQUENCES, the computer controls the stepping motors in accordance with the operator-programmed speed and direction until the cutting element is a predetermined distance from the spatial point associated with each SEQUENCE. For the remainder of the positioning operation, the computer produces control signals which control the approach speed so that the overshoot of the spatial point is minimal. To do so, the computer decelerates the positioning table in the final approach to the spatial point of each SEQUENCE.

A further RUN mode operator control permits the operator to insert a BACKLASH control signal to indicate to the computer whether an anti-backlash sub-program is to be applied throughout the program during the subsequent positioning of the cutting element in the RUN mode. When the anti-backlash sub-program is selected, the computer generates machine tool control signals in the RUN mode which direct the cutting element along a path which will automatically control the direction of the computer-directed cutting element movement as that element approaches each programmed spatial point. In this manner, the backlash in the positioning stepping motors, clutch assemblies, lead screw and machine ways may be taken-up in a desired direction (i.e., in accordance with the data generated by the operator-directed movement in the PROGRAM-EDIT mode). When the BACKLASH control is activated in association with the various SEQUENCES in the RUN mode, the central processing unit is effective to determine the direction of approach to be followed by the cutting element for each X-Y SEQUENCE. The computer then determines from the current position of the cutting element and the $x, y$ coordinate data for the current SEQUENCE, whether a straight line path connecting those points would require the cutting element to approach the spatial point while traveling in accordance with the stored approach direction of signals. If so, the computer directs the cutting element along that path.

In cases where the previously performed SEQUENCE (or where the current position of the cutting element as adjusted by the operator manually) is such that the programmed direction ordinarily could not be followed using a straight line path, i.e., where it is not possible for the cutting element to proceed in a straight line in the required direction from the $x, y$ coordinates of the previous SEQUENCE to the $x, y$ coordinates of the current SEQUENCE, the computer first generates appropriate control signals to direct the relative position of the cutting element to an intermediate spatial point which lies along a straight line in the programmed direction a predetermined distance from the $x, y$ coordinates of the point associated with the current SEQUENCE. The coordinates of the intermediate point are selected by the computer so that movement along the straight line path from the intermediate point to the current point requires travel to a predetermined distance by the cutting element in the programmed direction of approach along the $x$ and $y$ axes. Then the computer generates appropriate control signals to direct the cutting element to approach the current SEQUENCE point along such a path. Thus, in the RUN mode, the anti-backlash sub-program directs the computer to control the relative position of the cutting element so that the cutting element is positioned first to an intermediate point and then to the point associated with the SEQUENCE along a programmed direction and, in this manner, take up the backlash in the cutting element and positioning table stepping motors, clutch assemblies, and lead screws in a desired direction.

The above description relates to straight line relative motions of the cutting element. In addition, a one of a family of circular approach paths for cutter element relative motion may also be selected by the operator for use in conjunction with the above referenced operations. To select such an approach path for either a new or modified X-Y SEQUENCE, the operator, in the PROGRAM-EDIT mode, generates a CIRCULAR INTERPOLATION SELECT control signal for storage in the computer memory associated with the X-Y SEQUENCE. In addition, the operator generates a CENTER CIRCLE control signal, a RADIUS control signal, a CLOCKWISE/COUNTERCLOCKWISE PATH (CW/CCW) SELECTION control signals. These signals are stored in association with the X-Y SEQUENCE in response to the SEQUENCE ENTER signal generated by the operator. In the RUN mode, the computer produces control signals for a CIRCULAR INTERPOLATION SEQUENCE which directs the relative motion of the cutting element in approaching the programmed spatial point to be along a curved path having the programmed center, radius and clockwise or counterclockwise direction. The operator may "unprogram" a circular interpolation SEQUENCE in the PROGRAM-EDIT mode using the above-described CANCEL control, i.e., in a manner similar to removing a PASS signal stored with a SEQUENCE.

In accordance with the present invention, the operator may independently program both X-Y SEQUENCES and Z SEQUENCES in the PROGRAM-EDIT mode. As described above, a program is normally generated by positioning the cutting element through a succession of points about a workpiece. The performance of program SEQUENCES in the RUN mode in the order of their generation would not require the computer to process more than one SEQUENCE at a time. However, even though in the present invention, the various X-Y and Z SEQUENCES are independently programmed, the machining operations specified by the X-Y and Z SEQUENCES are interrelated because the cutting element remains at a $x, y$ or $z$ coordinate position until repositioned by a subsequent SEQUENCE, thereby implicitly specifying a $z$ coordinate for each X-Y SEQUENCE and an $x, y$ coordinate set for each Z SEQUENCE. In addition, the operator may select for performance any one of the stored X-Y and Z SEQUENCES forming a program regardless of the current $x, y$ or current $z$ position of the cutting element relative to the object being machined so that the positioning of the cutting element to the $x, y, z$ coordinates of the selected SEQUENCE might cause the cutting element to interferingly engage the workpiece, and cause damage to either. To accommodate the X-Y and Z SE- QUENCES interrelationship and to eliminate the possibility of damage during repositioning, the X–Y SEQUENCES and Z SEQUENCES are interlaced in the RUN mode by the CPU.

This interlacing of X–Y SEQUENCES with Z SEQUENCES may be understood from the following description. If in the RUN mode, the operator selects a Z SEQUENCE from a plurality of SEQUENCES forming a program, then the central processing unit is effective to first generate the appropriate control signals to first retract the cutting element to a reference z coordinate beyond the work-piece and then to position the cutting element at the $x$ and $y$ coordinates of the first X–Y SEQUENCE preceding the currently selected Z SEQUENCE in the program stored in the computer memory. Thereafter, the Z SEQUENCE operation is performed. Thus, the selected Z SEQUENCE is associated with the preceding X–Y SEQUENCE, or, in other words, the $x$, $y$ coordinate set from the previous X–Y SEQUENCE is used in the performance of the selected Z SEQUENCE.

Similarly, if a X–Y SEQUENCE is selected in the RUN mode by the operator, the cutting element is retracted to a reference $z$ coordinate after which the cutting element is positioned to the $x$ and $y$ coordinates of the selected X–Y SEQUENCE. Then the cutting element is repositioned to the $z$ coordinates of the first Z SEQUENCE prior to the selected X–Y SEQUENCE. Thus, the cutting tool is automatically retracted to a reference position so that the cutting element cannot interferingly engage with the workpiece during the positioning operation.

In addition to the above operations, the operator may use the X–Y MIRROR FUNCTION control in the RUN mode to readily and with little effort direct the computer to perform a series of machining operations at workpiece locations symmetrically disposed about a reference axis positions the workpiece so that the reference axis coincides with either the $x$ or $y$ axis. The operator then programs (or uses a previously stored PROGRAM for) a series of operations on a first side of a reference axis of symmetry. The operator then switches the system to the RUN mode and appropriately activates the mirror control. In response, the computer then selects the current stored program SEQUENCE and substitutes new $x$, $y$ coordinate values (having the same absolute values but with the appropriate signs) in that SEQUENCE. As a result the computer directs the cutting element to perform the same operations defined by the previously stored PROGRAM but at a location symmetrically disposed about the reference axis.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
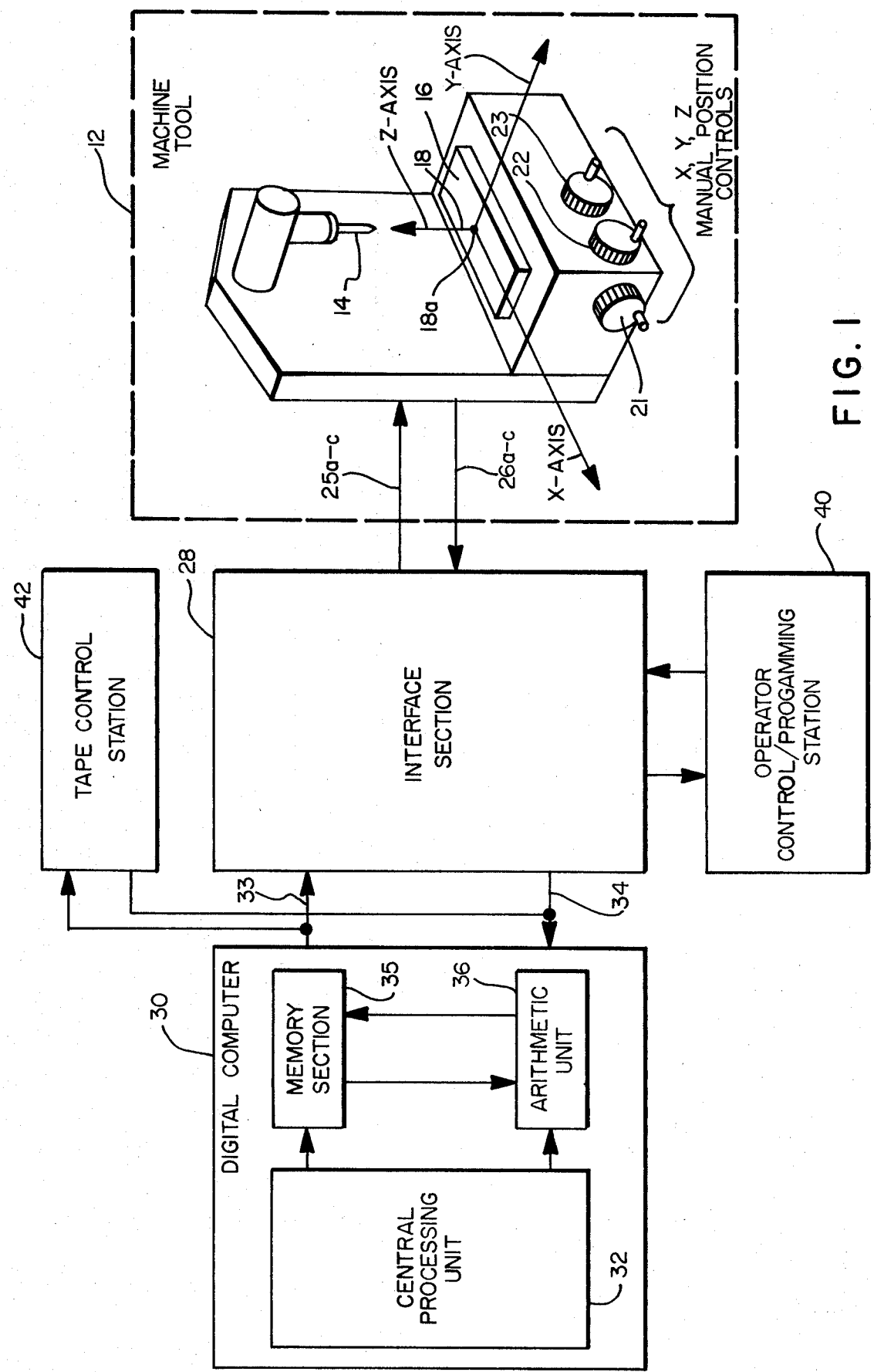
FIG. 1 shows in block diagram form a numerically controlled machine tool system in accordance with the present invention.

A computer controlled machine tool system is shown in FIG. 1. The system includes a machine tool 12, a digital computer 30, an operator control/programming station 40, a tape control station 42 and an interface section 28 interconnecting each of these sub-systems.

The machine tool 12 in the presently described embodiment is shown having a cutting element 14 and a workpiece positioning table 16 for supporting an object to be machined. In other embodiments, the machine tool may have the form of a lathe, milling machine or grinding machine. For reference purposes, a set of Cartesian coordinate axes 18 is shown having an origin point 18a located at a point on the top surface of table 16. The axes 18 are disposed so that the top surface of positioning table 16 lies in the plane defined by the $x$ and $y$ axes.

Manual position controls 21 and 22 may be used by an operator to manually position the positioning table 16 so that a reference point of that table may lie at an operator-selected $x$, $y$ coordinate point. Manual position control 23 may be operated to position cutting element 14 along a path in the vertical direction. Thus the relative position of cutting element 14 to the reference point 18a on table 16 may be manually adjusted by an operator using controls 21–23. In addition, tool 12 includes means, such as rotary encoders, for generating cutter position signals, indicative of the coordinates of the cutting element 14 in relation to the reference point 18a of table 16. These coordinates define the points which are hereinafter referred to as the spatial points through which cutting element 14 is moved, i.e., by the motion of element 14 relative to table 16.

The machine tool 12 also includes three stepper motors (not shown in FIG. 1): one stepper-motor for driving table 16 in the $x$ direction in response to control signals on line 25a, one stepper-motor for driving table 16 in the y direction in response to control signals on line 25b and one for positioning cutting element 14 along a path in the z direction in response to control signals applied via line 25c. Machine tool 12 further has $x$, $y$, z servo-control lines 26a–c for transferring the cutting element position signals from rotary encoders in tool 12 to interface section 28.

The computer 30 may be one of many general purpose digital computers known in the art and generally may be described as having a central processing unit 32, a memory section 35 and an arithmetic unit 36. A typical computer which may be selected for the present invention is model D-112, manufactured by Digital Computer Controls, Inc. Alternatively, a PDP-8/L manufactured by Digital Equipment Corporation, may be used. Briefly, the computer 30 is interconnected to interface section 28 via lines 33 and 34. Line 34 provides a 12 bit parallel data input connection to the accumulator in arithmetic unit 36 (denoted ACI 0–11). Line 33 provides a 12 bit parallel data output connection from the accumulator (denoted ACO 0–11). Line 33 also provides a computer command signal connection from the 12 bit memory buffer portion of memory section 35. Included are parallel input/output transfer pulse connections (denoted IOP 1, 2, 4) for the transfer pulses generated by computer 30 from bits 0-2 and 9-11 of the computer memory buffer. Also included in line 33 are parallel device selection bit connections (denoted BMB 3-8) for the device selection signals transferred directly from bits 3-8 of the memory buffer. A more detailed description of the programming and functioning of computer 30 is provided below.

The operator control/programming station 40 provides for operator direction of the system in either of two modes, PROGRAM-EDIT or RUN. In the PROGRAM-EDIT mode, the operator directs the computer 30 to store one or more programs, each comprising a plurality of digital data SEQUENCES. From these programs, machine tool 12 control signals may be generated. In the RUN mode, computer 30, together with interface section 28, automatically generates such control signals and applies those signals to tool 12, whereupon the tool performs the corresponding machining operation.

In the RUN mode, the operator may select one of two sub-modes, STOP and CYCLE. In the STOP sub-mode the system is in a standby state awaiting an operator control signal. In the CYCLE sub-mode, computer 30 continuously processes stored SEQUENCES to perform the programmed instructions without operator intervention until a particular PROGRAM is ended or a STOP signal is generated by the computer 30.

In operation, an operator may secure an object to be machined upon positioning table 16 of the machine tool. Thereafter, the operator may manually position table 16 and cutting element 14 by way of controls 21, 22, and 23 so that the cutting element passes through a succession of spatial points having desired coordinates as measured with respect to the Cartesian coordinate system 18.

In the PROGRAM-EDIT mode at each of the spatial points, the operator may generate a program instruction, generally comprising a sequence of data signals, hereinafter referred to as a SEQUENCE, wherein each SEQUENCE comprises a set of digital signals. The digital signals are generated at the operator control/programming station 40 by means of a plurality of switches. In response to an operator generated SEQUENCE ENTER signal, the data signals (forming a SEQUENCE) so generated are transferred to digital computer 30 where they are stored under the direction of computer 30 in the memory section 35.

Subsequently, the operator may switch the system to operate in the RUN mode. In this latter mode, the operator may select a starting SEQUENCE (corresponding to a one of the cutting element position spatial points in the above described succession). The operator may then direct computer 30 to the CYCLE sub-mode. Computer 30 is effective in the CYCLE sub-mode to sequentially process the SEQUENCES stored in memory section 35, commencing with the initial "current" SEQUENCE selected by the operator. Computer 30 together with interface section 28 sequentially converts the respective ones of the stored SEQUENCES into a corresponding succession of control signals, which signals are then applied to machine tool 12. In response, machine tool 12 performs the machining operations indicated by the stored SEQUENCES.

Throughout this operation, an operator may freely interrupt from station 40 the performance in the RUN mode, and he may switch to the PROGRAM-EDIT mode and either revise, add, or delete SEQUENCES in accordance with possible new requirements, or to provide corrections of earlier program errors. The operator may then switch back to the RUN mode and select a starting SEQUENCE and continue the machining operation in the CYCLE sub-mode. In this manner, the operator has a full range of flexibility to provide on-line control of the computer-directed machining operations.

In addition, the operator may direct the computer 30 to generate at tape control station 42 a perforated tape version of the programmed SEQUENCES which are stored by computer 30. This tape may be then applied at a later time to the computer 30. In the RUN mode, the operator may direct the machine tool to perform the particular machining operation defined by the tape in the PROGRAM-EDIT mode or he may modify the SEQUENCES entered from the tape.

A more detailed description of the blocks in FIG. 1 now follows. Machine tool 12 may be in the form of a lathe, drill press, or milling machine or other similar device which has a cutting element and a workpiece positioning element, each of which may be manually positioned along one or more axes of a Cartesian coordinate system and also may be automatically positioned along such an axis system by stepper-motors controlled by an external signal generator. By way of example, machine tool 12 may be a Series I Bridgeport miller having a Sigma series 20 stepper motor for driving each axis, and Trump-Ross Trim-step encoders for producing position signals.

In the machine tool 12 of FIG. 1, a milling machine is shown having a cutting element 14 which may be positioned along the vertical direction (parallel to the z-axis) and a positioning table 16 which provides a surface with a reference coordinate point 18a which may be translated in the plane formed by the x and y axes. Position controls 21, 22, and 23 represent manual controls for independently moving table 16 in the x direction, moving table 16 in the y direction, and moving cutting element 14 in the z direction, respectively. The x, y, and z servo-control signals for the stepper-motors are in pulse form and are applied to machine tool 12 via lines 25a–c. The associated stepper-motors and clutch assemblies for automatically moving these elements are not shown in FIG. 1.

Machine tool 12 also has a set of rotary encoders for generating three cutting element displacement indicating signals, indicating the relative x, y, and z displacements of the cutting element 14 from the reference point 18a. The cutting element displacement signals are applied by the position encoders of tool 12 to lines 26a–c. The latter signals are in suitable form so that the magnitude and direction of incremental changes in position of the cutting element 14 with respect to the respective axes may be determined. In the present exemplary embodiment, a two channel square wave signal is produced for each axis to indicate a constant rate of change in position along that axis. In this exemplary signal, the first channel square wave is displaced in time to lead the second channel square wave for a change in position in a first (or positive) direction along an axis. The first square wave lags the second square wave for a change in position in a second (negative) direction.

The period of the two signals is representative of the magnitude of the rate of change in position.

Figure 2:
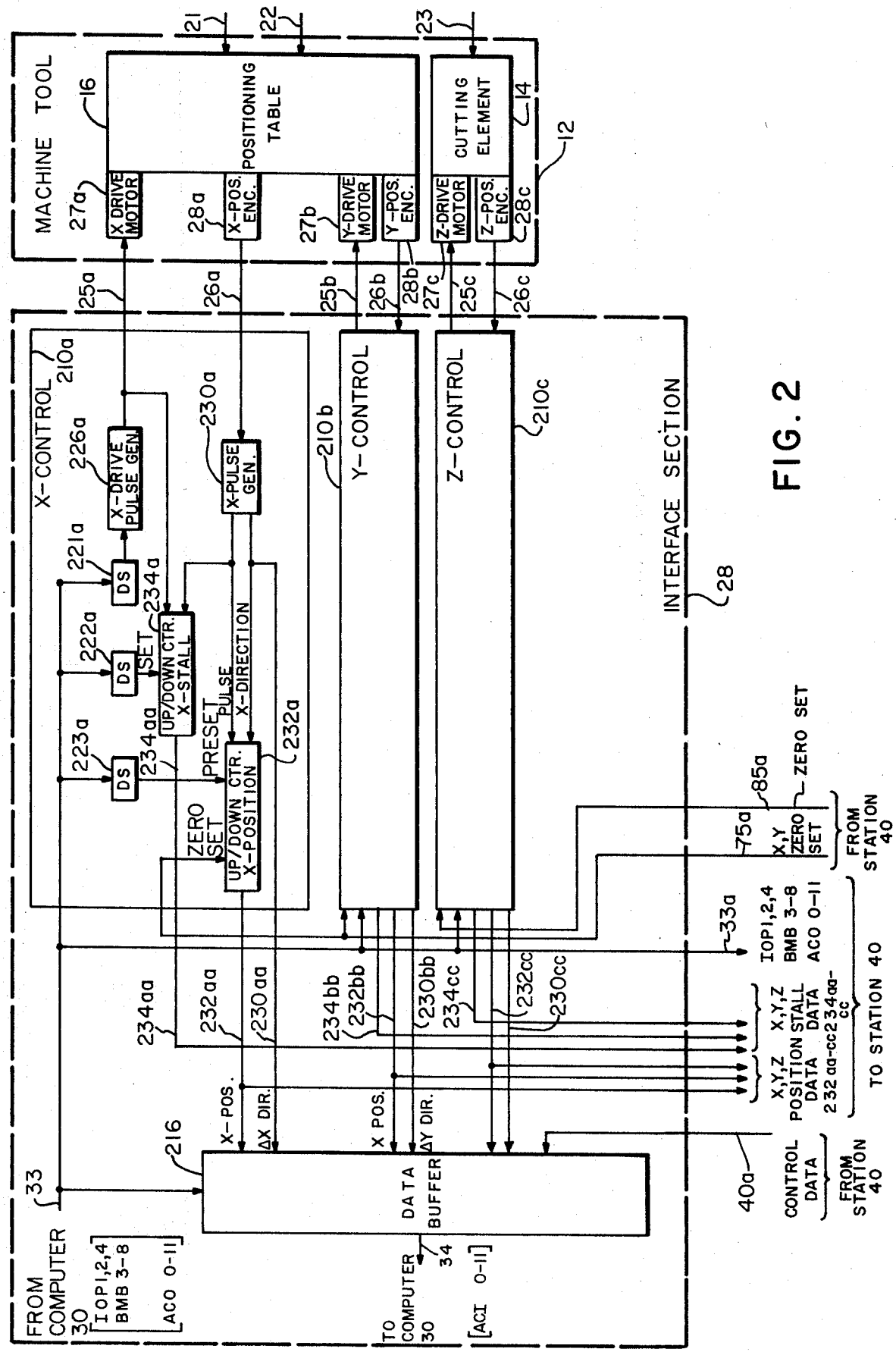
FIG. 2 shows in block diagram form the machine tool and interface section of FIG. 1.

In FIG. 2 machine tool 12 is shown in block diagram form having positioning table 16, cutting element 14, manual position controls 21-23, drive stepping-motors 27a-c, and position encoders 28a-c. Also shown in FIG. 2 is interface section 28 having $x$-control section 210a, $y$-control section 210b, $z$-control section 210c, and data buffer 216. Controls 210a-c are identical and so only $x$-control 210a is shown in detail in FIG. 2 and described herein.

As described above, the respective ones of lines 25a-c and 26a-c interconnect the appropriate position drive motors and position encoders to the corresponding control sections of interface section 28. In addition, interface section 28 has input and output connections 33 and 34 to computer 30.

X-control 210a includes four device selectors 221a-224a, $x$-drive pulse generator 226a, $x$-position pulse generator 230a, up/down counter ($x$-position) 232a and up/down counter ($x$-stall) 234a. The device selectors 221a-223a are connected in an appropriate manner to decode the computer command signals which appear on line 33 and to appropriately apply enabling control signals to the connected devices 226a, 232a, and 234a. The particular circuit configuration and use of such device selectors is well known in the art and is fully described in the PDP-8/L Users Handbook published by Digital Equipment Corporation.

In the RUN mode, computer 30 may generate and apply an appropriate command signal on line 33 to direct movement of positioning table in the $x$ direction. This signal is decoded be device selector 221a which in turn activates $x$ drive pulse generator 226a. A pulse signal is generated in response thereto by $x$ drive pulse generator 226a. This signal is applied via line 25a to $x$ drive motor 27a which responds by incrementing positioning table 16 a signal unit in the $x$ direction. The change-indicating position signals produced in response thereto by $x$ position encoder 28a are applied by line 26a to $x$ position pulse generator 230a. The output of generator 230a includes both a pulse signal indicating that positioning table 16 has moved one increment in the $x$ direction and a direction signal indicative of the sign (either plus or minus) of the motion. These signals are applied to up/down counter 232a to increment the count state of that counter in the up direction for a positive direction signal or in the down direction for a negative direction signal. Counter 232a maintains a cumulative count of all changes in the $x$ direction of positioning table 16. Thus, the output of counter 232a provides an actual cutting element position signal.

In accordance with its program, as described below, the computer directs a burst of incremental movements which are sufficient to direct cutting element 14 to the desired point and then applies an appropriate computer command signal on line 33, to interrogate counter 232a. In response thereto, the computer input/output transfer pulse IOP 4 is effective to enable data buffer 216 to transfer a signal representative of the counter 232a count state via line 232aa, data buffer 216 and line 34 to the accumulator of computer 30. This computer interrogation of counter 232a is thus performed only on command and not following each incremental movement. In other embodiments, the computer may monitor counter 232a following each incremental movement.

The output pulse signal from generator 226a and the output pulse signal from generator 230a are applied respectively to the up and down count inputs of the $x$-stall up/down counter 234a. This counter is used to provide the operator with an indication as to whether the computer commanded movements are appropriately being followed by machine tool 12. In addition, the direction signal produced by generator 230a is applied via line 230aa to data buffer 216 where that information may be transferred to computer 30 by the application of an appropriate command signal on line 33.

In operation, at an initial reference time, computer 30 generates an appropriate command signal to cause device selector 222a to set counter 234a to a predetermined state. Then, if the number of drive pulses produced by generator 226a is sufficiently close to the number of response pulses produced by generator 230a, i.e., so that there is no over or underflow of counter 234a, then no output signal is provided from that counter. However, if counter 234a reaches either an overflow or underflow state because of a failure of machine tool 12 to track the commands provided by computer 30 on line 33, a control signal is generated by counter 234a and applied via line 234aa to operate control/programming station 40 where, as described below, a STALL warning lamp is illuminated to apprise the operator of this condition and the system enters the STOP sub-mode.

Thus, for example, if the moving elements of machine tool 12 are prevented from reaching their computer-directed positions along any axes by some obstruction, then the operator is apprised of this situation by the STALL lamp at station 40. It will be understood that $y$- and $z$-controls 210b and 210c operate in a similar manner to that described for $x$ control 210a for computer directed movements in the $y$ and $z$ directions.

The series of command signals which are applied by computer 30 to line 33 are produced in accordance with the main program stored in memory section 34 of that computer at a uniform clock rate. Briefly, the main program provides a path determining means which treats X-Y SEQUENCES and Z SEQUENCES separately. For Z SEQUENCES, the program directs computer 30 to activate Z control 210c to move cutting element 14 directly in a series of $z$ moves to the associated $z$ coordinate in a straight line. For X-Y SEQUENCES, to determine the relative motion of cutting element 14 between two spatial points, in the X-Y plane, computer 30 performs an algorithm which produces the "best straight line" between those points. (It will be noted here that the performance of X-Y and Z SEQUENCES in the RUN mode are related, as described more fully below in conjunction with the X-Y SEQUENCE CONTROL and Z SEQUENCE CONTROL of operator station 40). In the X-Y plane, there are generally two sets of moves which may be generated by the computer: "major moves" and "minor moves." A minor move comprises a simultaneous movement in both the x and y directions. A $x$-major or $y$-major move comprises a single increment in the corresponding $x$ or $y$ direction. The algorithm programmed into the computer generates the appropriate command signals so that the "best line" is followed and the cutting element 14 is never more than a single minor move for the straight line connecting the two points. In addition, the speed of the cutting element is controlled by the computer by interleaving zero moves with the above described $z$, $x$- major, y-major and minor moves. In response to a computer directed zero move, the cutting element relative position is unchanged. Further, in generating the appropriate control signal the computer also accommodates the stepping motor limitations in starting speed and stopping speed by combining the "best straight line" computation with a ramping function. This is accomplished by limiting the drive pulse rate (using zero moves) at the initial portion of a move to a SEQUENCE point so that the resultant computer commanded moves are not faster than the stepping motor acceleration response speed. As described above, the computer 30 generates a sequence of command signals on line 33 which is sufficient to direct cutting element 14 to the desired point. At the time when the computer expects the cutting element 14 to be a predetermined distance from the desired point, the pulse rate is appropriately decreased to match the stepping motor braking response speed.

In addition, the path determining means provided by the main program of computer 30 also determines the path which cutting element 14 is to follow in accordance with the stored circular interpolation, tool offset, and backlash take-up data signals, as described below.

In the above manner, the computer performs the positioning algorithm and determines the sequence of command signals which are required to move the cutting element 14 to the appropriately programmed point. The computer then applies those command signals to line 33. Following the last of these command signals, computer 30 generates and transfers on line 33 a further command signal which is decoded by data buffer 26 to effectively interrogate the up/down position counters 232a–c in the x, y, and z controls 210a–c. The computer then determines from this position data whether the desired spatial point has been reached. If so, then the computer advances to the next SEQUENCE. If the desired spatial point has not been reached, then the algorithm is repeated to determine a new "best straight line" from the current point to the desired point. (Of course, if one of the moving elements of machine tool 12 has been prevented from movement along one or more of the x, y and z axes such that the stall counter 234a (or its equivalent in the y and z controls 210b and c) is in an over or underflow state, then the stall lamp will be illuminated at operator station 40 and the system enters the STOP sub-mode).

The operator can identify the reference point 18a of the coordinate axes set 18 by generating an appropriate control signal at station 40 on line 75a which directly resets the x-position counter 232a to its zero state. (Similarly, the corresponding counters in controls 210b and c may be set to zero by generating the appropriate signals on lines 75a and 85a). As a further feature upon restart operations following power shutdown at the machine tool 12, the computer 30 generates the appropriate command signal which is decoded by device selector 223a to preset x position counter 232a to a count state representative of the position stored in the computer 30 from the operation prior to the power shutdown.

Tape control station 42 may be any one of many standard tape punching and reading devices known in the art. When appropriately activated by computer 30, station 42 is effective to produce a tape (either magnetic or paper) having an encoded version of the stored SEQUENCE data signals. The tape may be subsequently used to program computer 30 for operating machine tool 12. Alternatively, computer 30 may activate station 42 to read a pre-punched tape having such encoded SEQUENCE data signals and transfer those signals for storage in memory section 35. The stored sequence data signals may be subsequently modified and then transformed, or directly transformed, into control signals for directing the movement of cutting element 14 of machine tool 12.

Operator control station 40 receives input signals from computer 30 by way of line 33, interface section 28, and line 33a. Line 33a provides parallel input lines for buffer memory bits 3–8 (BMB 3–8), input/output transfer pulses (IOP 1, 2, 4) and then 12 bit accumulator data word (ACO 0–11). In addition, station 40 receives x, y, z position and stall data from lines 232aa–cc and 234aa–cc, respectively. Control data is transferred from station 40 to the accumulator of computer 30 by way of line 40a to data buffer 216 of section 28, and then by way of line 34 to computer 30. Zero set lines 75a and 85a are also connected to section 28 from station 40.

Figure 3:
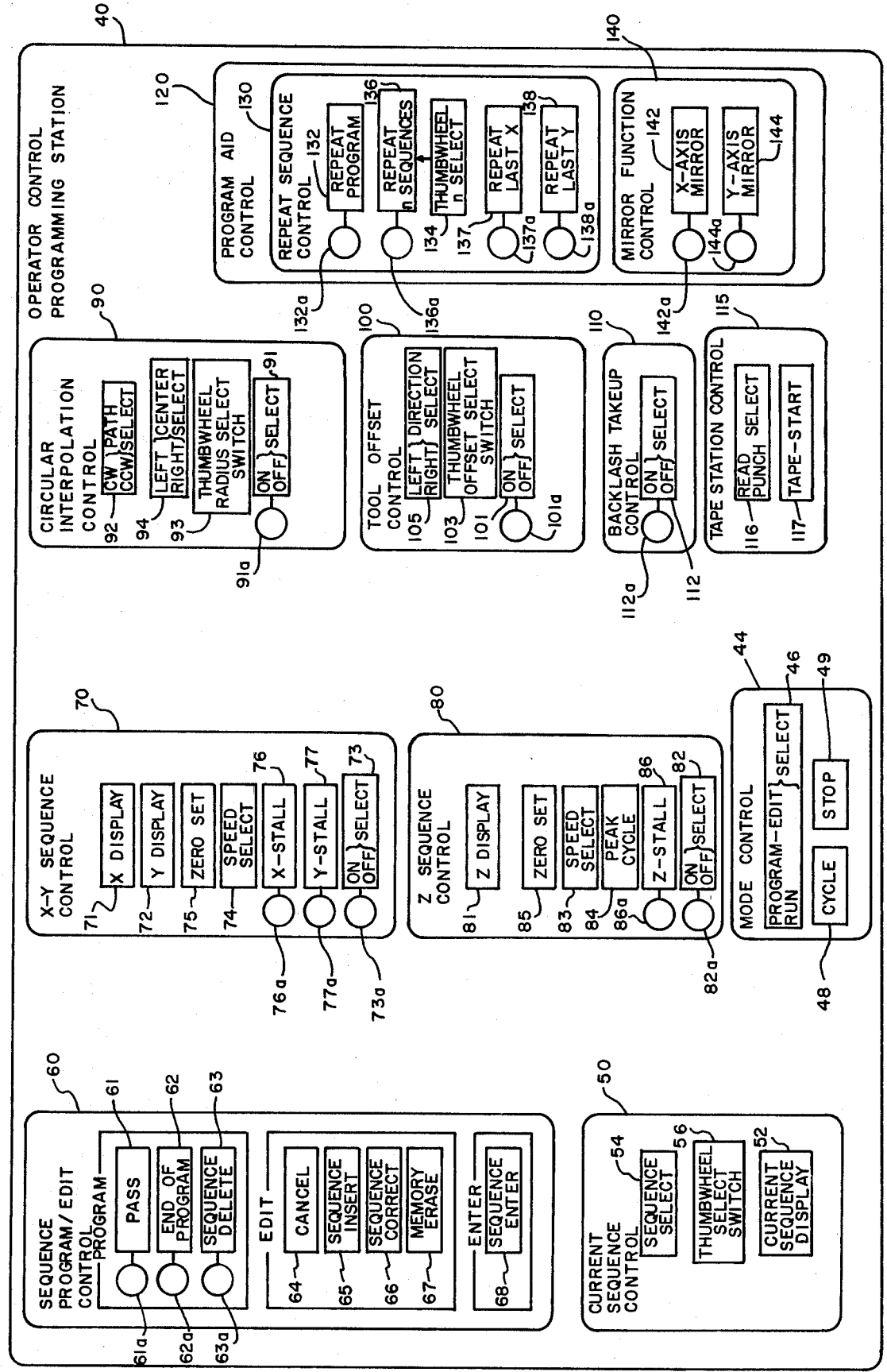
FIG. 3 shows a plan view of an operator control panel for use with the operator control/programming station of FIG. 1.

The control console for operator control/programming station 40 is shown in detailed form in FIG. 3. An operator may generate a program to instruct computer 30 to subsequently perform a sequence of machining operations, from this station 40 and in conjunction with manual controls 21, 22, and 23 of machine tool 12. The operator may direct computer 30 to perform one of the following operations: (1) generate and/or modify a program or portions thereof for storage in the memory section 35 of the computer (for later translation by computer 30 into control signals for machine tool 12); (2) produce a paper or magnetic tape having encoded thereon a sequence of data signals (for later translation by computer 30 into control signals for machine tool 12); and (3) provide on-line machining operation by generating appropriate control signals for machine tool 12.

Station 40 is divided in FIG. 3 to show the control signal generating devices in a functional grouping. The groupings include MODE control 44, CURRENT SEQUENCE control 50, SEQUENCE PROGRAM-EDIT control 60, X-Y SEQUENCE control 70, Z SEQUENCE control 80, CIRCULAR INTERPOLATION control 90, TOOL OFFSET control 100, BACKLASH control 110, TAPE STATION control 115, and PROGRAMMING AID control 120. Each grouping is described in detail below. The blocks having circular regions connected thereto are provided with an indicator lamp which is responsive to a control signal from computer 30 and from the switch in the associated block.

It will be understood that the electronic circuitry included in each block shown in FIG. 3 belongs to one of three classes. In all three classes, the circuits are comprised of well known circuit elements including: integrated circuits (flipflops, shift registers, counters, and logic gates), resistors, capacitors, pushbutton and thumbwheel switches, indicator lamps and display devices. These devices are configured in a well known manner to perform the hereafter described functional operations. More particularly, the computer 30 interface circuits are configured in accordance with the exemplary circuits shown in the Digital Equipment Corporation's PDP-8/L Users Handbook.

In the first class, block 52 is a decode and display device which transforms signals applied from the accumulator of computer 30 upon an appropriate command signal from line 33a to provide a decimal display indicative of the current SEQUENCE number (for block 52). Blocks 71, 72, and 81 are decode and display devices which transform signals applied directly thereto from x, y and z counters 232a–c into a visual decimal display.

The second class includes all blocks excepting SEQUENCE ENTER 68, CYCLE 48, STOP 49, SEQUENCE SELECT 54, MEMORY ERASE 67, X-, Y-, and Z-STALL 76, 77, and 78 and TAPE START 117. The blocks in this second class all include a single or multiple bit data register which may be loaded in response to signals generated by operator controlled pushbutton (or thumbwheel) switches at station 40 or by signals applied from the accumulator of computer 30 following an appropriately decoded computer command signal applied by line 33a. Each of these registers may be cleared by an operator-pushbutton generated CANCEL signal or by an appropriate computer command signal. The data outputs of each register in this second class is applied by way of line 40a to data buffer 216 for transfer on command to the accumulator of computer 30. Where appropriate, the register outputs are also connected by way of lamp driving circuits to indicator lamps.

The remaining blocks, i.e., blocks 48, 49, 54, 67, 68, 76, 77, 86 and 117 include single bit data registers which are loaded by a corresponding pushbutton switch (blocks 48, 49, 54, 67, 68, and 117) or by stall data on lines 234aa–cc (blocks 76, 77, and 86). These registers provide input/output device flags for the computer 30 and are interconnected to the computer program interrupt and skip facility. Thus the computer 30 continually checks the status of these flag registers and, in response the detection of the loading thereof, interrupts its normal processing to enter the data stored in the registers (via line 40a, data buffer 216 and line 34) and to perform the appropriate sub-routine called for by the flag when so provided for in the computer program.

At this point, it will be assumed that all of the blocks shown in FIG. 3 have the appropriate switches, data registers, decoding and logic networks, and the interconnecting signal lines to accomplish the functional description that follows.

To briefly outline the procedure by which an operator may generate and modify a stored program from station 40, it will be assumed that initially the operator sets MODE control 44 to the PROGRAM-EDIT mode. The operator then directs the cutting element 14 to a desired spatial point by means of manual position controls 21–23, and may establish that point as the reference point 18a for subsequent operations by activating zero set controls in X-Y SEQUENCE control 70 and Z SEQUENCE control 80. The operator continues by adjusting manual position controls 21–23 so that the cutting element 14 is positioned at a spatial point where a subsequent machining operation is desired. The x, y coordinates and the z coordinates of this point are displayed to the operator by display devices located in X-Y SEQUENCE control 70 and Z SEQUENCE control 80, respectively.

Following the positioning of cutting element 14, the operator then activates either (1) an on/off switch and a speed selection switch in X-Y SEQUENCE control 70 (for producing an X-Y SEQUENCE) or (2) an on/-off switch, a speed selection switch and a peak cycle switch in Z SEQUENCE control 80 (for producing a Z SEQUENCE). He next activates desired ones of the three PROGRAM controls in SEQUENCE PROGRAM-EDIT control 60 (PASS control 61, END OF PROGRAM control 62, and SEQUENCE DELETE control 63), the on/off, circular path, center, and radius switches in CIRCULAR INTERPOLATION control 90 (if the SEQUENCE is an X-Y SEQUENCE and the operator desires a circular approach path), and the on/ff, offset amount, and direction data switches in TOOL OFFSET control 100 (if tool offset is desired for the SEQUENCE).

Following the setting of the data switches for the various controls, the operator activates a SEQUENCE ENTER switch in SEQUENCE PROGRAM-EDIT control 60. The signal produced in response thereto directs computer 30 to store the data signals generated by the various data switches at a location in memory 35 allocated for the current SEQUENCE. In addition, x, y (or z) coordinate position signals and direction of approach control signals (as determined by computer 30 from the position-indicating signals on line 34 from lines 232aa–cc and 234aa–cc of interface unit 28) are also stored in memory 35 with the current SEQUENCE data.

The operator then may repeat the above procedure to generate and store a SEQUENCE for a next spatial point in order to provide a next SEQUENCE in a program. Alternatively, the operator may switch to the RUN mode and select the just programmed SEQUENCE using CURRENT SEQUENCE control 50 and thereby direct computer 30 to perform the machining operation specified by the stored data in the sequence.

The operator may at some later time select the programmed SEQUENCE using CURRENT SEQUENCE control 50 with mode control 40 in the PROGRAM-EDIT mode. He may then prepare to modify, or delete that SEQUENCE or add a subsequent SEQUENCE by activating the appropriate ones of the appropriate switches in X-Y SEQUENCE control 70, Z SEQUENCE control 80, CIRCULAR INTERPOLATION control 90 and TOOL OFFSET control 100. The selected SEQUENCE is modified, deleted or the new SEQUENCE added in, from, or to memory 35, respectively by activating the appropriate one of the four EDIT controls followed by the SEQUENCE ENTER control of SEQUENCE PROGRAM-EDIT control 60.

The various controls of operator control/programming station 40 and their functions will now be described in detail.

MODE CONTROL

The MODE control 44 has two mode selection switches. The first, PROGRAM-EDIT/RUN select 46, is used by the operator to determine the mode of station 40 to be in either the PROGRAM-EDIT or RUN mode. In the PROGRAM-EDIT mode, as described in detail below, the operator may generate program SEQUENCES which are to be subsequently converted by computer 30 into control signals for machine tool 12. In this mode, the operator may also modify or delete already stored program SEQUENCES. In the RUN mode, computer 30 is effective to generate the appropriate control signals for machine tool 12 corresponding to the data stored in a current selected program SEQUENCE.

When the computer is switched to the PROGRAM-EDIT mode by select 46, computer 30 automatically advances to the next numbered SEQUENCE following the entry of a new or modified SEQUENCE into memory 35 by activation of SEQUENCE ENTER 68. When the CYCLE control 48 is activated in the RUN mode, computer 30 sequentially processes successive ones of the stored program SEQUENCES to generate the corresponding tool 12 control signals. Additionally, in both the PROGRAM-EDIT and RUn modes, computer 30 successively displays certain stored SEQUENCE data to the operator as described in detail below. Following activation of STOP control 49 in the RUN mode, computer 30 enters the STOP sub-mode and awaits the next operator-activation of CYCLE control 48. The STOP sub-mode may be entered in response to the activation of STOP control 49 by the operator, or may be activated automatically by computer 30 following detection of a SEQUENCE having no associated PASS signal as described below.

CURRENT SEQUENCE CONTROL

As described above, in the PROGRAM-EDIT mode, the operator may generate or modify a stored program SEQUENCE while in the RUN mode machining operations defined by the data associated with the stored program SEQUENCES may be performed. In either mode, CURRENT SEQUENCE control 50 may be activated by the operator. This control includes a current SEQUENCE display 52, a SEQUENCE select 54, and a manual SEQUENCE select switch 56.

During operation in both the PROGRAM-EDIT and RUN, display 52 responds to the appropriate computer command signal applied via line 33a to decode and display the reference number applied from the accumulator of computer which is associated with the program SEQUENCE currently being processed by the computer 30. Computer 30 advances automatically from a current SEQUENCE to process the next numbered SEQUENCE following entry of a new or modified SEQUENCE (in the PROGRAM-EDIT mode) or following performance of a SEQUENCE (in the RUN mode). Following activation of STOP control 49, the operator may select the first unprogrammed SEQUENCE to be programmed (in the PROGRAM-EDIT mode), or he may select a particular SEQUENCE from those already comprising the program to be modified (in the PROGRAM-EDIT mode), or to be performed (in the RUN mode) by adjusting manual select switch 56 to the associated reference number. The operator then directs that computer 30 advance to that SEQUENCE, i.e., change the current SEQUENCE to the selected SEQUENCE, by operating the SEQUENCE select 54. In the RUN mode, when the CYCLE control 48 is next activated by the operator, computer 30 will move the cutting element as directed by the selected SEQUENCE in the RUN mode and continue with the next numbered SEQUENCE following the selected SEQUENCE, unless directed to the STOP sub-mode by the activation of the STOP control 49 by the operator or the current selected SEQUENCE.

SEQUENCE PROGRAM-EDIT CONTROL

The SEQUENCE PROGRAM-EDIT control 60 includes three PROGRAM controls 61–63, four EDIT controls 64–67 and a SEQUENCE ENTER control 68. Each of controls 61–67 includes a two position switch which provides a digital signal representative of the state of the switch to computer 30 in response to activation of the SEQUENCE ENTER control 68 by the operator.

Following the advance by computer 30 to a selected current program SEQUENCE (selected via CURRENT SEQUENCE control 50, or automatically by computer 30) which the operator desires to program or to either modify or delete, or to which the operator desires to add a prior programmed SEQUENCE, the operator may select the PROGRAM-EDIT mode via select control 46. The operator is then apprised of certain portions of the stored data from the current SEQUENCE by way of the indicator lamps 61a–63a of SEQUENCE program-edit control 60 and the indicator lamps 73a, 82a, 91a, 101a, and 112a of the remaining controls at station 40. More particularly, the indicator lamps 61a–63a indicate to the operator the data stored in the current selected SEQUENCE in the memory section 34 associated with the PROGRAM controls, i.e., the PASS control 61, END-OF-PROGRAM control 62, and SEQUENCE DELETE control 63.

If, in the current SEQUENCE, a PASS signal is stored in memory 35, the indicator lamp 61a will turn on. A stored PASS signal indicates that, for subsequent operation in the RUN mode and CYCLE sub-mode, computer 30 will automatically continue to the next SEQUENCE following completion of the current SEQUENCE. A SEQUENCE having no PASS signal stored therewith will be identified by computer 30 in the RUN mode and in turn will direct the system to enter the STOP sub-mode. However, the operator may activate the PASS control 61 in the RUN mode while the computer is currently positioning cutting element 14 during performance of a SEQUENCE which may have no PASS signal associated therewith. In this case, upon completion of the SEQUENCE, computer notes the activation of PASS control 61 and continues in the CYCLE sub-mode to the next SEQUENCE following the current SEQUENCE, i.e., as if a PASS signal had been stored with the current SEQUENCE, and is, in effect, a temporary override control operation.

If, in the current SEQUENCE, an END-OF-PROGRAM signal is stored, the indicator lamp 62a will turn on, indicating that the current SEQUENCE marks the end of a stored program. During subsequent operation in the RUN mode, computer 30 will identify the END-OF-PROGRAM signal and automatically select the first SEQUENCE in the program as the current SEQUENCE. If the current SEQUENCE includes a SEQUENCE DELETE signal the lamp 63a will be illuminated. During subsequent operation in the RUN mode, computer 30 will identify the SEQUENCE DELETE signal and respond thereto by skipping the machining operation specified by the SEQUENCE. The SEQUENCE data will remain in the computer memory 32.

Additional indicator lamps at station 40 further apprise the operator of the current SEQUENCE stored data associated with the X-Y SEQUENCE control 70 (lamp 73a), Z SEQUENCE control 80 (lamp 82a), CIRCULAR INTERPOLATION control 90 (lamp 91a), TOOL OFFSET control 100 (lamp 101a), and BACKLASH control 110 (lamp 112a). These latter controls are discussed in more detail below. However, each of those controls includes an ON/OFF SELECT control having the corresponding one of the above cited indicator lamps illuminated in the PROGRAM-EDIT mode to indicate to the operator when data from the associated control is stored in the current SEQUENCE.

Once the operator is informed of the stored data associated with the current SEQUENCE, he may either add a new SEQUENCE to follow the stored program or he may modify the stored SEQUENCE using the EDIT controls in the following manner.

To add a new SEQUENCE to follow the last already programmed SEQUENCE, the operator may first position cutting element 14 to the desired $x$, $y$, and $z$ coordinates by manual controls 21–23, and then activate any of the PASS, END-OF-PROGRAM, or SEQUENCE DELETE controls 61–63, as desired, and activate any of the data switches associated with controls 70, 80, 90, and 100, as desired to generate the data for the new SEQUENCE. After then activating the SEQUENCE ENTER control 68, the new SEQUENCE data is stored in the appropriate location in memory 35. This data includes $x$, $y$, and $z$ coordinate data from position counters 232$a$–$c$, direction of approach data from pulse generators 230$a$–$c$, and any X–Y or Z SEQUENCE data as determined by the operator by way of controls 60, 70, 80, 90, and 100. All position, direction and SEQUENCE data is entered into the accumulator of arithmetic unit 36 by way of data buffer 216 and line 34 in response to the appropriate computer command signal applied of line 33.

To modify a current SEQUENCE, the operator may first activate the CANCEL control 64 and then SEQUENCE ENTER 68. This results in all data signals stored in memory 35 with this SEQUENCE, except the $x$, $y$, $z$ coordinate data and approach direction and speed data being deleted from the memory. In addition, the corresponding ones of operator indicator lamps 61$a$–63$a$, 91$a$ and 101$a$ are extinguished. The operator may then activate, any of the PROGRAM controls 61–63 and data switches associated with controls 70, 80, 90, and 100 to generate data from the modified SEQUENCE. The newly generated data is then stored in memory 35 following activation of SEQUENCE ENTER 68. Alternatively, the operator may modify all the data of a selected SEQUENCE, including the $x$, $y$ (and $z$) coordinate and direction data, by first activating the CANCEL control 64 and then manually repositioning cutting element 14 to the desired spatial point (either by manual controls 21–23 or automatically in the RUN mode). The operator then activates any of the PASS, END-OF-PROGRAM or SEQUENCE DELETE controls 61–63, as desired, and activates any of the data switches associated with controls 70, 80, 90, and 100, as desired to generate the data for the modified SEQUENCE. After activating the SEQUENCE CORRECT control 66 and finally SEQUENCE ENTER 68, the modified data (including new $x$, $y$ and $z$ coordinate data and direction of approach data) is stored as a SEQUENCE by computer 30 in the appropriate location in memory 35.

The operator may also activate the CANCEL control 64 in the RUN mode during the positioning of element 14 for a current SEQUENCE. In response thereto, computer 30 ignores the presence of any PASS or END-OF-PROGRAM data stored with the current SEQUENCE, i.e., the computer processes the SEQUENCE as if no such signals were stored therewith, and is, in effect, a temporary override control operation.

To insert a SEQUENCE between two existing SEQUENCES of a program, the operator directs computer 30 to the PROGRAM-EDIT mode using MODE control 44 and selects the second of the existing SEQUENCES using CURRENT SEQUENCE control 50. He then positions the cutting element 14 to the desired SEQUENCE in the same manner that a new SEQUENCE would be generated. The operator then activates SEQUENCE INSERT control 65 followed by SEQUENCE ENTER 68. In response thereto, computer 30 stores the new SEQUENCE with an appropriate reference number so that the SEQUENCE is in the desired order in the stored program i.e., between the two existing SEQUENCES. The SEQUENCE number of the second and all subsequent SEQUENCES are incremented by one. The new SEQUENCE is associated with the SEQUENCE number formerly associated with the second of the two existing SEQUENCES.

In order to erase from the computer memory all SEQUENCES beyond a selected SEQUENCE in a stored succession of SEQUENCES, the operator first directs the computer 30 to the PROGRAM-EDIT mode using MODE control 44 and selects as current SEQUENCE the first SEQUENCE to be removed. He then activates the MEMORY ERASE control 67 in response to which the computer 30 removes the current SEQUENCE and all following stored SEQUENCES from memory 35.

Thus in the PROGRAM-EDIT mode the operator may construct new stored program SEQUENCES or modify or delete existing ones through the use of the controls 61–68 in conjunction with the associated controls discussed below.

X-Y SEQUENCE CONTROL

The X–Y SEQUENCE control 70 informs the operator at all times of the current $x$ and $y$ coordinates of the relative displacement of the cutting element 14 from the reference point 18$a$ on the positioning table 16. In particular, X-Display 71 and Y-Display 72 decode the x and y position data applied by way of lines 232$aa$ and $bb$ and display these coordinate values in decimal form.

The $x$ and $y$ coordinates of the origin reference point 18$a$ may be separately defined for computer 30 at an initial time by means of the ZERO SET control 75. To do so, the operator activates the appropriate portion of control 75 which in turn applies a suitable pulse signal by way of line 75$a$ to set the $x$-, $y$-, or both position counters 232$a$ and $b$ to their zero count state. In all subsequent processing, computer 30 will perform the appropriate translation to transform the various coordinates with respect with the new origin point.

Following the advance by computer 30 to a selected SEQUENCE in the PROGRAM-EDIT mode, the indicator lamp 73$a$ associated with ON/OFF SELECT 73 will be illuminated if the selected SEQUENCE is an X–Y SEQUENCE. The operator may then prepare to enter a new X–Y SEQUENCE or to modify the selected X–Y SEQUENCE by manually adjusting the position of the cutting element 14 via controls 21 and 22 to a desired spatial point. The position-indicating signals from x- and y- encoders 28$a$ and $b$ are transformed by x- and y- pulse generators 230$a$ and $b$ to include data signals representative of the direction at which the spatial point was approached. In this embodiment, the approach direction signals may indicate one of four possible approaches, i.e., +x, +y; +x, −y; −x, +y; −x, −y. (Subsequently in the RUN mode, the computer will determine the path of cutting element 14 in terms of "major" and "minor" move signals described above in conjunction with the computer "best straight line" algorithm.) The operator may select a speed of approach from a range allowed by SPEED select switch 74. SPEED select 74 produces a coded data signal in its register which is to be stored with the SEQUENCE data in memory section 34 along with the x, y and z coordinate and direction data.

Following the manual positioning of cutting element 14 and the setting of the speed select controls in X–Y SEQUENCE control 70, in conjunction with any of the PROGRAM controls of control 60, described above, and possibly of controls 90 and 100 as described below, the operator may store the newly generated X–Y SEQUENCE by activating the SEQUENCE ENTER control 68, or he may modify the current X–Y SEQUENCE data by activating a one of the EDIT controls 64–67 followed by SEQUENCE ENTER control 68.

During the RUN mode, computer 30 generates the appropriate control signals to direct stepping motors 27a and 27b to control the relative speed and direction of element 14 to be in accordance with the programmed values until the cutting element 14 is within a predetermined distance from the spatial point associated with the SEQUENCE. For the remainder of the approach of element 14 to the spatial point, in accordance with the computer algorithm, computer 30 generates the appropriate command signals to decelerate element 14 in a series of steps so that the final step is achieved while keeping overshoot to a minimal level.

In the presently described embodiment, the machining operations specified by the X–Y SEQUENCES are interrelated in the RUN mode with the Z SEQUENCES (which are programmed as described below). The cutting element 14 remains at the x, y, and z coordinate position following the processing of a SEQUENCE in the RUN mode until repositioned by the processing of a subsequent SEQUENCE in the RUN mode (unless manually repositioned by the operator), thereby implicitly specifying a z coordinate for each X–Y SEQUENCE and an x, y coordinate pair for each Z SEQUENCE. Therefore, in order to permit an operator to select a single X–Y SEQUENCE from a program for operation in the RUN mode, computer 30 determines the z coordinate for the operation from the first Z SEQUENCE preceding the current X–Y SEQUENCE. In addition, when the current SEQUENCE is an X–Y SEQUENCE, computer 30 first generates control signals to direct cutting element 14 to retract to a reference z coordinate before directing element 14 to the x, y coordinate pair associated with the current SEQUENCE. The cutting element 14 is positioned to the x, y coordinates associated with the current X–Y SEQUENCE. Finally, the element 14 is positioned to the z coordinate associated with the first previous Z SEQUENCE in the stored program (relative to the current SEQUENCE), rather than remaining at the z coordinate where any previous operations may have directed that element. The automatic retraction during the positioning operation enables an operator to select an X–Y SEQUENCE out of order in a program and insuring that the cutter element 14 will not interferingly engage with the object to be machined during the required positioning operation. In addition, the interlacing of the z coordinate data from the next previous Z SEQUENCE with the current X–Y SEQUENCE data permits the independent generation of X–Y SEQUENCES and Z SEQUENCES, thereby reducing the operator complexity.

In an alternative embodiment, there may be no interlace between the X–Y and Z SEQUENCES. In such an embodiment, following the operator selection of an X–Y SEQUENCE as a current SEQUENCE, the computer 30 repositions the cutting element to the x, y coordinates associated with the current SEQUENCE but maintains the cutting element at the same Z coordinate (i.e., no retraction to a reference z coordinate followed by repositioning to an implicitly defined Z coordinate).

If the positioning table 16 is prevented from reaching its computer directed position in the x or y axis by more than the predetermined amount allowed by stall counters 234a–b, then the stall data signal on one or more of lines 234aa–bb is effective to energize the corresponding lamp drivers which comprise X-STALL 76 and Y-STALL 77 and the associated indicator lamps 76a and 77a.

Z SEQUENCE CONTROL

The Z SEQUENCE control 80 is used by the operator in the PROGRAM-EDIT mode to program and modify Z SEQUENCES. In a manner similar to displays 71 and 72 of the X–Y SEQUENCE control 70, Z DISPLAY 81 provides a decimal display apprising the operator of the z coordinate of the relative position of the cutting element 14.

The z coordinate of the origin reference point 18a may be defined for computer 30 at an initial time by means of the ZERO SET control 85. To do so, the operator activates control 85 which in turn applies a pulse signal by way of line 85a to set z-position counter 232c to its zero count state. In all subsequent processing, computer 30 will perform the appropriate translation to transform the various coordinates with respect with the new origin point.

Following the advance of computer 30 to a selected current SEQUENCE in the PROGRAM-EDIT mode, the indicator lamp 82a associated with the ON/OFF SELECT control 82 will be illuminated if the selected sequence is a Z SEQUENCE. The operator may then prepare to enter a new Z SEQUENCE or modify the selected current Z SEQUENCE by adjusting the position of the cutting element 14 via manual control 23 to the desired spatial point. The direction portion of the position-indicating signal as generated by x- pulse generator 230c in interface unit 28 is applied to computer 30 in response to the appropriate computer command signal on line 33. The operator may also select the speed of approach by generating a coded speed data signal by means of speed select 83 from a range offered by that control.

In addition, the operator may program, via PECK CYCLE control 84, a peck cycle operation which is to be followed by the cutting element 14 in the subsequent performance of the Z SEQUENCE in the RUN mode. The PECK CYCLE control 84 generates a coded data signal to direct computer to select from a range of options which may be selected by the operator. In a first of the PECK CYCLE selection options, the cutting element 14 is controlled by computer 30 in the RUN mode to approach the stored z coordinate associated with the current Z SEQUENCE from the z coordinate associated with the previous Z SEQUENCE in a single increment. The approach is performed at the speed selected by the operator via SPEED SELECT 83.

From the remaining selection options offered by PECK CYCLE control 84, the operator may select a PECK CYCLE for a SEQUENCE in which the cutting element 14 is controlled by computer 30 in the RUN mode to approach the z coordinate associated with the current Z SEQUENCE in a series of incremental approach movements alternated with a series of retraction movements. The number of incremental approach movements is determined by the computer 30 in response to the operator-selected PECK CYCLE signal generated by PECK CYCLE control 84. During each incremental approach movement, the cutting element is advanced toward the associated z coordinate at the speed selected by the operator via SPEED SELECT 83. In an alternative embodiment, the cutting element may advance toward the z coordinate during each incremental approach movement at a predetermined speed until reaching an intermediate point lying a predetermined distance from the end of each incremental path and at the selected speed thereafter. Following each incremental approach to the z coordinate, the cutting element 14 is retracted at a predetermined speed to the z coordinate associated with the previous Z SEQUENCE. In this manner, a machine tool such as a drill press may provide for alternate periods of retraction of the drilling element between incremental advances, thereby allowing drilling chips removal.

Following the positioning of cutting element 14 and the setting of the speed select control 83 and the PECK CYCLE control 84 in conjunction with any of the PROGRAM controls of control 60, as described above, the operator may store the newly generated Z SEQUENCE by activating the SEQUENCE ENTER control 68, or he may modify the current Z SEQUENCE data by activating a one of the EDIT controls 64–67 followed by SEQUENCE ENTER 68.

In the presently described embodiment, as with the X–Y SEQUENCES, the Z SEQUENCES are interlaced by computer 30 with the X–Y SEQUENCES during operation in the RUN mode so that when a Z SEQUENCE is selected from a succession of SEQUENCES by an operator, computer 30 first selects the $x$, $y$ coordinates associated with the first previous X–Y SEQUENCE and those coordinate points are used in conjunction with the z coordinate of the current Z SEQUENCE. In addition, the cutting element is retracted to a reference z coordinate (to clear the workpiece) prior to the translation to the implicitly defined $x$, $y$ coordinates associated with the current Z SEQUENCE. In this manner, as with control 70, the operator may select a single Z SEQUENCE from a program without regard for the interfering action of the cutting element with the object to be machined.

In an alternative embodiment, there may be no interlace between the X–Y and Z SEQUENCES. In such an embodiment, a selected Z SEQUENCE is performed at the current $x$, $y$ coordinates of the cutting element.

The Z-STALL block 86 includes a lampdriver (for lamp 86a) which is responsive to the appropriate signal on line 232cc which is indicative of either an overflow or underflow of the Z-STALL counter 232c, i.e., indicating that the desired z position (as directed by computer 30) has not been reached and that the actual position difference exceeds a predetermined value.

CIRCULAR INTERPOLATION CONTROL

The X—Y SEQUENCES are generally processed by computer 30 in the RUN mode so that the relative cutting element 14 position is changed in straight-line increments in the $x$–$y$ plane in accordance with the stored approach direction data signals associated with an X–Y SEQUENCE, as indicated above. However, in the PROGRAM-EDIT mode the operator may use CIRCULAR INTERPOLATION control 90 to generate a SEQUENCE which will in the RUN mode direct the cutting element 14 to approach the associated $x$, $y$ coordinates using a one of a family of circular paths. To generate such a circular interpolation SEQUENCE in the PROGRAM-EDIT mode, ON/OFF SELECT control 91 is activated by the operator during the original operation of the SEQUENCE, (using SEQUENCE ENTER 68 or SEQUENCE INSERT 65 followed by SEQUENCE ENTER 68) or during the modification to an already programmed SEQUENCE (using SEQUENCE CORRECT 66 followed by SEQUENCE ENTER 68).

To generate the circular interpolation data for the specification of the direction of approach to be clockwise or counterclockwise along the selected circular path, the operator appropriately activates the CW/CCW PATH SELECT control 92. In addition, the operator further determines the circular path by generating a desired radius signal through the setting of manual radius select switch 93. In addition, the operator completes the specification of the path by selecting the center of the circle via the left/right center select control 94. Center select 94 is used to determine whether the center of the circle is located to the left or the right of the chord between the current $x$, $y$ coordinates and the $x$, $y$ coordinates associated with the previous X–Y SEQUENCE, where the left and right directions are determined with respect to the starting point of the chord, i.e., the $x$, $y$ coordinates from the previous X–Y SEQUENCE. The right center select position of switch 94 indicates that the center is to the right of the chord when viewed from the starting point of that chord. The circular interpolation data is then stored with the X–Y SEQUENCE data (as generated by controls 60, 70, and 100) by activating the SEQUENCE ENTER control 68 (for the generation of a new SEQUENCE at the following of the last SEQUENCE of a program), or by activating SEQUENCE INSERT 65 followed by SEQUENCE ENTER 68, (for generation of a new SEQUENCE between two already programmed SEQUENCES), or by activating SEQUENCE CORRECT 66 followed by SEQUENCE ENTER 68 (for modifying an existing SEQUENCE).

As described above in conjunction with PROGRAM-EDIT control 60, the operator may modify a circular interpolation SEQUENCE to transform that SEQUENCE to a linear interpolation SEQUENCE (which specifies a straight line approach path) by selecting the SEQUENCE in question (using control 50 in the PROGRAM-EDIT mode) and activating CANCEL 64 followed by SEQUENCE ENTER 68.

In the RUN mode, computer 30 examines the circular interpolation data stored in association with a current X–Y SEQUENCE and compares the current relative position of the cutting element 14 to the stored $x$, $y$ coordinates of the X–Y SEQUENCE preceding the current X–Y SEQUENCE having associated circular interpolation data. Computer 30 then generates the appropriate control signals for tool 12.

Figure 4:
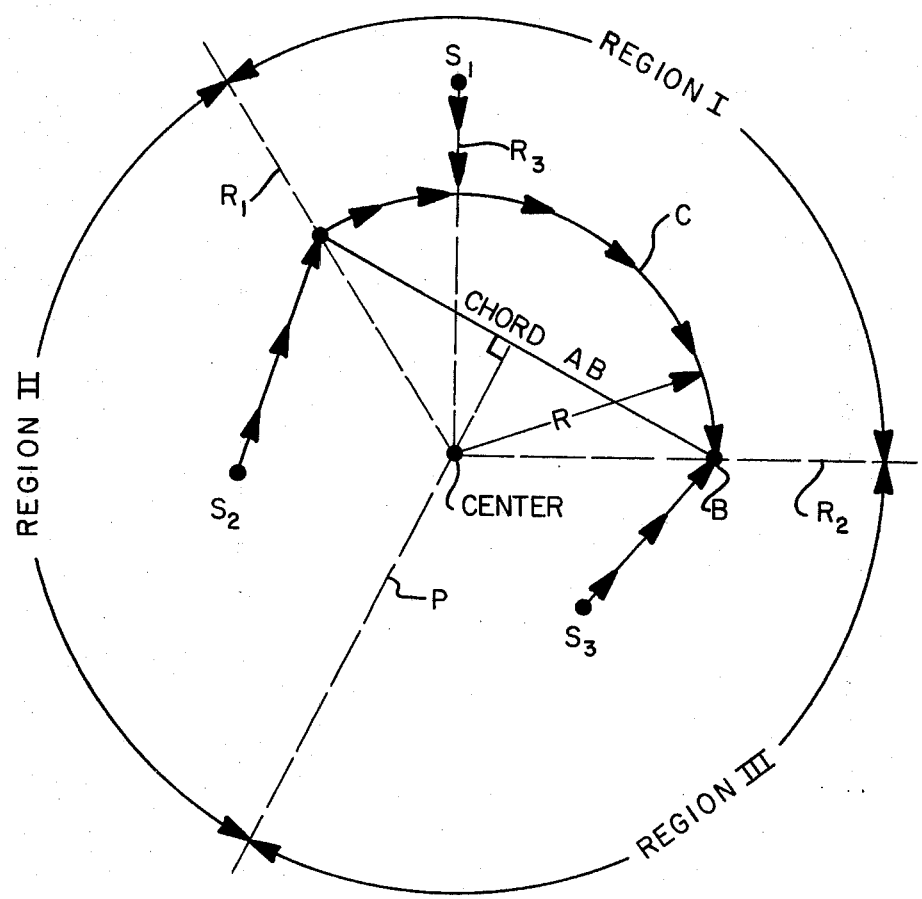
FIG. 4 shows exemplary trajectories in the $x$–$y$ plane of the relative motion of the cutting element of FIG. 1 in response to circular interpolation SEQUENCES, and FIGS. 5a and b show exemplary trajectories in the $x$–$y$ plane of the relative motion of the cutting element of FIG. 1 in response to tool offset SEQUENCE data.
Figure 4:
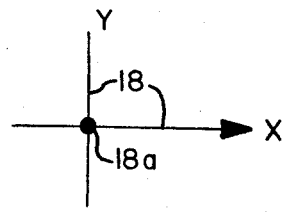

For the presently described embodiment, the circular interpolation SEQUENCE may best be understood in conjunction with FIG. 4 (showing the x-y plane with reference to coordinate axes 18) and the following examples. It will be assumed that computer 30 has selected (as a current SEQUENCE) an X-Y SEQUENCE having circular interpolation data associated therewith, namely SEQUENCE B relating to spatial point B in FIG. 4. It will further be assumed that the next previous X-Y SEQUENCE is SEQUENCE A relating to spatial point A in FIG. 4. It will further be assumed that the circular interpolation data stored in association with SEQUENCE B indicated that the desired clockwise circular path has a radius R and a center to the right of the chord AB (with refrence to the starting point A). FIG. 4 shows the circular path having radius R extending clockwise from point A to point B.

Computer 30 processes the circular interpolation data associated with the current SEQUENCE to determine the appropriate control signals to be applied to machine tool 12 in the following manner. If the $x, y$ position of the cutting element 14 prior to performing SEQUENCE B is at point A, as would be the case if the computer 30 were processing the stored SEQUENCES in succession as in the CYCLE sub-mode, then computer 30 would direct appropriate control signals to tool 12 to position table 16 so that cutting element 14 would approach point B along the circular path connecting points A and B.

If, however, the $x, y$ position of the cutting element 14 is located elsewhere prior to the selection of SEQUENCE B, as in the case where SEQUENCE B is selected by the operator following the processing of some other SEQUENCE in a program, then computer 30 compares that prior relative position of the cutting element 14 to the stored $x, y$ coordinates of the SEQUENCE B and SEQUENCE A. If the current $x, y$ position of the cutting element 14 is within a first region (region I in FIG. 4) bounded by a line segment $R_1$ extending from the center of the circle (as defined by the circular interpolation data) and passing through the $x, y$ coordinates of point B and bounded by a second line segment $R_2$ extending from the center of the circle passing through the coordinates of point A, and including the circular path, then computer 30 is effective to generate the appropriate control signals to direct the relative position of cutting element 14 along a radial line segment extending from the center of the circle to the prior $x, y$ position of the cutting element until the position of the cutting element reaches the circle. Thereafter the relative position of element 14 is along the circular path having the stored radius and center and terminating at the point B. As shown in FIG. 4, the first region includes the area bounded by the line segments $R_1$ and $R_2$ and including circular path C. Thus, for example, from a point $S_1$, the cutting element would approach point B along line segment $R_3$ until reaching circular path C, after which cutting element 14 would approach point B along path C.

If the current $x, y$ position of the cutting element is in a second region (region II of FIG. 4) defined to include the set of points bounded by the line segment $R_1$ from the circle center and passing through point A and bounded by the perpendicular bisector P of the chord connecting points A and B, and not including the first region, computer 30 is effective to generate control signals to direct cutting element 14 to first approach point A and thereafter follow circular path C to point B. As shown in FIG. 4, from point $S_2$, cutting element 14 would proceed directly to point A along line segment $S_2A$ and thereafter proceed along circular path C until reaching point B.

In a case where the current position of the cutting element 14 lies in a third region (region III of FIG. 4) including all spatial points which are outside both of the first two above described regions, then computer 30 generates the appropriate control signals to direct cutting element 14 to proceed directly to point B regardless of the circular interpolation data. Thus, from point $S_3$, cutting element 14 would approach point B directly along the line segment $S_3B$.

In an alternative embodiment, the processing associated with a current circular interpolation SEQUENCE may differ in that the computer 30 may compare the current $x, y$ coordinates of the cutting element 30 with the $x, y$ coordinates of the next previous SEQUENCE. If the current coordinates define a point within a predetermined distance of the previous set, then cutting element 14 is directed along the circular path defined by the data stored in association with the current SEQUENCE. Otherwise, the cutting element is directed along a straight line path from its current coordinates to the $x, y$ coordinates associated with the current SEQUENCE.

TOOL OFFSET CONTROL

TOOL OFFSET control 100 provides the operator with the option of programming for each SEQUENCE a correction factor in the cutting element $x, y$ (or $z$) coordinates to offset wear of the cutting edge during machining operations without requiring the operator to perform extensive reprogramming. A X-Y SEQUENCE having tool offset data associated therewith may best be understood in conjunction with FIGS. 5a and b (showing the $x-y$ plane with reference to coordinate axes 18) and the following examples. It will be assumed that a stored program includes the sequential X-Y SEQUENCES associated with spatial points C, D, E, F, and G, hereinafter denoted SEQUENCE C, SEQUENCE D, SEQUENCE E, SEQUENCE F, and SEQUENCE G, respectively.

Figure 5A:
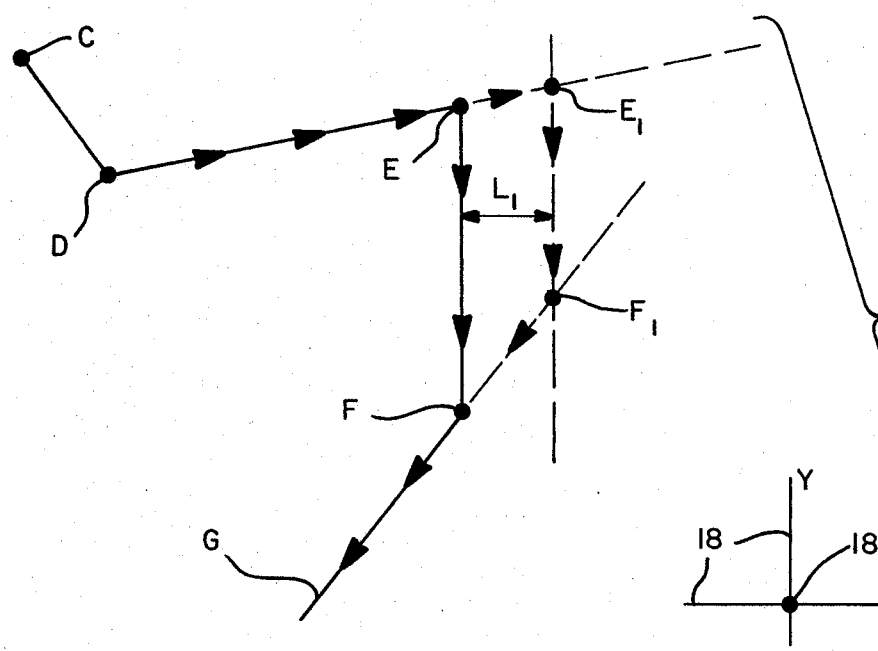

When performing SEQUENCES C, D, E, F, and G in the RUN mode, when those SEQUENCES have no tool offset data associated therewith, computer 30 generates the appropriate control signals to direct cutting element 14 along the path shown in FIG. 5a between points C, D, E, F, and G. This path comprises the line segments (as defined by their endpoints) CD, DE, EF, and then FG.

If, for example, the operator programs SEQUENCE F to be "left offset" by amount $L_1$, then in the RUN mode computer 30 directs element 14 to follow the path shown in FIG. 5a between points C, D, E, $E_1$, $F_1$, F and G while sequentially performing the corresponding SEQUENCES C through G. This path comprises line segments (as defined by their endpoints) CD, DE, $EE_1$, $E_1F_1$, $FF_1$, and FG. It will be noted that the new path, which is nominally between points E and F, i.e., $E_1F_1$ is offset to the left (as referenced to the direction of motion along original path EF) by an amount $L_1$.

Figure 5B:
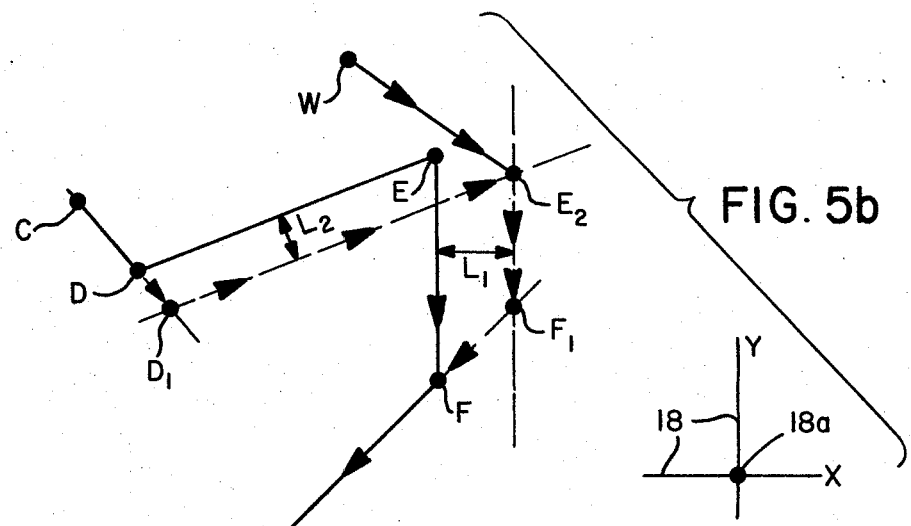

If, as a further example, the operator programs SEQUENCE F to be "left offset" by amount $L_1$ and also programs SEQUENCE E to be "right offset" by amount $L_2$, then in the RUN mode computer 30 directs element 14 to follow the path shown in FIG. 5b between points C, D, $D_1$, $E_2$, $F_1$, F and G while sequentially performing the corresponding SEQUENCES C through G. This path comprises line segments CD, $DD_1$, $D_1E_2$, $E_2F_1$, $F_1F$, and FG. It will be noted that the new path portion which is nominally between points D and E, i.e., $D_1E_2$, is offset to the right (as referenced to the direction of motion along original path DE) by an amount $L_2$ and the new path portion which is nominally between points E and F, i.e., $E_2F_1$, is offset to the left by an amount $L_2$.

As a third example, it is assumed that the operator programs SEQUENCES E and F to include tool offset data as in the immediately preceeding example, and the operator selects SEQUENCE E to be performed in the RUN mode and CYCLE sub-mode with the cutting element 14 initially at point W, as shown in FIG. 5b. In this case, computer 30 directs element 14 to the point $E_2$ (i.e., the intersection of line segments $D_1E_2$ and $F_1E_2$) which would have otherwise been approached, as described above, in the sequential performance of SEQUENCES C through G. Computer 30 then continues in the RUN mode and CYCLE sub-mode to direct element 14 along path $E_2F_1$, $F_1F$ and FG in the manner described above.

For Z SEQUENCES having tool offset data associated therewith, z coordinate of the cutting element is displaced in the RUN mode by an amount, L, in either an "up" (+z) or "down" (−z) direction, in accordance with the operator-programmed tool offset data entered as described below. As with the other groupings in control/programming station 40, the TOOL OFFSET control 100 includes an ON/OFF SELECT control 101 and an associated indicator lamp 101a. In the PROGRAM-EDIT mode, the lamp 101a is illuminated when the current selected X–Y SEQUENCE includes a tool offset data signal.

In the PROGRAM-EDIT mode, to initially program or to modify an X–Y (or Z) SEQUENCE to include a tool offset signal, the operator adjusts the selection switches in control 100 prior to activating SEQUENCE ENTER 68, or prior to activating either SEQUENCE INSERT 65 or SEQUENCE CORRECT 66 followed by SEQUENCE ENTER 68. The manual offset select switch 103 is adjusted to identify the desired amount of cutting element offset. In addition, the operator selects the offset to be "left offset" (or "up"), or "right offset" (or "down" ), by means of offset select control 105. The offset data is stored in memory section 34 by the operator upon the activation of the appropriate one of SEQUENCE ENTER 68, or either SEQUENCE INSERT 65 or SEQUENCE CORRECT 66 followed by SEQUENCE ENTER 68.

In operation in the RUN mode, computer 30 is effective to offset the cutting element position by the amount and direction stored in association with the current SEQUENCE. Where the operator has programmed tool offset data with an X–Y SEQUENCE which is incompatible with the next X–Y SEQUENCE (e.g., where the tool offset SEQUENCE is a straight line SEQUENCE and the next is a circular interpolation SEQUENCE for which the offset straight line does not intersect with the circular path) and he selects the RUN mode thereby activating CYCLE control 48, the computer 30 directs display 52 to blink a predetermined number, indicating an error when the incompatible offset SEQUENCE is reached and awaits corrective action by the operator.

BACKLASH CONTROL

The BACKLASH control 110 is also provided with an ON/OFF SELECT control 112 having an associated indicator lamp 112a which is illuminated in the RUN mode when the computer memory includes a stored ANTI-BACKLASH data signal.

The operator may direct computer 30 to generate and store an ANTI-BACKLASH data signal to be associated with every X–Y SEQUENCE in a program. This data signal is identified in the RUN mode by computer 30. In response thereto, computer 30 generates control signals associated with X–Y SEQUENCES for controlling the direction of the cutting element 14 motion as that element approaches the spatial points associated with the various X–Y SEQUENCES so that the final approach to the point is in accordance with the stored approach direction signal. In this manner, the backlash in the stepping motors and clutch assemblies 27a and 27b may be taken up in a desired direction for each spatial point in a program.

For a spatial point associated with an X–Y SEQUENCE having PROGRAM SEQUENCES being processed in the RUn mode when the computer memory has an ANTI-BACKLASH data signal stored therein, computer 30 is effective to first determine the programmed direction of approach to be followed by the cutting element, and then to determine whether a straight line path connecting the current cutting element position and the spatial point is in the programmed direction. If so, computer 30 applies the appropriate control signals to direct element 14 to the spatial point. If the spatial point cannot be reached by a straight line path in the programmed direction, the computer 30 applies the appropriate control signals to machine tool 12 to direct cutting element 14 to an intermediate spatial point. This intermediate spatial point is selected by computer 30 to lie along a straight line in the programmed approach direction at a predetermined distance in both the $x$ and $y$ directions from the $x, y$ coordinates of the point associated with the current SEQUENCE. The computer 30 thereupon generates the appropriate control signals to direct the cutting element 14 in a straight line path in the programmed direction from the intermediate point to the $x, y$ coordinates associated with the current SEQUENCE. The control signals generated by computer 30 to direct cutting element 14 along this latter path thereby control the direction of the backlash take-up associated with the position controlling means at each spatial point of the program.

TAPE STATION CONTROL

In addition to the above described programming controls available to an operator at station 40, TAPE STATION control 115 allows the operator to select a program from a perforated tape at tape station 42 and instruct computer 30 to store the program in memory 34 for subsequent performance of machining operations in accordance with that program. Following storage of a taped program, the operator may modify the various SEQUENCES of the stored program using any of the above described editing techniques. As a further function of control 115, the operator may direct tape station 42 to generate an encoded tape from the program SEQUENCES as stored in the memory section of computer 30. These operations are controlled by read/-punch select control 116 by which the operator may select whether the computer 30 is to read an externally applied tape from tape station 42 or is to generate a tape at that station. Tape start control 117 initiates the above described actions.

PROGRAM AID CONTROL

Program aid control 120 includes the repeat SEQUENCE control 130 and the mirror function control 140. Repeat SEQUENCE control 130 includes repeat program control 132 and associated indicator lamp 132a, repeat n SEQUENCE control 136 and associated indicator lamp 136a, n select control 134, and repeat last $x$ and last $y$ controls 137 and 138 and the associated indicator lamps 137a and 138a. Mirror function control 140 includes $x$-axis mirror control 142 and $y$-axis mirror control 144 and associated indicator lamps 142a and 144a.

The repeat SEQUENCE control 130 may be used by the operator to easily program computer 30 with "repeat programs" to perform an identical series of machining operations at a plurality of locations on a workpiece. To generate and store "repeat programs," the operator first generates an initial stored program for the series of machining operations at a first location on a workpiece in the manner described above (i.e., the operator switches mode control 44 to the PROGRAM-EDIT mode and manually positions cutting element 14 to pass through the series of spatial points, at which machining is desired, while energizing the appropriate control switches at station 40 for each point). Alternatively, the operator may generate repeat programs from a previously stored program in the same manner described below).

Following the entry of the initial stored program at the first workpiece location (or initially, in a case where a previously stored program is to be repeated), the operator re-positions the cutting element 14 to a second location on the workpiece at the first point in the series where the series of machining operations is desired. Then, in the PROGRAM-EDIT mode, the operator activates the repeat program control 132 (in response to which lamp 132a is illuminated for operator reference) followed by the SEQUENCE ENTER control 68 of control 60. In response thereto, computer 30 selects the first SEQUENCE from the program stored in memory 35 for the first workpiece location, extracts the $x$ and $y$, if an X-Y SEQUENCE, (or $z$, if a Z SEQUENCE), coordinate data stored therewith, and determines the change in those $x$ and $y$ (or $z$) coordinates with respect to the current $x$ and $y$ (or $z$) coordinates, for cutting element 14 (i.e., the $x$ and $y$ (or $z$) coordinate change from the first point at the first workpiece location to the first point at the second workpiece location). Computer 30 then selects each SEQUENCE of the stored program for the first workpiece location from memory 35 and stores those SEQUENCES at a temporary storage location in memory 35. The computer 30 then successively modifies the $x$ and $y$ (or $z$) coordinate data associated with each of the SEQUENCES at the temporary storage location by offsetting that data by the amount of the $x$ and $y$ (or $z$) change data, and adds the modified version of the SEQUENCE having the changed $x$ and $y$ (or $z$) coordinate to the next SEQUENCE storage location in memory 35. The remaining $z$ (or $x,y$) coordinate data is unchanged in the SEQUENCE. In this manner, an enlarged program is formed comprising the previously stored SEQUENCES (for directing tool 12 to perform the series of machining operations at the first workpiece location) and the modified SEQUENCES (for directing tool 12 to perform the same series of machining operations at the second workpiece location).

The operator may similarly generate a repeat program for an end portion of a stored program (e.g., the last n SEQUENCES, where n is selected by the operator) instead of having to generate a repeat program for an entire stored program (as described above). To do so, assuming that an initial program for a first workpiece location is already stored, the operator first repositions cutting element 14 to the second workpiece location. He then sets the n select control 134 to indicate the desired number of SEQUENCES to be repeated and finally activates "repeat n SEQUENCES" control 136 (in response to which lamp 136a is illuminated for operator reference) followed by the SEQUENCE ENTER control 68. In response thereto, computer 30 directs that the last $n$ SEQUENCES of the program previously stored in memory 35 are repeated in memory 35 at the end of the previous stored program, but with $x$ and $y$, if the first repeated SEQUENCE is X-Y (or $z$ if the first repeated SEQUENCE is Z) coordinate values offset from the original stored values by the amount of $x$ and $y$ (or $z$) change data, i.e. the $x$ and $y$ (or $z$) coordinate change from the first point to be repeated at the first workpiece location to the first point at the second location.

The repeat SEQUENCE control 130 may also be used in the PROGRAM-EDIT mode by the operator to rapidly program computer 30 to direct identical machining operations at a series of points on a workpiece where each point is separated from the previous point by a predetermined $x$ increment, by a predetermined $y$ increment or by a combination of both predetermined increments. To do so, following storage of a program including at least two X-Y SEQUENCES programmed in the normal manner as described previously, an operator may direct computer 30 to generate and store a next SEQUENCE having modified $x$ and $y$ coordinates by activating "repeat last $x$" control 137, "repeat last $y$" control 138, or both repeat last $x$ and $y$ controls 137 and 138 as desired (in response to which lamp 137a, lamp 138a or both are illuminated for operator reference), followed by SEQUENCE ENTER control 68 of control 60.

In response thereto, computer 30 selects the last two X-Y SEQUENCES in the previously stored program, stores those SEQUENCES at temporary storage locations in memory 34, and determines the $x$ and $y$ change data from the difference in the $x$ and $y$ coordinate data from those last two X-Y SEQUENCES, i.e., the $x$ and $y$ change data is dependent upon the last two X-Y SEQUENCES. Computer 30 then modifies the $x$ and $y$ coordinate data stored with the last SEQUENCE at the temporary storage location in one of the following ways: if only the repeat last $x$ increment control 137 was activated by the operator, the $x$ coordinate data are offset by the amount of the $x$ change data; if only the repeat last y control 138 was activated, the y coordinate data are offset by the amount of the y change data; and if both controls 137 and 138 were activated, both the x and y coordinate data are changed by the respective x and y change data. The modified version of the last X-Y SEQUENCE as stored at the temporary location of memory 35 is added to the next available SEQUENCE location in the stored program portion of memory 35.

The operator may then similarly generate a next X-Y SEQUENCE from the added X-Y SEQUENCE using repeat last x and y control 137 and 138, wherein the new SEQUENCE may have either modified x and y coordinates or both, as desired, and wherein the changed coordinates reflect the last x, y or x and y coordinate changes.

The operator may also reduce his required programming effort using mirror function control 140 in cases where the desired machining operations on a workpiece are symmetrically disposed about the x and y axes. Following the generation and storage of a program for directing computer 30 to perform machining operations in the first quadrant of the x-y plane defined by axes 18, the operator may in the RUN mode activate x-axis mirror control 142, y-axis mirror control 144, or both controls 142 and 144, as desired (and, in turn, the associated lamps). Computer 30 successively selects each SEQUENCE of the previously stored program and modifies the x and y coordinate data associated therewith. The x and y data are modified in the above-described operation in one of the following ways: if only the x-axis mirror control 142 was activated by the operator, the polarity of the x coordinate data is reversed; if only the y-axis mirror control 144 was activated, the polarity of the y coordinate data is reversed; and if both x and y mirror controls 142 and 144 were activated, the polarity of both the x and y coordinate data is reversed. The computer then performs the SEQUENCE operation as described above using the modified coordinate data and the otherwise unchanged SEQUENCE data.

DIGITAL COMPUTER

The digital computer 30 in the presently described embodiment is the model D-112, manufactured by Digital Computer Controls, Inc. coupled with a perforated tape reader model ASR-33, manufactured by Teletype Corporation. The computer 30 is initially programmed in the well-known fashion to read and store information by application thereto of a Read-In-Mode (RIM) Loader program such as the Digital Equipment Corporation program number Dec-08-LRAA-D. Following application of the RIM loader program to computer 30, a Binary (BIN) Loader program such as the Digital Equipment Corporation program number DEC-08-LBAA-D is applied to computer 30 from a RIM-coded punched tape to permit subsequent reading and storing of information in binary coded format.

In order to perform the aforedescribed control operations for the presently described embodiment of the machine tool control system of the present invention, the D-112 computer, as programmed by the RIM and BIN Loader programs, is then transformed to a special purpose computer with the program shown in the table following below. This latter program is assembled form. In other embodiments, equivalent programs may be used with a model D-112 computer or, alternatively, the same or an equivalent program may be used with an equivalent model computer and associated peripheral equipment.

The present invention may also be configured in a manner whereby two or more machine tools are controlled in the manner described above by a single computer, such as the D-112.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

```
1              /HAMILL CO.
2              /J. C. KILBANE
3              /16 JUL 74
4
5       0000           FIELD 0
6
7                      TABSET 10,20
8
9       0020           *20
10
11 0020 0000  NRECS,  0    /NR RECORDS IN FILE
12 0021 0000  DISSEQ, 0    /DISPLAYED SEQUENCE NR
13 0022 0000  ATEND,  0    /EQ 1 IF AT NEXT UNPROGRAMMED SEQUEN
14 0023 0000  LIGHTV, 0    /VALUE OF LIGHTS ON
15 0024 0000          0    /RESERVED FOR COPY OF FAC
16 0025 0000          0
17 0026 0000          0
18 0027 0000  FZSP,   0    /Z SPEED
19 0030 0000  FXYSP,  0    /XY SPEED
20 0031 0000  FZPK,   0    /Z PECK
21 0032 0000  FAUX,   0    /AUX BITS
22 0033 0000  FDEL,   0    /DELETE BIT
23 0034 0000  FPASS,  0    /PASS BIT
24 0035 0000  FEOP,   0    /EOP BIT
25 0036 0000  FOFFR,  0    /OFFSET SENSE
26 0037 0000  FXDIR,  0    /X DIRECTION
27 0040 0000  FYDIR,  0    /Y DIRECTION
```

```
28  0041    0000 FCNTR,   0              /CIRCLE CENTER ORIENTATION
29  0042    0000 FCCW,    0              /CIRCLE DIRECTION
30  0043    0000 FTYPE,   0              /RECORD TYPE
31  0044    6030 MAXFS,   -1750          /FILE SIZE
32  0045    1577 FSTRT,   1577           /FILE START-1
33  0046    7766 RSIZE,   -12            /RECORD SIZE
34  0047    0000 CIRCLE,  0              /LOCN CIRCULAR INTERPOLATION PGM
35  0050    0000 DISQT,   0              /SEQUENCE RUNNING
36  0051    0000 VMASK,   0              /VALID INTERRUPT MASK
37  0052    0000 WINT,    0              /VALID INTERRUPT NUMBER
38  0053    0000 AIDON,   0              /EQ 1 IF PGM AIDS
39  0054    0000 TDISQ,   0              /START NR OF RPT SEQUENCE
40  0055    0000 RCNT,    0              /NR TO REPEAT
41  0056    0000 TFTYPE,  0              /TYPE OF STARTING SEQUENCE
42  0057    1750 PMAXFS,  1750
43  0060    6447 FRNB3,   -1331
44  0061    0631 FRNB4,   1331-500
45  0062    6231 CDFA,    CDF 30
46  0063    6221 CDFB,    CDF 20
47  0064    6211 CDFC,    CDF 10
48  0065    0000 LASTZ,   0              /LAST Z DIRECTION
49  0066    0000 LASTXY,  0              /LAST XY DIRECTION
50
51                        FORM 52
53          0001          FIELD 1
54
55          0044          *44
56
57  0044    0000 FPASU,   0              /LOCN FP TO ASCII
58  0045    0000 FINPU,   0              /LOCN ASCII TO FP
59  0046    0000 TERM,    0              /LAST CHAR TYPED IN
60  0047    6213 CDFU,    CIF CDF 10
61
62                /SYSTEM DEFINITIONS
63
64          0010          XR1=10                        /RESERVED FOR INTERRUPT LEVE
65          0011          XR2=11
66          0012          XR3=12
67          0013          XR4=13
68          0014          XR5=14
69          0015          XR6=15
70          0016          XR7=16
71          0017          XR8=17
72          7400          MOUSE=7400
73          0024          EXP=24
74          0025          HORD=25
75          0026          LORD=26
76          0006          FABS=6
77
78                /DIRECTORY VARIABLES
79
80          0000          WXPOS=0
81          0001          WYPOS=1
82          0002          WZPOS=2
83          0003          WRAD=3
84          0004          FXPOS=4
85          0005          FYPOS=5
86          0006          FOFFST=6
87          0007          FRAD=7
88          0004          FZPOS=4
89          0010          STEPS=10
90          0011          XCNTR=11
91          0012          YCNTR=12
92          0013          DELTAX=13
93          0014          DELTAY=14
94          0015          LASTX=15
95          0016          LASTY=16
96          0021          DELTAZ=21
97          0022          ZINK=22
```

```
 98    0023    ZINC=23
 99    0024    ZDETL=24
100    0023    DESTN=23
101    0024    POSN=24
102    0021    CIRXM=21
103    0022    CIRYM=22

104    0023    CIRAB=23
105    0024    CIRMC=24
106    0025    TPY0=25
107    0026    TPY1=26
108    0027    TPY2=27
109    0030    TPY3=30
110    0031    TPY4=31
111    0032    TPY5=32
112    0033    TPY6=33
113    0034    TPY7=34
114    0035    XDEST=35
115    0036    YDEST=36
116    0037    XPOSA=37
117    0040    YPOSA=40
118    0041    RADB=41
119    0042    OFFSTB=42
120    0043    XPOSB=43
121    0044    YPOSB=44
122
123    0140    PDB=140
124    0140    STATB=140
125    0140    WZSP=STATB
126    0141    WXYF=STATB+1
127    0142    WZPK=STATB+2
128    0143    WSEQNR=STATB+3
129    0144    WNCNT=STATB+4
130    0145    WAUX=STATB+5
131    0146    WXDIR=STATB+6
132    0147    WYDIR=STATB+7
133    0150    WRPTX=STATB+10
134    0151    WRPTY=STATB+11
135    0152    WRPTP=STATB+12
136    0153    WRPTN=STATB+13
137    0154    WNMX=STATB+14
138    0155    WNMY=STATB+15
139    0156    WSINS=STATB+16
140    0157    WSCORR=STATB+17
141    0160    WSDEL=STATB+20
142    0161    WPASS=STATB+21
143    0162    WEOP=STATB+22
144    0163    WZSET=STATB+23
145    0164    WCTLS=STATB+24
146    0165    WTOOL=STATB+25
147    0166    WPROG=STATB+26
148    0167    WNBLTU=STATB+27
149    0170    WCCW=STATB+30
150    0171    WCNTRR=STATB+31
151    0172    WOFFR=STATB+32
152    0173    WPNCH=STATB+33
153
154            FIXTAB
155            $
```

```
 1              /HAMILL CO.
 2              /J. C. KILBANE
 3              /16 JUL 74
 4
 5       0000           FIELD 0
 6
 7                      TABSET 10,20
 8
 9       0200           *200
10
11 0200   4407 STARTS,  FENT
12 0201   5214          FGET F10
13 0202   0017          FNOR
14 0203   6010          FPUT STEPS
15 0204 L 5777          FGET ZIP
16 0205   6015          FPUT LASTX
17 0206   6016          FPUT LASTY
18 0207   6013          FPUT DELTAX
19 0210   6014          FPUT DELTAY
20 0211   0000          FEXT
21 0212   3050          DCA DISQT
22 0213 L 5776          JMP CLEAR
23
24 0214   0027 F10,    27;0;16
   0215   0000
   0216   0016
25                      FORM 26 0217   0000 FPSS,    0                /FIND PREVIOUS SEQUENCE
27 0220   3345          DCA SWITCH
28 0221   1021          TAD DISSEQ
29 0222   3346          DCA SSSEQ
30
31 0223   7240 FPSA,    STA
32 0224   1346          TAD SSSEQ
33 0225   7510          SPA
34 0226   5306          JMP FPSB
35 0227   3346          DCA SSSEQ
36 0230   1346          TAD SSSEQ
37 0231 L 4775          JMS FETCH
38 0232   0001          1
39
40 0233   1021 FPSAA,   TAD DISSEQ
41 0234   7041          CIA
42 0235   1346          TAD SSSEQ
43 0236   7650          SNA CLA
44 0237 L 5774          JMP CYXY
45 0240   1033          TAD FDEL
46 0241   7640          SZA CLA
47 0242   5223          JMP FPSA
48 0243   1035          TAD FEOP
49 0244   7650          SNA CLA
50 0245   5251          JMP FPSDA
51
52 0246   1345 FPSD,    TAD SWITCH
53 0247   7650          SNA CLA
54 0250   5306          JMP FPSB
55
56 0251   7344 FPSDA,   STA CLL RAL
57 0252   1043          TAD FTYPE
58 0253   7700          SMA CLA
59 0254   5223          JMP FPSA
60 0255   4407          FENT
61 0256   5004          FGET FXPOS
62 0257   6037          FPUT XPOSA
63 0260   5005          FGET FYPOS
64 0261   6040          FPUT YPOSA
65 0262   0000          FEXT
66 0263   1155          TAD WMMY
67 0264   7640          SZA CLA
```

```
68 0265    5272          JMP FPSDB
69 0266    4407          FENT
70 0267    0014          FNEG
71 0270    6040          FPUT YPOSA
72 0271    0000          FEXT
73
74 0272    1154  FPSDB,  TAD WNMX
75 0273    7640          SZA CLA
76 0274    5302          JMP FBSDC
77 0275    4407          FENT 78 0276    5037          FGET XPOSA
79 0277    0014          FNEG
80 0300    6037          FPUT XPOSA
81 0301    0000          FEXT
82
83 0302    1021  FBSDC,  TAD DISSEQ
84 0303 L  4775          JMS FETCH
85 0304    0001          1
86 0305    5617          JMP I FPSS
87
88 0306    7200  FPSB,   CLA
89 0307    1345          TAD SWITCH
90 0310    7640          SZA CLA
91 0311    5341          JMP FPSX
92 0312    7001          IAC
93 0313    3345          DCA SWITCH
94 0314    1162          TAD WEOP
95 0315    7640          SZA CLA
96 0316    5341          JMP FPSX
97 0317    1021          TAD DISSEQ
98 0320    3346          DCA SSSEQ
99
100 0321   2346  FPSBB,  ISZ SSSEQ
101 0322   1346          TAD SSSEQ
102 0323   7041          CIA
103 0324   1020          TAD NRECS
104 0325   7650          SNA CLA
105 0326   5223          JMP FPSA
106 0327   1346          TAD SSSEQ
107 0330 L 4775          JMS FETCH
108 0331   0001          1
109 0332   1033          TAD FDEL
110 0333   7640          SZA CLA
111 0334   5321          JMP FPSBB
112 0335   1035          TAD FEOP
113 0336   7640          SZA CLA
114 0337   5233          JMP FPSAA
115 0340   5321          JMP FPSBB
116
117 0341   1021  FPSX,   TAD DISSEQ
118 0342 L 4775          JMS FETCH
119 0343   0001          1
120 0344 L 5774          JMP CYXY
121
122 0345   0000  SWITCH, 0
123 0346   0000  SSSEQ,  0
124
125 0347 L 4773  PGME7,  JMS ERRDSP
126 0350   0007          7
127 0351 L 5776          JMP CLEAR
128
129 0352 L 4773  PGME8,  JMS ERRDSP
```

```
130 0353   0010           10
131 0354 L 5772           JMP NLOOPR
132                       FORM

0372 L 1216
    0373 L 1400
    0374 L 3400
    0375 L 1600
    0376 L 1272
    0377 L 3147

133        0400           *400
134
135 0400   3356 IHA,      DCA ACCUM        /INTERRUPT HANDLER
136 0401   7004           RAL
137 0402   3357           DCA LINK
138 0403   6102           6102
139 0404   5214           JMP IHB
140 0405   1377           TAD (PDB-1)      /POWER FAIL
141 0406   3010           DCA XR1
142 0407   4332           JMS IHR
143 0410   6452           6452
144 0411   1376           TAD (JMP I 3)
145 0412   3000           DCA 0
146 0413   7402           HLT
147
148 0414   6431 IHB,      6431
149 0415   5254           JMP IHC
150 0416   3052           DCA WINT
151 0417   6414           6414
152 0420   6432           6432             /HAMILL FLAG
153 0421   7040           CMA
154 0422   0051           AND VMASK
155 0423   7450           SNA
156 0424   5245           JMP IHRET
157
158 0425   2052 IHBA,     ISZ WINT
159 0426   7004           RAL
160 0427   7430           SZL
161 0430   5234           JMP IHX
162 0431   7440           SZA
163 0432   5225           JMP IHBA
164 0433   3052           DCA WINT
165
166 0434   7200 IHX,      CLA
167 0435   1052           TAD WINT
168 0436   1375           TAD (-10)
169 0437   7450           SNA
170 0440 L 5774           JMP RSEQUR
171 0441   7001           IAC
172 0442   7001           IAC
173 0443   7450           SNA
174 0444 L 5773           JMP STOPL
175
176 0445   7300 IHRET,    CLA CLL
177 0446   1357           TAD LINK
178 0447   7010           RAR
179 0450   1356           TAD ACCUM
180 0451   6244           RMF
181 0452   6001           ION
182 0453   5400           JMP I 0
183
184 0454   6411 IHC,      6411
```

```
185  0455        5311            JMP IHD
186  0456        6412            6412               /STATUS REQUEST
187  0457        1377            TAD (STATB-1)
188  0460        3010            DCA XR1
189  0461        7001            IAC
190  0462        3360            DCA RDONE
191  0463        4332            JMS IHR
192  0464        6364            6364
193  0465        7040            CMA
194  0466        3410            DCA I XR1
195  0467        6374            6374
196  0470        7040            CMA
197  0471        3410            DCA I XR1
198  0472        6404            6404
199  0473        7040            CMA
200  0474        3410            DCA I XR1
201  0475        6424            6424
202  0476        7040            CMA
203  0477        3410            DCA I XR1
204  0500        6434            6434
205  0501        7040            CMA
206  0502        3410            DCA I XR1
207  0503        6444            6444
208  0504        7040            CMA
209  0505        3410            DCA I XR1
210  0506        6454            6454
211  0507        3410            DCA I XR1
212  0510        5245            JMP IHRET
213
214  0511        6031    IHD,    KSF
215  0512        5324            JMP IHE
216  0513        6036            KRB
217  0514        3362            DCA CDONE
218  0515        1362            TAD CDONE
219  0516        1372            TAD (-204)
220  0517        7640            SZA CLA
221  0520        5245            JMP IHRET
222  0521        1376            TAD (JMP I 3)
223  0522        3000            DCA 0
224  0523    L   5771            JMP MOUSE
225
226  0524        6041    IHE,    TSF
227  0525        5245            JMP IHRET
228  0526        6042            TCF
229  0527        7001            IAC
230  0530        3361            DCA PDONE
231  0531        5245            JMP IHRET
232
233  0532        0000    IHR,    0
234  0533        6304            6304
235  0534        7040            CMA
236  0535        3410            DCA I XR1

237  0536        6314            6314
238  0537        7040            CMA
239  0540        3410            DCA I XR1
240  0541        6324            6324
241  0542        7040            CMA
242  0543        3410            DCA I XR1
243  0544        6334            6334
244  0545        7040            CMA
245  0546        3410            DCA I XR1
246  0547        6344            6344
247  0550        7040            CMA
248  0551        3410            DCA I XR1
249  0552        6354            6354
250  0553        7040            CMA
251  0554        3410            DCA I XR1
252  0555        5732            JMP I IHR
253
```

```
254 0556   0000 ACCUM,  0
255 0557   0000 LINK,   0
256 0560   0000 RDONE,  0
257 0561   0000 PDONE,  0
258 0562   0000 CDONE,  0
259
260                     FORM

0571 L 7400
     0572 ( 7574
     0573 L 1451
     0574 L 3315
     0575 ( 7770
     0576 ( 5403
     0577 ( 0137

1        0600         *IHA+200
  2
  3  0600  0000 WORLD,  0                /READ AND CONVERT WORLD
  4  0601 L 3777        DCA RDONE
  5  0602   6402        6402
  6  0603   6001        ION
  7  0604 L 1777        TAD RDONE
  8  0605   7650        SNA CLA
  9  0606   5203        JMP .-3
 10  0607   4407        FENT             /CONVERT BCD TO DIRECTORY VARIABLES
 11  0610   5137        FGET STATB-1
 12  0611   0000        FEXT
 13  0612 L 4776        JMS BCDFL
 14  0613   0762        DEF25
 15  0614   4000        4000
 16  0615   6000        FPUT WXPOS
 17  0616   5141        FGET STATB+1
 18  0617   0000        FEXT
 19  0620 L 4776        JMS BCDFL
 20  0621   0762        DEF25
 21  0622   4000        4000
 22  0623   6001        FPUT WYPOS
 23  0624   5143        FGET STATB+3
 24  0625   0000        FEXT
 25  0626   1026        TAD LORD
 26  0627   0375        AND (377)
 27  0630   3026        DCA LORD
 28  0631 L 4776        JMS BCDFL
 29  0632   0762        DEF25
 30  0633   0200        200
 31  0634   6002        FPUT WZPOS
 32  0635   5151        FGET STATB+11
 33  0636   0000        FEXT
 34  0637   1026        TAD LORD
 35  0640   0375        AND (377)
 36  0641   3026        DCA LORD
 37  0642   7001        IAC
 38  0643 L 4776        JMS BCDFL
 39  0644   0757        DEF1
 40  0645   0000        0
 41  0646 L 3774        FMPY FOUR
 42  0647   6003        FPUT WRAD
 43  0650   0000        FEXT
 44  0651   1145        TAD STATB+5
 45  0652   7006        RTL
 46  0653   7006        RTL
 47  0654   7004        RAL
 48  0655   0373        AND (17)
 49  0656   3140        DCA WZSP
 50  0657   1146        TAD STATB+6
 51  0660   7012        RTR
 52  0661   7012        RTR
```

```
53 0662    0373          AND (17)
54 0663    3141          DCA WXYF
55 0664    1146          TAD STATB+6
56 0665    0372          AND (7)
57 0666    3142          DCA WZPK
58 0667    1147          TAD STATB+7
59 0670 L  4771          JMS BCDC
60 0671    3143          DCA WSEQNR
61 0672    1150          TAD STATB+10
62 0673    0375          AND (377)
63 0674 L  4771          JMS BCDC
64 0675    3144          DCA WNCNT
65 0676    1154          TAD STATB+14
66 0677    3145          DCA WAUX
67 0700    1370          TAD (WAUX)
68 0701    3011          DCA XR2
69 0702    4323          JMS DCOMP
70 0703    0146          STATB+6
71 0704    7776          -2
72 0705    1151          TAD STATB+11
73 0706    3016          DCA XR7
74 0707    1153          TAD STATB+13
75 0710    3017          DCA XR8
76 0711    4323          JMS DCOMP
77 0712    0150          STATB+10
78 0713    7774          -4
79 0714    4323          JMS DCOMP
80 0715    0016          XR7
81 0716    7764          -14
82 0717    4323          JMS DCOMP
83 0720    0017          XR8
84 0721    7774          -4
85 0722    5600          JMP I WORLD
86
87 0723    0000 DCOMP,   0
88 0724    1723          TAD I DCOMP
89 0725    3356          DCA DCOMT
90 0726    2323          ISZ DCOMP
91 0727    1756          TAD I DCOMT
92 0730    3356          DCA DCOMT
93 0731    1723          TAD I DCOMP
94 0732    2323          ISZ DCOMP
95 0733    3012          DCA XR3
96
97 0734    1356 DCOMQ,   TAD DCOMT
98 0735    7004          RAL
99 0736    3356          DCA DCOMT
100 0737   7004          RAL
101 0740   3411          DCA I XR2
102 0741   2012          ISZ XR3
103 0742   5334          JMP DCOMQ
104 0743   5723          JMP I DCOMP 105
106 0744   0000 FLOATS,  0                /SINGLE PRECISION FLOAT
107 0745   3355          DCA FLT+2
108 0746   4407          FENT
109 0747   5353          FGET FLT
110 0750   0017          FNOR
111 0751   7744          FJMP I FLOATS
112 0752   0007          UNK
113
114 0753   0027 FLT,     27;0;0
    0754   0000
    0755   0000
115 0756   0000 DCOMT,   0
116 0757   0001 DEF1,    1;2000;0
    0760   2000
    0761   0000
117 0762   0002 DEF25,   2;2400;0
    0763   2400
    0764   0000
118
119                      FORM
```

```
0770 ( 0145
0771 L 1067
0772 ( 0007
0773 ( 0017
0774 L 2730
0775 ( 0377
0776 L 1024
0777 L 0560

1           1000             *IHA+400
 2
 3  1000    7203  PWRUP,   CLA
 4  1001    1141           TAD PDB+1
 5  1002    6313           6313
 6  1003    7200           CLA
 7  1004    1140           TAD PDB
 8  1005    6303           6303
 9  1006    7200           CLA
10  1007    1143           TAD PDB+3
11  1010    6333           6333
12  1011    7200           CLA
13  1012    1142           TAD PDB+2
14  1013    6323           6323
15  1014    7200           CLA
16  1015    1145           TAD PDB+5
17  1016    6353           6353
18  1017    7200           CLA
19  1020    1144           TAD PDB+4
20  1021    6343           6343
21  1022    7200           CLA
22  1023 L  5777           JMP NLOOPR
23
24  1024    0000  BCDFL,   0
25  1025    7640           SZA CLA
26  1026    5232           JMP .+4
27  1027    1025           TAD HORD
28  1030    0376           AND (7760)
29  1031    3025           DCA HORD
30  1032    1624           TAD I BCDFL
31  1033    2224           ISZ BCDFL
32  1034    3361           DCA BCDPTR
33  1035    1025           TAD HORD
34  1036    4267           JMS BCDC
35  1037    3357           DCA BCDL+2
36  1040    1026           TAD LORD
37  1041    0624           AND I BCDFL
38  1042    3360           DCA BCDSI
39  1043    1624           TAD I BCDFL
40  1044    7040           CMA
41  1045    2224           ISZ BCDFL
42  1046    0026           AND LORD
43  1047    4267           JMS BCDC
44  1050 L  4775           JMS FLOATS
45  1051    3364           FMPY BCDCM
46  1052    1355           FADD BCDL
47  1053    4761           FDIV I BCDPTR
48  1054    0000           FEXT
49  1055    1360           TAD BCDSI
50  1056    7650           SNA CLA
51  1057    5264           JMP .+5
52  1060    4407           FENT
```

```
53 1061    0014          FNEG
54 1062    7624          FJMP I BCDFL
55 1063    0007          UNK
56 1064    4407          FENT
57 1065    7624          FJMP I BCDFL
58 1066    0007          UNK
59
60 1067    0000  BCDC,   0                    /SINGLE PRECISION BCD TO BINARY
61 1070    3362          DCA BCDTP
62 1071    1362          TAD BCDTP
63 1072    0374          AND (7400)
64 1073    7110          CLL RAR
65 1074    3363          DCA BCDTQ
66 1075    1363          TAD BCDTQ
67 1076    7012          RTR
68 1077    1363          TAD BCDTQ
69 1100    1362          TAD BCDTP
70 1101    0376          AND (7760)
71 1102    3363          DCA BCDTQ
72 1103    1363          TAD BCDTQ
73 1104    7110          CLL RAR
74 1105    1363          TAD BCDTQ
75 1106    7012          RTR
76 1107    7041          CIA
77 1110    1362          TAD BCDTP
78 1111    5667          JMP I BCDC
79
80 1112    0000  PGSBR,  0
81 1113    3011          DCA XR2
82 1114    7240          STA
83 1115    3354          DCA FSTLOC
84 1116    1011          TAD XR2
85 1117    1060          TAD FRNB3
86 1120    7510          SPA
87 1121    5335          JMP PGSBS
88 1122    3011          DCA XR2
89 1123    1062          TAD CDFA
90
91 1124    3351  PGSBU,  DCA CDFSBR+1
92 1125    1046          TAD RSIZE
93 1126    3353          DCA PGSBC
94 1127    1011          TAD XR2
95 1130    2353          ISZ PGSBC
96 1131    5327          JMP .-2
97 1132    1354          TAD FSTLOC
98 1133    3011          DCA XR2
99 1134    5712          JMP I PGSBR
100
101 1135   1061  PGSBS,  TAD FRNB4
102 1136   7510          SPA
103 1137   5343          JMP PGSBT
104 1140   3011          DCA XR2

105 1141   1063          TAD CDFB
106 1142   5324          JMP PGSBU
107
108 1143   7200  PGSBT,  CLA
109 1144   1045          TAD FSTRT
110 1145   3354          DCA FSTLOC
111 1146   1064          TAD CDFC
112 1147   5324          JMP PGSBU
113
114 1150   0000  CDFSBR, 0
115 1151   7402          HLT
116 1152   5750          JMP I CDFSBR
117
118 1153   0000  PGSBC,  0
119 1154   0000  FSTLOC, 0
120 1155   0027  BCDL,   27;0;0
    1156   0000
    1157   0000
```

```
121 1160    0000 BCDSI,   0
122 1161    0000 BCDPTR,  0
123 1162    0000 BCDTP,   0
124 1163    0000 BCDTQ,   0
125 1164    0012 BCDCM,   12;3720;0
    1165    3720
    1166    0000
126
    1174 ( 7400
    1175 L 0744
    1176 ( 7760
    1177 L 1216

127         0001         *1
128 0001    5402         JMP I .+1
129 0002    0400         IHA
130 0003    1000         PWRUP
131
132                      FORM 1         1200         *IHA+600
  2
  3 1200    3052 NLOOP,  DCA WINT          /WAIT LOOP
  4 1201    1377         TAD (7440)
  5 1202    3051         DCA VMASK
  6 1203 L  4776         JMS WORLD
  7 1204    1166         TAD WPROG
  8 1205    7650         SNA CLA
  9 1206 L  5775         JMP RUNG
 10 1207    1052         TAD WINT
 11 1210    7450         SNA
 12 1211    5203         JMP NLOOP+3
 13 1212    1374         TAD (JMP I NLTAB-1)
 14 1213    3215         DCA .+2
 15 1214 L  4773         JMS RSEQUS
 16 1215    7402         HLT
 17
 18 1216    1050 NLOOPR, TAD DISQT
 19 1217    3143         DCA WSEQNR
 20
 21 1220    4223 SEQSEL, JMS SQSLCT        /SEQUENCE SELECT
 22 1221    5200         JMP NLOOP
 23 1222    5200         JMP NLOOP
 24
 25 1223    0000 SQSLCT, 0                 /SELECT AND DISPLAY
 26 1224    3022         DCA ATEND
 27 1225    1143         TAD WSEQNR
 28 1226    1044         TAD MAXFS
 29 1227    7700         SMA CLA
 30 1230    5261         JMP SQSA
 31 1231    1143         TAD WSEQNR
 32 1232    7041         CIA
 33 1233    1020         TAD NRECS
 34 1234    7510         SPA
 35 1235    5266         JMP SQSE
 36 1236    7640         SZA CLA
 37 1237    5242         JMP .+3
 38 1240    2022         ISZ ATEND
 39 1241    7410         SKP
 40 1242    2223         ISZ SQSLCT
 41 1243    6422         6422
 42 1244    3023         DCA LIGHTV
 43 1245    6452         6452
 44 1246    6442         6442
 45 1247    1143         TAD WSEQNR
 46 1250    3021         DCA DISSEQ
 47 1251    1021         TAD DISSEQ
 48 1252    4305         JMS BINBCD
 49 1253    1021         TAD DISSEQ
 50 1254    3050         DCA DISQT
 51 1255    1021         TAD DISSEQ
 52 1256 L  4772         JMS FETCH
```

```
 53 1257    0000             0
 54 1260    5623             JMP I SQSLCT
 55
 56 1261 L 4771 SQSA,        JMS ERRDSP
 57 1262    0001             1
 58 1263    1021             TAD DISSEQ
 59 1264    3143             DCA WSEQNR
 60 1265    5224             JMP SQSLCT+1
 61
 62 1266    7200 SQSF,       CLA
 63 1267 L 4771              JMS ERRDSP
 64 1270    0000             0
 65 1271    5263             JMP SQSA+2
 66
 67 1272    1050 CLEAR,      TAD DISQT
 68 1273    3020             DCA NRECS         /ERASE FILE
 69 1274 L 4770              JMS ZIPPER
 70 1275    1050             TAD DISQT
 71 1276 L 4767              JMS PUTR
 72 1277    2125             STBFFR
 73
 74 1300    1050 CLEARR,     TAD DISQT
 75 1301    3143             DCA WSEQNR
 76 1302    4223             JMS SQSLCT
 77 1303    5200             JMP NLOOP
 78 1304    5200             JMP NLOOP
 79
 80 1305    0000 BINBCD,     0                 /BINARY TO BCD AND DISPLAY
 81 1306    3351             DCA BINBT
 82 1307    3015             DCA XR6
 83
 84 1310    1351 BINBA,      TAD BINBT
 85 1311    1366             TAD (-144)
 86 1312    7510             SPA
 87 1313    5320             JMP BINBB
 88 1314    3351             DCA BINBT
 89 1315    1015             TAD XR6
 90 1316    1365             TAD (400)
 91 1317    5307             JMP BINBA-1
 92
 93 1320    7200 BINBB,      CLA
 94 1321    1351             TAD BINBT
 95 1322    1364             TAD (-12)
 96 1323    7510             SPA
 97 1324    5332             JMP BINBC
 98 1325    3351             DCA BINBT
 99 1326    1015             TAD XR6
100 1327    1363             TAD (20)
101 1330    3015             DCA XR6
102 1331    5321             JMP BINBB+1
103
104 1332    7200 BINBC,      CLA 105 1333    1015             TAD XR6
106 1334    1351             TAD BINBT
107 1335    6372             6372
108 1336    7200             CLA
109 1337    5705             JMP I BINBCD
110
111 1340    1220 NLTAB,      SEQSEL
112 1341    1200             NLOOP
113 1342    2200             PSNENT
114 1343    1272             CLEAR
115 1344    1200             NLOOP
116 1345    1200             NLOOP
117 1346    5000             TAPER
118 1347    1200             NLOOP
119 1350    1200             NLOOP
120
121 1351    0000 BINBT,      0
122
123                          FORM
```

```
         1363 ( 0020
         1364 ( 7766
         1365 ( 0400
         1366 ( 7634
         1367 L 1502
         1370 L 2051
         1371 L 1400
         1372 L 1600
         1373 L 3273
         1374 ( 5737
         1375 L 2610
         1376 L 0600
         1377 ( 7440

1             1400         *IHA+1000
 2
 3  1400       0000 ERRDSP, 0              /ERROR DISPLAY
 4  1401       1051         TAD VMASK
 5  1402       3016         DCA XR7
 6  1403       1377         TAD (100)
 7  1404       3051         DCA VMASK
 8  1405       3052         DCA WINT
 9  1406       4250         JMS STOPS
10
11  1407       1600 ERRDA,  TAD I ERRDSP
12  1410 L     4776         JMS BINBCD
13  1411       4226         JMS ERRDLY
14  1412       7240         STA
15  1413       6372         6372
16  1414       7200         CLA
17  1415       4226         JMS ERRDLY
18  1416       1052         TAD WINT
19  1417       7650         SNA CLA
20  1420       5207         JMP ERRDA
21  1421       1021         TAD DISSEQ
22  1422 L     4776         JMS BINBCD
23  1423       1016         TAD XR7
24  1424       3051         DCA VMASK
25  1425       5600         JMP I ERRDSP
26
27  1426       0000 ERRDLY, 0
28  1427       1375         TAD (-12)
29  1430       3017         DCA XR8
30  1431       3015         DCA XR6
31  1432       2015         ISZ XR6
32  1433       5232         JMP .-1
33  1434       2017         ISZ XR8
34  1435       5232         JMP .-3
35  1436       5626         JMP I ERRDLY
36
37  1437       0000 LTSON,  0              /TURN ON LIGHTS PGM
38  1440       1637         TAD I LTSON
39  1441       7040         CMA
40  1442       0023         AND LIGHTV
41  1443       1637         TAD I LTSON
42  1444       6422         6422
43  1445       3023         DCA LIGHTV
44  1446       2237         ISZ LTSON
45  1447       5637         JMP I LTSON
46
47  1450       1200 STOPS,  NLOOP          /STOP LOCATION SWITCH
48
49  1451       6001 STOPL,  ION
50  1452       5650         JMP I STOPS
51
52  1453       0000 LTSOFF, 0              /TURN OFF LIGHTS
```

```
 53 1454    1653            TAD I LTSOFF
 54 1455    7040            CMA
 55 1456    0023            AND LIGHTV
 56 1457    6422            6422
 57 1460    3023            DCA LIGHTV
 58 1461    2253            ISZ LTSOFF
 59 1462    5653            JMP I LTSOFF
 60
 61 1463    0000  GETR,     0                    /GET RECORD
 62 1464 L  4774            JMS PGSBR
 63 1465    7240            STA
 64 1466    1663            TAD I GETR
 65 1467    2263            ISZ GETR
 66 1470    3012            DCA XR3
 67 1471    1046            TAD RSIZE
 68 1472    3013            DCA XR4
 69 1473 L  4773            JMS CDFSBR
 70 1474    1411            TAD I XR2
 71 1475    6201            CDF 00
 72 1476    3412            DCA I XR3
 73 1477    2013            ISZ XR4
 74 1500    5273            JMP .-5
 75 1501    5663            JMP I GETR
 76
 77 1502    0000  PUTR,     0                    /STORE FILE RECORD
 78 1503 L  4774            JMS PGSBR
 79 1504    7240            STA
 80 1505    1702            TAD I PUTR
 81 1506    2302            ISZ PUTR
 82 1507    3012            DCA XR3
 83 1510    1046            TAD RSIZE
 84 1511    3013            DCA XR4
 85 1512    1412            TAD I XR3
 86 1513 L  4773            JMS CDFSBR
 87 1514    3411            DCA I XR2
 88 1515    6201            CDF 00
 89 1516    2013            ISZ XR4
 90 1517    5312            JMP .-5
 91 1520    5702            JMP I PUTR
 92
 93 1521    0000  CALLFP,   0
 94 1522    1321            TAD CALLFP
 95 1523    6211            CDF 10
 96 1524    3772            DCA I (200)
 97 1525    6201            CDF 00
 98 1526    6212            CIF 10
 99 1527    5771            JMP I (201)
100
101 1530    1370  CYAUX,    TAD (2300)           /AUX FUNCTION
102 1531    3051            DCA VMASK
103 1532    1367            TAD (RUNNER)
104 1533    3250            DCA STCPS 105 1534    7130            STL RAR
106
107 1535    3017  CYAUXA,   DCA XR8
108 1536    3052            DCA WINT
109 1537    1032            TAD FAUX
110 1540    7450            SNA
111 1541 L  5766            JMP CYCLN
112 1542    7104            RAL CLL
113 1543    3032            DCA FAUX
114 1544    7420            SNL
115 1545    5354            JMP CYAUXB
116 1546    1017            TAD XR8
117 1547    6452            6452
118 1550    7300            CLA CLL
119 1551    1052            TAD WINT
120 1552    7650            SNA CLA
121 1553    5351            JMP .-2
```

```
122
123 1554    1017 CYAUXB, TAD XR8
124 1555    7110         RAR CLL
125 1556    5335         JMP CYAUXA
126
    1566 L 2643
    1567 ( 2600
    1570 ( 2300
    1571 ( 0201
    1572 ( 0200
    1573 L 1150
    1574 L 1112
    1575 ( 7766
    1576 L 1305
    1577 ( 0100

127         0007         *7
128 0007    1521         CALLFP
129
130                      FORM 1         1600         *IHA+1200
  2
  3 1600    0000 FETCH,  0                    /FETCH FILE RECORD
  4 1601 L  4777         JMS GETR             /AND MAYBE DISPLAY
  5 1602    1727         FBFFR
  6 1603    1327         TAD FBFFR
  7 1604    0376         AND (7)
  8 1605    3043         DCA FTYPE
  9 1606    1375         TAD (FDEL-1)
 10 1607    3011         DCA XR2
 11 1610 L  4774         JMS DCOMP
 12 1611    1727         FBFFR
 13 1612    7770         -10
 14 1613    4261         JMS FLOAT
 15 1614    1731         FBFFR+2
 16 1615    0004         FXPOS
 17 1616    4261         JMS FLOAT
 18 1617    1733         FBFFR+4
 19 1620    0005         FYPOS
 20 1621    4261         JMS FLOAT
 21 1622    1735         FBFFR+6
 22 1623    0006         FOFFST
 23 1624    4261         JMS FLOAT
 24 1625    1737         FBFFR+10
 25 1626    0007         FRAD
 26 1627    1330         TAD FBFFR+1
 27 1630    0373         AND (17)
 28 1631    3030         DCA FXYSP
 29 1632    1030         TAD FXYSP
 30 1633    3027         DCA FZSP
 31 1634    1337         TAD FBFFR+10
 32 1635    3031         DCA FZPK
 33 1636    1330         TAD FBFFR+1
 34 1637    0372         AND (7400)
 35 1640    3032         DCA FAUX
 36 1641    1600         TAD I FETCH
 37 1642    7640         SZA CLA
 38 1643    5600         JMP I FETCH
 39 1644    1033         TAD FDEL
 40 1645    7104         RAL CLL
 41 1646    1034         TAD FPASS
 42 1647    7004         RAL
 43 1650    1035         TAD FEOP
 44 1651    7006         RTL
 45 1652    1043         TAD FTYPE
 46 1653    7106         CLL RTL
 47 1654    7004         RAL
 48 1655    3257         DCA FETCHB
 49 1656 L  4771         JMS LTSON
 50
 51 1657    0000 FETCHB, 0
 52 1660    5600         JMP I FETCH
```

```
53
54 1661    0000 FLOAT,  0
55 1662    7240         STA
56 1663    1661         TAD I FLOAT
57 1664    3017         DCA XR8
58 1665    2261         ISZ FLOAT
59 1666    1661         TAD I FLOAT
60 1667    2261         ISZ FLOAT
61 1670    3016         DCA XR7
62 1671    1417         TAD I XR8
63 1672    3342         DCA FLTEM+1
64 1673    1417         TAD I XR8
65 1674    3343         DCA FLTEM+2
66 1675    4407         FENT
67 1676    5341         FGET FLTEM
68 1677    0017         FNOR
69 1700    6416         FPUT I XR7
70 1701    0000         FEXT
71 1702    5661         JMP I FLOAT
72
73 1703    0000 DMIGP,  0
74 1704    4407         FENT
75 1705    5004         FGET FXPOS
76 1706    2021         FSUB XLAST
77 1707    1023         FADD FSTX
78 1710    6023         FPUT FSTX
79 1711    5004         FGET FXPOS
80 1712    6021         FPUT XLAST
81 1713    5023         FGET FSTX
82
83 1714    6004         FPUT FXPOS
84 1715    5005         FGET FYPOS
85 1716    2022         FSUB YLAST
86 1717    1024         FADD FSTY
87 1720    6024         FPUT FSTY
88 1721    5005         FGET FYPOS
89 1722    6022         FPUT YLAST
90 1723    5024         FGET FSTY
91 1724    6005         FPUT FYPOS
92 1725    0000         FEXT
93 1726    5703         JMP I DMIGP
94
95 1727    0000 FBFFR,  0;0;0;0;0;0;0;0;0;0
   1730    0000
   1731    0000
   1732    0000
   1733    0000
   1734    0000
   1735    0000
   1736    0000
   1737    0000
   1740    0000

96 1741    0027 FLTEM,  27;0;0
   1742    0000
   1743    0000
97
98                      FORM

1771 L  1437
   1772 (  7400
   1773 (  0017
   1774 L  0723
   1775 (  0032
   1776 (  0007
   1777 L  1463
```

```
 1           2000              *IHA+1400
 2
 3  2000    0000  STORE,  0                    /STORE FILE RECORD
 4  2001    4251          JMS ZIPPER
 5  2002    1377          TAD (FDEL-1)
 6  2003    3011          DCA XR2
 7  2004    1376          TAD (-10)
 8  2005    3012          DCA XR3
 9
10  2006    1411  STORF,  TAD I XR2
11  2007    7104          CLL RAL
12  2010    2012          ISZ XR3
13  2011    5206          JMP STORF
14  2012    7006          RTL
15  2013    7004          RAL
16  2014    1043          TAD FTYPE
17  2015    3325          DCA STBFFR
18  2016    1043          TAD FTYPE
19  2017    1375          TAD (JMP I STJT)
20  2020    3221          DCA .+1
21  2021    7402          HLT
22
23  2022    1031  STOPB,  TAD FZPK
24  2023    3335          DCA STBFFR+10
25  2024    1027          TAD FZSP
26  2025    1032          TAD FAUX
27  2026    3326          DCA STBFFR+1
28
29  2027    4262  STORD,  JMS STUNP
30  2030    0004          FZPOS
31  2031    2127          STBFFR+2
32  2032    4262          JMS STUNP
33  2033    0006          FOFFST
34  2034    2133          STBFFR+6
35  2035    1021          TAD DISSEQ
36  2036  L 4774          JMS PUTR
37  2037    2125          STBFFR
38  2040    5600          JMP I STORE
39
40  2041    4262  STORP,  JMS STUNP
41  2042    0007          FRAD
42  2043    2135          STBFFR+10
43
44  2044    4262  STORA,  JMS STUNP
45  2045    0005          FYPOS
46  2046    2131          STBFFR+4
47  2047    1030          TAD FXYSP
48  2050    5225          JMP STORD-2
49
50  2051    0000  ZIPPER, 0
51  2052    1373          TAD (STBFFR-1)
52  2053    3017          DCA XR8

53  2054    1046          TAD RSIZE
54  2055    3016          DCA XR7
55  2056    3417          DCA I XR8
56  2057    2016          ISZ XR7
57  2060    5256          JMP .-2
58  2061    5651          JMP I ZIPPER
59
60  2062    0000  STUNP,  0
61  2063    1662          TAD I STUNP
62  2064    2262          ISZ STUNP
63  2065    3017          DCA XR8
64  2066    7240          STA
65  2067    1662          TAD I STUNP
66  2070    2262          ISZ STUNP
67  2071    3016          DCA XR7
68  2072    4407          FENT
69  2073    5417          FGET I XR8
```

```
70 2074    0011          UNNOR
71 2075    0000          FEXT
72 2076    1025          TAD HORD
73 2077    3416          DCA I XR7
74 2100    1026          TAD LORD
75 2101    3416          DCA I XR7
76 2102    5662          JMP I STUNP
77
78 2103    0000  CIRNG,  FEXT
79 2104    7001          IAC
80 2105    1057          TAD PMAXFS
81 2106    3021          DCA DISSEQ
82 2107    4200          JMS STORE
83 2110 L  4772          JMS RSEQUS
84 2111 L  4771          JMS RSEQU
85 2112    1050          TAD DISQT
86 2113    3021          DCA DISSEQ
87 2114    1370          TAD (300)
88 2115    3051          DCA VMASK
89 2116    7001          IAC
90 2117    1057          TAD PMAXFS
91 2120 L  4767          JMS FETCH
92 2121    0001          1
93 2122    1366          TAD (17)
94 2123    3030          DCA FXYSP
95 2124 L  5765          JMP CYXYD
96
97 2125    0000  STBFFR, 0;0;0;0;0;0;0;0;0;0
   2126    0000
   2127    0000
   2130    0000
   2131    0000
   2132    0000
   2133    0000
   2134    0000

2135    0000
   2136    0000
98 2137    2044  STJT,   STORA
99 2140    2041          STORP
100 2141   2022          STORB
101
102                      FORM

2165 L  3411
   2166 (  0017
   2167 L  1600
   2170 (  0300
   2171 L  3275
   2172 L  3273
   2173 (  2124
   2174 L  1502
   2175 (  5737
   2176 (  7770
   2177 (  0032

1          2200          *IHA+1600
2
3  2200    1160  PSNENT, TAD WSDEL      /POSITION ENTER
4  2201    3033          DCA FDEL
5  2202    1161          TAD WPASS
6  2203    3034          DCA FPASS
7  2204    1162          TAD WEOP
8  2205    3035          DCA FEOP
9  2206    1140          TAD WZSP
10 2207    3027          DCA FZSP
```

```
11 2210    1141           TAD WXYF
12 2211    3030           DCA FXYSP
13 2212    1142           TAD WZPK
14 2213    3031           DCA FZPK
15 2214 L  4777           JMS PGMAID
16 2215    1022           TAD ATEND
17 2216    1156           TAD WSINS
18 2217    1157           TAD WSCORR
19 2220    7650           SNA CLA
20 2221 L  5776           JMP PSNA
21 2222    1156           TAD WSINS
22 2223    7650           SNA CLA
23 2224    5232           JMP PSNB
24 2225    1020           TAD NRECS
25 2226    1044           TAD MAXFS
26 2227    7700           SMA CLA
27 2230 L  5775           JMP SQSA
28 2231    4323           JMS XPAND
29
30 2232    1145 PSNB,     TAD WAUX
31 2233    3032           DCA FAUX
32 2234    1172           TAD WOFFR
33 2235    3036           DCA FOFFR
34 2236    4407           FENT
35 2237    5000           FGET WXPOS
36 2240    6004           FPUT FXPOS
37 2241    0000           FEXT
38 2242    1163           TAD WZSET
39 2243    7640           SZA CLA
40 2244    5303           JMP PSNZ
41 2245    1146           TAD WXDIR
42 2246    3037           DCA FXDIR
43 2247    1147           TAD WYDIR
44 2250    3040           DCA FYDIR
45 2251    1171           TAD WCNTRR
46 2252    3041           DCA FCNTR
47 2253    1170           TAD WCCW
48 2254    3042           DCA FCCW
49 2255    3043           DCA FTYPE
50 2256    1164           TAD WCTLS
51 2257    7650           SNA CLA
52 2260    5270           JMP PSNLA 53 2261    1165           TAD WTOOL
54 2262    7650           SNA CLA
55 2263    5275           JMP PSNC
56 2264    4407           FENT              /LINE
57 2265    5003           FGET WRAD
58 2266    6006           FPUT FOFFST
59 2267    0000           FEXT
60
61 2270    4407 PSNLA,    FENT
62 2271    5001           FGET WYPOS
63 2272    6005           FPUT FYPOS
64 2273    0000           FEXT
65 2274 L  5774           JMP PSNST
66
67 2275    2043 PSNC,     ISZ FTYPE         /CIRCLE
68 2276    4407           FENT
69 2277    5003           FGET WRAD
70 2300    6007           FPUT FRAD
71 2301    0000           FEXT
72 2302    5270           JMP PSNLA
73
74 2303    7126 PSNZ,     STL RTL
75 2304    3043           DCA FTYPE
76 2305    4407           FENT
77 2306    5002           FGET WZPOS
78 2307    6004           FPUT FZPOS
79 2310    0000           FEXT
80
```

```
 81  2311   7344 PSNAC,   STA CLL RAL
 82  2312   1164          TAD WCTLS
 83  2313   1165          TAD WTOOL
 84  2314   7640          SZA CLA
 85  2315 L 5774          JMP PSNST
 86  2316   4407          FENT
 87  2317   5003          FGET WRAD
 88  2320   6006          FPUT FOFFST
 89  2321   0000          FEXT
 90  2322 L 5774          JMP PSNST
 91
 92  2323   0000 XPAND,   0
 93  2324   1020          TAD NRECS
 94  2325   3353          DCA PSNPA
 95
 96  2326   7240 XPANC,   STA
 97  2327   1353          TAD PSNPA
 98  2330 L 4773          JMS GETR
 99  2331   2125          STBFFR
100  2332   1353          TAD PSNPA
101  2333 L 4772          JMS PUTR
102  2334   2125          STBFFR
103  2335   7240          STA
104  2336   1353          TAD PSNPA 105  2337   3353          DCA PSNPA
106  2340   1021          TAD DISSEQ
107  2341   7041          CIA
108  2342   1353          TAD PSNPA
109  2343   7640          SZA CLA
110  2344   5326          JMP XPANC
111  2345 L 4771          JMS ZIPPER
112  2346   7001          IAC
113  2347   1020          TAD NRECS
114  2350 L 4772          JMS PUTR
115  2351   2125          STBFFR
116  2352   5723          JMP I XPAND
117
118  2353   0000 PSNPA,   0
119
120                       FORM

2371 L 2051
     2372 L 1502
     2373 L 1463
     2374 L 2443
     2375 L 1261
     2376 L 2400
     2377 L 4600

1         2400          *IHA+2000
  2
  3  2400   1043 PSNA,    TAD FTYPE
  4  2401   1377          TAD (JMP I PSNJT)
  5  2402   3203          DCA .+1
  6  2403   7402          HLT
  7
  8  2404   1164 PSNAA,   TAD WCTLS
  9  2405   7650          SNA CLA
 10  2406   5243          JMP PSNST
 11  2407   1165          TAD WTOOL
 12  2410   7650          SNA CLA
 13  2411   5221          JMP PSNAAB
```

```
14
15 2412   4407 PSNAAA, FENT
16 2413   5003         FGET WRAD
17 2414   6006         FPUT FOFFST
18 2415   0000         FEXT
19 2416   1172         TAD WOFFR
20 2417   3036         DCA FOFFR
21 2420   5243         JMP PSNST
22
23 2421   2043 PSNAAB, ISZ FTYPE
24 2422   4407         FENT
25 2423   5003         FGET WRAD
26 2424   6007         FPUT FRAD
27 2425   0000         FEXT
28 2426   1170         TAD WCCW
29 2427   3042         DCA FCCW
30 2430   1171         TAD WCNTRR
31 2431   3041         DCA FCNTR
32 2432   5243         JMP PSNST
33
34 2433   1164 PSNAB,  TAD WCTLS
35 2434   3043         DCA FTYPE
36 2435   1165         TAD WTOOL
37 2436   7640         SZA CLA
38 2437   5212         JMP PSNAAA
39 2440   1043         TAD FTYPE
40 2441   7640         SZA CLA
41 2442   5222         JMP PSNAAB+1
42
43 2443   1156 PSNST,  TAD WSINS
44 2444   1022         TAD ATEND
45 2445   7440         SZA
46 2446   2020         ISZ NRECS
47 2447   1157         TAD WSCORR
48 2450   7650         SNA CLA
49 2451   5331         JMP PSNSA
50 2452   7344         STA CLL RAL
51 2453   1043         TAD FTYPE
52 2454   7700         SMA CLA 53 2455   5331         JMP PSNSA
54 2456   1022         TAD ATEND
55 2457   7650         SNA CLA
56 2460   5331         JMP PSNSA
57 2461   1150         TAD WRPTX
58 2462   7650         SNA CLA
59 2463   5273         JMP PSNSB
60 2464   4407         FENT
61 2465   5016         FGET LASTY
62 2466   6005         FPUT FYPOS
63 2467   5015         FGET LASTX
64 2470   1013         FADD DELTAX
65 2471   6004         FPUT FXPOS
66 2472   0000         FEXT
67
68 2473   1151 PSNSB,  TAD WRPTY
69 2474   7650         SNA CLA
70 2475   5306         JMP PSNSC
71 2476   4407         FENT
72 2477   5015         FGET LASTX
73 2500   6004         FPUT FXPOS
74 2501   5016         FGET LASTY
75 2502   1014         FADD DELTAY
76 2503   6005         FPUT FYPOS
77 2504   0000         FEXT
78 2505   5313         JMP PSNSD
79
80 2506   4407 PSNSC,  FENT
81 2507   5004         FGET FXPOS
82 2510   2015         FSUB LASTX
83 2511   6013         FPUT DELTAX
84 2512   0000         FEXT
85
```

```
 86 2513      1150 PSNSD,  TAD WRPTX
 87 2514      7640         SZA CLA
 88 2515      5323         JMP PSNSE
 89 2516      4407         FENT
 90 2517      5005         FGET FYPOS
 91 2520      2016         FSUB LASTY
 92 2521      6014         FPUT DELTAY
 93 2522      0000         FEXT
 94
 95 2523      4407 PSNSE,  FENT
 96 2524      5004         FGET FXPOS
 97 2525      6015         FPUT LASTX
 98 2526      5005         FGET FYPOS
 99 2527      6016         FPUT LASTY
100 2530      0000         FEXT
101
102 2531      1053 PSNSA,  TAD AIDON
103 2532      7640         SZA CLA
104 2533 L    5776         JMP PGIMP 105 2534 L    4775         JMS STORE
106 2535      7001         IAC
107
108 2536      1021 AIDRET, TAD DISSEQ
109 2537      3143         DCA WSEQNR
110 2540 L    4774         JMS SQSLCT
111 2541      7410         SKP
112 2542 L    5773         JMP NLOOP
113 2543      1022         TAD ATEND
114 2544      7650         SNA CLA
115 2545 L    5773         JMP NLOOP
116
117 2546 L    4772 PSNXT,  JMS ZIPPER
118 2547      1021         TAD DISSEQ
119 2550 L    4771         JMS PUTR
120 2551      2125         STBFFR
121 2552 L    4774         JMS SQSLCT
122 2553 L    5773         JMP NLOOP
123 2554 L    5773         JMP NLOOP
124
125 2555      2404 PSNJT,  PSNAA
126 2556      2433         PSNAB
127 2557      2311         PSNAC
128
129                        FORM

2571 L 1502
    2572 L 2051
    2573 L 1200
    2574 L 1223
    2575 L 2000
    2576 L 4673
    2577 ( 5755

1          2600          *IHA+2200
  2
  3 2600 L 4777 RUNNER,    JMS STOPS
  4 2601   1376            TAD (6000)
  5 2602   3051            DCA WMASK
  6 2603   3052            DCA WINT
  7 2604 L 4775            JMS WORLD
  8 2605   1166            TAD WPROG
  9 2606   7640            SZA CLA
 10 2607 L 5774            JMP NLOOPR
 11
```

```
12 2610    1052 RUNG,    TAD WINT
13 2611    7450          SNA
14 2612    5200          JMP RUNNER
15 2613    1373          TAD (JMP I RUJT-1)
16 2614    3215          DCA .+1
17 2615    7402          HLT
18
19 2616 L  4772 RSEQS,   JMS SQSLCT
20 2617    5200          JMP RUNNER
21 2620 L  4771          JMS RSEQUS
22 2621    5200          JMP RUNNER
23
24 2622    1022 CYCLE,   TAD ATEND
25 2623    7650          SNA CLA
26 2624    5230          JMP CYCLF
27 2625 L  4770          JMS ERRDSP
28 2626    0002          2
29 2627    5200          JMP RUNNER
30
31 2630 L  4775 CYCLF,   JMS WORLD
32 2631    1160          TAD WSDEL
33 2632    7640          SZA CLA
34 2633    5243          JMP CYCLN
35 2634 L  4767          JMS RSEQU
36 2635    1366          TAD (300)
37 2636    3051          DCA VMASK
38 2637    1043          TAD FTYPE
39 2640    1365          TAD (JMP I ROPT)
40 2641    3242          DCA .+1
41 2642    7402          HLT
42
43 2643    1366 CYCLN,   TAD (300)
44 2644    3051          DCA VMASK
45 2645    1364          TAD (RUNNER+1)
46 2646 L  3777          DCA STOPS
47 2647 L  4775          JMS WORLD
48 2650    1161          TAD WPASS
49 2651    3333          DCA WPASST
50 2652    1166          TAD WPROG
51 2653    7640          SZA CLA
52 2654 L  5774          JMP NLOOPR 53 2655    1162          TAD WEOP
54 2656    7640          SZA CLA
55 2657    5300          JMP CYCLS
56 2660    7001          IAC
57 2661    1021          TAD DISSEQ
58 2662    7041          CIA
59 2663    1020          TAD NRECS
60 2664    7750          SPA SNA CLA
61 2665    5300          JMP CYCLS
62 2666    2021          ISZ DISSEQ
63
64 2667    7200 CYCLNA,  CLA
65 2670    1021          TAD DISSEQ
66 2671    3143          DCA WSEQNR
67 2672 L  4772          JMS SQSLCT
68 2673    7000          NOP
69 2674    1333          TAD WPASST
70 2675    7650          SNA CLA
71 2676    5200          JMP RUNNER
72 2677    5230          JMP CYCLF
73
74 2700    7240 CYCLS,   STA
75 2701    1021          TAD DISSEQ
76 2702    7510          SPA
77 2703    5267          JMP CYCLNA
78 2704    3021          DCA DISSEQ
79 2705    1021          TAD DISSEQ
80 2706 L  4763          JMS FETCH
81 2707    0001          1
```

```
82  2710        1035            TAD FEOP
83  2711        7650            SNA CLA
84  2712        5300            JMP CYCLS
85  2713        5266            JMP CYCLNA-1
86
87  2714        2616   RUJT,    RSEQS
88  2715        2622            CYCLE
89  2716        1200            NLOOP
90  2717        1200            NLOOP
91  2720        2600            RUNNER
92  2721        2600            RUNNER
93  2722        1200            NLOOP
94  2723        2600            RUNNER
95  2724        2600            RUNNER
96  2725        3400   ROPT,    CYXY
97  2726        3436            CYCCL
98  2727        3000            CYZ
99  2730        0003   FOUR,    3;2000;0
    2731        2000
    2732        0000
100 2733        0000   WPASST,  0
101
102                            FORM

2763  L  1600
    2764  (  2601
    2765  (  5725
    2766  (  0300
    2767  L  3275
    2770  L  1400
    2771  L  3273
    2772  L  1223
    2773  (  5713
    2774  L  1216
    2775  L  0600
    2776  (  6000
    2777  L  1450

1               3000            *IHA+2400
2
3               0035            ZDELT=XDEST
4
5   3000        1377   CYZ,     TAD (320)
6   3001        3051            DCA VMASK
7   3002        1376            TAD (ZERROR)
8   3003  L     3775            DCA RSEQU
9   3004        4407            FENT
10  3005        5006            FGET FOFFST
11  3006        0000            FEXT
12  3007        1036            TAD FOFFR
13  3010        7650            SNA CLA
14  3011        5215            JMP .+4
15  3012        4407            FENT
16  3013        0014            FNEG
17  3014        0000            FEXT
18  3015        4407            FENT
19  3016        5004            FGET FZPOS       /FADD FZPOS
20  3017        6034            FPUT TPY7
21  3020        2002            FSUB WZPOS
22  3021        7226            FJMP ZMF
23  3022        0004            LTZ
24  3023        0000            FEXT
25  3024        3031            DCA FZPK
26  3025        5230            JMP .+3
27
28  3026        0000   ZMF,     FEXT
29  3027        7001            IAC
30  3030        3352            DCA ZCMMD
31  3031        4407            FENT
32  3032        0006            FABS
```

```
33 3033    6021          FPUT DELTAZ
34 3034    0000          FEXT
35 3035 L  4774          JMS SFLOAT
36 3036    0031          FZPK
37 3037    0022          ZINK
38 3040    4407          FENT
39 3041    7326          FJMP ZMB
40 3042    0001          ETZ
41 3043    3344          FMPY F200
42 3044    6022          FPUT ZINK
43 3045    6023          FPUT ZINC
44 3046    5347          FGET ZIP
45 3047    6035          FPUT ZDELT
46 3050    0000          FEXT
47
48 3051    4407 ZMC,     FENT
49 3052    5021          FGET DELTAZ
50 3053    2022          FSUB ZINK
51 3054    7340          FJMP ZMD
52 3055    0005          LTZ ETZ 53 3056    6021          FPUT DELTAZ
54 3057    5035          FGET ZDELT
55 3060    1022          FADD ZINK
56 3061    6035          FPUT ZDELT
57 3062    0014          FNEG
58 3063    1002          FADD WZPOS
59 3064    6004          FPUT FZPOS
60 3065    0000          FEXT
61 3066    1027          TAD FZSP
62 3067 L  4773          JMS MOVEZ
63 3070    3070          .
64 3071    4407          FENT
65 3072    5023          FGET ZINC
66 3073    6035          FPUT ZDELT
67 3074    6024          FPUT ZDETL
68 3075    1002          FADD WZPOS
69 3076    6004          FPUT FZPOS
70 3077    0000          FEXT
71 3100    1372          TAD (20)
72 3101 L  4773          JMS MOVEZ
73 3102    3147          ZIP
74 3103    4407          FENT
75 3104    5024          FGET ZDETL
76 3105    2353          FSUB FIVE
77 3106    6035          FPUT ZDELT
78 3107    0014          FNEG
79 3110    1002          FADD WZPOS
80 3111    6004          FPUT FZPOS
81 3112    0000          FEXT
82 3113    1372          TAD (20)
83 3114 L  4773          JMS MOVEZ
84 3115    3115          .
85 3116    4407          FENT
86 3117    5353          FGET FIVE
87 3120    6035          FPUT ZDELT
88 3121    5022          FGET ZINK
89 3122    1023          FADD ZINC
90 3123    6023          FPUT ZINC
91 3124    0000          FEXT
92 3125    5251          JMP ZMC
93
94 3126    4407 ZMB,     FENT
95 3127    5021          FGET DELTAZ
96 3130    6035          FPUT ZDELT
97
98 3131    5034 ZME,     FGET TPY7
99 3132    6004          FPUT FZPOS
100 3133   0000          FEXT
101 3134   1027          TAD FZSP
102 3135 L 4773          JMS MOVEZ
103 3136   3152          ZCMMD
104 3137 L 5771          JMP CYAUX
```

```
105
106 3140    1022 ZMD,    FADD ZINK
107 3141    6035         FPUT ZDELT
108 3142    7331         FJMP ZME
109 3143    0007         UNK
110
111 3144    0011 F200,   11;3100;0
    3145    3100
    3146    0000
112 3147    0000 ZIP,    0;0;0
    3150    0000
    3151    0000
113 3152    0000 ZCMMD,  0
114 3153    0005 FIVE,   5;2400;0
    3154    2400
    3155    0000
115                      FORM

3171 L 1530
    3172 ( 0020
    3173 L 3200
    3174 L 3246
    3175 L 3275
    3176 ( 3270
    3177 ( 0320

1         3200          *IHA+2600
 2
 3  3200   0000 MOVEZ,   0
 4  3201   3030          DCA FXYSP
 5  3202   1600          TAD I MOVEZ
 6  3203   2200          ISZ MOVEZ
 7  3204   3350          DCA ZCPT
 8  3205   1750          TAD I ZCPT
 9  3206   7650          SNA CLA
10
11  3207   1377 MOVEZA,  TAD (-40)
12  3210   1376          TAD (70)
13  3211 L 3775          DCA XYXM
14  3212   4407          FENT
15  3213 L 5774          FGET ZIP
16  3214   6036          FPUT YDEST
17  3215   6001          FPUT WYPOS
18  3216   6000          FPUT WXPOS
19  3217   0000          FEXT
20  3220 L 4773          JMS BSTL
21  3221   7000          NOP
22  3222 L 4772          JMS WORLD
23  3223 L 4772          JMS WORLD
24  3224 L 4772          JMS WORLD
25  3225 L 4772          JMS WORLD
26  3226   4407          FENT
27  3227   5004          FGET FZPOS
28  3230   2002          FSUB WZPOS
29  3231   7244          FJMP MOVEZC
30  3232   0001          EIZ
31  3233   7240          FJMP MOVEZB
32  3234   0004          LTZ
33  3235   6035          FPUT ZDELT
34  3236   0000          FEXT
35  3237   5207          JMP MOVEZA
36
37  3240   0014 MOVEZB,  FNEG
38  3241   6035          FPUT ZDELT
39  3242   0000          FEXT
40  3243   5210          JMP MOVEZA+1
41
42  3244   0000 MOVEZC,  FEXT
43  3245   5600          JMP I MOVEZ
```

```
44
45  3246    0000  SFLOAT,  0
46  3247    1646           TAD I SFLOAT
47  3250    3026           DCA LORD
48  3251    1426           TAD I LORD
49  3252    7110           CLL RAR
50  3253    3353           DCA SFLTEM+1
51  3254    7010           RAR
52  3255    3354           DCA SFLTEM+2

53  3256    2246           ISZ SFLOAT
54  3257    1646           TAD I SFLOAT
55  3260    2246           ISZ SFLOAT
56  3261    3351           DCA SFPTR
57  3262    4407           FENT
58  3263    5352           FGET SFLTEM
59  3264    0017           FNOR
60  3265    6751           FPUT I SFPTR
61  3266    0000           FEXT
62  3267    5646           JMP I SFLOAT
63
64  3270 L  4771  ZERROR,  JMS ERRDSP
65  3271    0003           3
66  3272 L  5770           JMP RUNNER
67
68  3273    0000  RSEQUS,  0
69  3274    5673           JMP I RSEQUS
70
71  3275    0000  RSEQU,   0
72  3276    1273           TAD RSEQUS
73  3277    7650           SNA CLA
74  3300    5675           JMP I RSEQU
75  3301    3273           DCA RSEQUS
76  3302    1367           TAD (RSEQST)
77  3303 L  3766           DCA STOPS
78  3304    1365           TAD (320)
79  3305    3051           DCA VMASK
80  3306    4407           FENT
81  3307 L  5764           FGET BIGGY
82  3310    6035           FPUT ZDELT
83  3311    0000           FEXT
84  3312    1363           TAD (20)
85  3313    4200           JMS MOVEZ
86  3314    3147           ZIP
87
88  3315    1362  RSEQUR,  TAD (300)
89  3316    3051           DCA VMASK
90  3317    1361           TAD (-20)
91  3320    3350           DCA ZCPT
92  3321 L  4772           JMS WORLD
93  3322    2350           ISZ ZCPT
94  3323    5321           JMP .-2
95  3324    4407           FENT
96  3325 L  5760           FGET F2000
97  3326    6035           FPUT ZDELT
98  3327    0014           FNEG
99  3330    1002           FADD WZPOS
100 3331    6004           FPUT FZPOS
101 3332    0000           FEXT
102 3333    1363           TAD (20)
103 3334    4200           JMS MOVEZ
104 3335    3335           .

105 3336    1021           TAD DISSEQ
106 3337 L  4757           JMS FETCH
107 3340    0001           1
108 3341    5675           JMP I RSEQU
109
110 3342    1050  RSEQST,  TAD DISQT
111 3343    3021           DCA DISSEQ
112 3344    1021           TAD DISSEQ
113 3345 L  4757           JMS FETCH
```

```
114 3346    0001                1
115 3347 L  5770                JMP RUNNER
116
117 3350    0000  ZCPT,         0
118 3351    0000  SFPTR,        0
119 3352    0014  SFLTEM,       14;0;0
    3353    0000
    3354    0000
120                             FORM

3357 L  1600
    3360 L  3512
    3361 (  7760
    3362 (  0300
    3363 (  0020
    3364 L  3507
    3365 (  0320
    3366 L  1450
    3367 (  3342
    3370 L  2600
    3371 L  1400
    3372 L  0600
    3373 L  3706
    3374 L  3147
    3375 L  3764
    3376 (  0070
    3377 (  7740

121         3400                *IHA+3000
122
123 3400    1377  CYXY,         TAD (3000)
124 3401 L  3776                DCA XYXM
125 3402    4261                JMS MIRROR
126 3403    1167                TAD WNBLTU
127 3404    7640                SZA CLA
128 3405    5211                JMP CYXYD
129 3406 L  4775                JMS BLTUP
130 3407 L  4774                JMS BSTL
131 3410    7000                NOP
132
133 3411    4407  CYXYD,        FENT
134 3412    5004                FGET FXPOS
135 3413    6035                FPUT XDEST
136 3414    5005                FGET FYPOS
137 3415    6036                FPUT YDEST
138 3416    0000                FEXT
139
140 3417 L  4773  CYXYE,        JMS WORLD
141 3420 L  4773                JMS WORLD
142 3421 L  4773                JMS WORLD
143
144 3422    1377  CYXYF,        TAD (3000)
145 3423 L  3776                DCA XYXM
146 3424 L  4773                JMS WORLD
147 3425 L  4774                JMS BSTL
148 3426    5217                JMP CYXYE
149 3427 L  4773                JMS WORLD
150 3430 L  4773                JMS WORLD
151 3431 L  4773                JMS WORLD
152 3432 L  4773                JMS WORLD
153 3433 L  4774                JMS BSTL
154 3434 L  5772                JMP CYAUX
155 3435 L  5772                JMP CYAUX
156
157 3436 L  4771  CYCCL,        JMS FPSS
158 3437    4261                JMS MIRROR
159 3440    7344                STA CLL RAL
160 3441    1154                TAD WNMX
161 3442    1155                TAD WNMY
162 3443    7450                SNA
163 3444 L  5770                JMP CYCIR
```

```
164 3445    7001            IAC
165 3446    7640            SZA CLA
166 3447 L  5770            JMP CYCIR
167 3450    1042            TAD FCCW
168 3451    7650            SNA CLA
169 3452    7001            IAC
170 3453    3042            DCA FCCW
171 3454    1041            TAD FCNTR
172 3455    7650            SNA CLA 173 3456    7001            IAC
174 3457    3041            DCA FCNTR
175 3460 L  5770            JMP CYCIR
176
177 3461    0000  MIRROR,   0
178 3462    1154            TAD WNMX
179 3463    7640            SZA CLA
180 3464    5272            JMP CYXYA
181 3465    4407            FENT
182 3466    5004            FGET FXPOS
183 3467    0014            FNEG
184 3470    6004            FPUT FXPOS
185 3471    0000            FEXT
186
187 3472    1155  CYXYA,    TAD WNMY
188 3473    7640            SZA CLA
189 3474    5661            JMP I MIRROR
190 3475    4407            FENT
191 3476    5005            FGET FYPOS
192 3477    0014            FNEG
193 3500    6005            FPUT FYPOS
194 3501    0000            FEXT
195 3502    5661            JMP I MIRROR
196
197 3503    6001  STALL,    ION
198 3504 L  4767            JMS ERRDSP
199 3505    0005            5
200 3506 L  5766            JMP RUNNER
201
202 3507    0027  BIGGY,    27;3777;7777
    3510    3777
    3511    7777
203 3512    0012  F2000,    12;3720;0
    3513    3720
    3514    0000
204
205 3515    7300  STRTSP,   7300
206 3516    3650            3650
207 3517    1650            1650
208 3520    0750            750
209 3521    0420            420
210 3522    0300            300
211 3523    0205            205
212 3524    0150            150
213 3525    0120            120
214 3526    0120            120
215 3527    0120            120
216 3530    0120            120
217 3531    0120            120
218 3532    0120            120
219 3533    0120            120
220 3534    0120            120

221 3535    0120            120
222 3536    7300  STOPSP,   7300
223 3537    3650            3650
224 3540    1650            1650
225 3541    0750            750
226 3542    0420            420
227 3543    0300            300
228 3544    0205            205
```

```
229  3545    0150           150
230  3546    0120           120
231  3547    0105           105
232  3550    0073           73
233  3551    0057           57
234  3552    0045           45
235  3553    0033           33
236  3554    0025           25
237  3555    0012           12
238  3556    0007           7
239
240                         FORM

3566 L  2600
     3567 L  1400
     3570 L  4400
     3571 L  0217
     3572 L  1530
     3573 L  0600
     3574 L  3706
     3575 L  3600
     3576 L  3764
     3577 (  3000

1          3600           *IHA+3200
  2
  3  3600    0000  BLTUP,   0
  4  3601    1037           TAD FXDIR
  5  3602    3140           DCA FDIR
  6  3603    1146           TAD WXDIR
  7  3604    3141           DCA WDIR
  8  3605    4407           FENT
  9  3606    5000           FGET WXPOS
 10  3607    6024           FPUT POSN
 11  3610    5004           FGET FXPOS
 12  3611    6023           FPUT DESTN
 13  3612    0000           FEXT
 14  3613    4240           JMS BLTCOM
 15  3614    4407           FENT
 16  3615    5023           FGET DESTN
 17  3616    6035           FPUT XDEST
 18  3617    0000           FEXT
 19  3620    1040           TAD FYDIR
 20  3621    3140           DCA FDIR
 21  3622    1147           TAD WYDIR
 22  3623    3141           DCA WDIR
 23  3624    4407           FENT
 24  3625    5001           FGET WYPOS
 25  3626    6024           FPUT POSN
 26  3627    5005           FGET FYPOS
 27  3630    6023           FPUT DESTN
 28  3631    0000           FEXT
 29  3632    4240           JMS BLTCOM
 30  3633    4407           FENT
 31  3634    5023           FGET DESTN
 32  3635    6036           FPUT YDEST
 33  3636    0000           FEXT
 34  3637    5600           JMP I BLTUP
 35
 36  3640    0000  BLTCOM,  0
 37  3641    4407           FENT
 38  3642    5024           FGET POSN
 39  3643    2023           FSUB DESTN
 40  3644    7272           FJMP BLTCA
 41  3645    0006           LTZ GTZ
 42  3646    0000           FEXT
 43  3647    1140           TAD FDIR
 44  3650    7041           CIA
 45  3651    1141           TAD WDIR
 46  3652    7450           SNA
 47  3653    5640           JMP I BLTCOM
```

```
 48 3654    7700            SMA CLA
 49 3655    5264            JMP BLTCB
 50
 51 3656    4407 BLTCC,     FENT
 52 3657    5361            FGET BLAM 53 3660    1023            FADD DESTN
 54 3661    6023            FPUT DESTN
 55 3662    0000            FEXT
 56 3663    5640            JMP I BLTCOM
 57
 58 3664    4407 BLTCB,     FENT
 59 3665    5023            FGET DESTN
 60 3666    2361            FSUB BLAM
 61 3667    6023            FPUT DESTN
 62 3670    0000            FEXT
 63 3671    5640            JMP I BLTCOM
 64
 65 3672    7301 BLTCA,     FJMP BLTCD
 66 3673    0002            GTZ
 67 3674    0000            FEXT
 68 3675    1140            TAD FDIR
 69 3676    7640            SZA CLA
 70 3677    5640            JMP I BLTCOM
 71 3700    5256            JMP BLTCC
 72
 73 3701    0000 BLTCD,     FEXT
 74 3702    1140            TAD FDIR
 75 3703    7640            SZA CLA
 76 3704    5264            JMP BLTCB
 77 3705    5640            JMP I BLTCOM
 78
 79 3706    0000 BSTL,      0
 80 3707    3142            DCA SCORE
 81 3710    4407            FENT
 82 3711    5035            FGET XDEST
 83 3712    2000            FSUB WXPOS
 84 3713    7321            FJMP BSTLA6
 85 3714    0003            GTZ ETZ
 86 3715    0014            FNEG
 87 3716    0000            FEXT
 88 3717    2142            ISZ SCORE
 89 3720    4407            FENT
 90
 91 3721    0011 BSTLA6,    UNNOR
 92 3722    6175            FPUT DELX
 93 3723    5036            FGET YDEST
 94 3724    2001            FSUB WYPOS
 95 3725    7334            FJMP BSTLA7
 96 3726    0003            GTZ ETZ
 97 3727    0014            FNEG
 98 3730    0000            FEXT
 99 3731    2142            ISZ SCORE
100 3732    2142            ISZ SCORE
101 3733    4407            FENT
102
103 3734    0011 BSTLA7,    UNNOR
104 3735    6172            FPUT DELY 105 3736    2175            FSUB DELX
106 3737    7352            FJMP BSTLA1
107 3740    0005            LTZ ETZ
108 3741    5175            FGET DELX
109 3742    6167            FPUT MOD
110 3743    5172            FGET DELY
111 3744    6175            FPUT DELX
112 3745    5167            FGET MOD
113 3746    6172            FPUT DELY
114 3747    0000            FEXT
115 3750    1365            TAD XYXM+1
116 3751    5354            JMP .+3
```

```
117
118 3752    0000 BSTLA1, FEXT
119 3753    1364         TAD XYXM
120 3754    3143         DCA MAJOR
121 3755 L  4777         JMS BSTLM
122 3756    5706         JMP I BSTL
123 3757    2306         ISZ BSTL
124 3760    5706         JMP I BSTL
125
126         0140         FDIR=140
127         0141         WDIR=141
128         0142         SCORE=142
129
130 3761    0006 BLAM,   6;2400;0
    3762    2400
    3763    0000
131
132         0175         DELX=175
133         0172         DELY=172
134         0167         MOD=167
135
136 3764    3000 XYXM,   3000
137 3765    0300         300
138                      FORM

3777 L  4000
  1         4000         *IHA+3400
  2
  3 4000    0000 BSTLM,  0
  4 4001    4407         FENT
  5 4002    5175         FGET DELX
  6 4003    7334         FJMP BSTLMX
  7 4004    0001         ETZ
  8 4005    6167         FPUT MOD
  9 4006    0014         FNEG
 10 4007    6164         FPUT COUNT
 11 4010    6175         FPUT DELX
 12 4011    0000         FEXT
 13 4012    1142         TAD SCORE
 14 4013    1347         TAD XYCM
 15 4014    3215         DCA .+1
 16 4015    7402         HLT
 17 4016    1065         TAD LASTZ
 18 4017    3144         DCA MINOR
 19 4020    1143         TAD MAJOR
 20 4021    0377         AND (70)
 21 4022    7640         SZA CLA
 22 4023    5337         JMP BSTLMC
 23 4024    1144         TAD MINOR
 24 4025    0376         AND (4400)
 25 4026    3066         DCA LASTXY
 26 4027    1066         TAD LASTXY
 27 4030    1065         TAD LASTZ
 28 4031    6362         6362
 29 4032    1143         TAD MAJOR
 30
 31 4033    3143 BSTLMD, DCA MAJOR
 32 4034    2166         ISZ COUNT+2
 33 4035    2166         ISZ COUNT+2
 34 4036    2166         ISZ COUNT+2
 35 4037    1170         TAD MOD+1
 36 4040    7110         CLL RAR
 37 4041    3170         DCA MOD+1
 38 4042    1171         TAD MOD+2
 39 4043    7010         RAR
 40 4044    3171         DCA MOD+2
 41 4045    4407         FENT
 42 4046    5010         FGET SPEEDS
 43 4047    0011         UNNOR
 44 4050    0000         FEXT
 45 4051    1026         TAD LORD
 46 4052    7041         CIA
 47 4053    3145         DCA SRSET
```

```
48 4054    7240           STA
49 4055    3162           DCA FLAT+1
50 4056    7240           STA
51 4057    3163           DCA FLAT+2

52 4060    7001           IAC
53 4061    3147           DCA RAMPI
54 4062    1375           TAD (STRTSP)
55 4063    1030           TAD FXYSP
56 4064    3266           DCA .+2
57 4065 L  4774           JMS SFLOAT
58 4066    0000           0
59 4067    0025           TPY0
60 4070    1666           TAD I .-2
61 4071    7041           CIA
62 4072    3146           DCA RAMPS
63 4073    1373           TAD (STOPSP)
64 4074    1030           TAD FXYSP
65 4075    3277           DCA .+2
66 4076 L  4774           JMS SFLOAT
67 4077    0000           0
68 4100    0026           TPY1
69 4101    4407           FENT
70 4102    0014           FNEG
71 4103    1025           FADD TPY0
72 4104    3010           FMPY SPEEDS
73 4105    7330           FJMP BSTLMA
74 4106    0005           ETZ LTZ
75 4107    0011           UNNOR
76 4110    0014           FNEG
77 4111    6156           FPUT RAMPV
78 4112    1156           FADD RAMPV
79 4113    2164           FSUB COUNT
80 4114    7323           FJMP BSTLMB
81 4115    0002           GTZ
82 4116    5167           FGET MOD
83 4117    0014           FNEG
84 4120    6156           FPUT RAMPV
85 4121    0000           FEXT
86 4122 L  5772           JMP BSTLG
87
88 4123    0011 BSTLMB,   UNNOR
89 4124    0014           FNEG
90 4125    6161           FPUT FLAT
91 4126    0000           FEXT
92 4127 L  5772           JMP BSTLG
93
94 4130    5164 BSTLMA,   FGET COUNT
95 4131    6161           FPUT FLAT
96 4132    0000           FEXT
97 4133 L  5771           JMP BSTLGA
98
99 4134    0000 BSTLMX,   FEXT
100 4135   2200           ISZ BSTLM
101
102 4136   5600 BSTLMR,   JMP I BSTLM
103 4137   1143 BSTLMC,   TAD MAJOR 104 4140   0370           AND (40)
105 4141   3065           DCA LASTZ
106 4142   1065           TAD LASTZ
107 4143   1066           TAD LASTXY
108 4144   6362           6362
109 4145   1367           TAD (30)
110 4146   5233           JMP BSTLMD
111
112        0143           MAJOR=143
113        0144           MINOR=144
114        0164           COUNT=164
115        0145           SRSET=145
116        0161           FLAT=161
117        0156           RAMPV=156
```

```
118      0154           UPDOWN=154
119      0146           RAMPS=146
120      0010           SPEEDS=STEPS
121      0147           RAMPI=147
122
123 4147 1350 XYCM,     TAD .+1
124 4150 3300           3300
125 4151 7300           7300
126 4152 3700           3700
127 4153 7700           7700
128
129                     FORM 4167 ( 0030
     4170 ( 0040
     4171 L 4207
     4172 L 4200
     4173 ( 3536
     4174 L 3246
     4175 ( 3515
     4176 ( 4400
     4177 ( 0070

130      4200           *IHA+3600
131
132 4200 1145 BSTLG,    TAD SRSET
133 4201 3150           DCA SPNOW
134 4202 1157           TAD RAMPV+1
135 4203 3154           DCA UPDOWN
136 4204 1160           TAD RAMPV+2
137 4205 3155           DCA UPDOWN+1
138 4206 4224           JMS BSTGO
139
140 4207 1162 BSTLGA,   TAD FLAT+1
141 4210 3154           DCA UPDOWN
142 4211 1163           TAD FLAT+2
143 4212 3155           DCA UPDOWN+1
144 4213 3147           DCA RAMPI
145 4214 4224           JMS BSTGO
146 4215 1157           TAD RAMPV+1
147 4216 3154           DCA UPDOWN
148 4217 1160           TAD RAMPV+2
149 4220 3155           DCA UPDOWN+1
150 4221 7240           STA
151 4222 3147           DCA RAMPI
152 4223 4224           JMS BSTGO
153
154 4224 0000 BSTGO,    0
155 4225 7300           CLA CLL
156 4226 1171           TAD MOD+2
157 4227 1174           TAD DELY+2
158 4230 3171           DCA MOD+2
159 4231 7004           RAL
160 4232 1170           TAD MOD+1
161 4233 1173           TAD DELY+1
162 4234 3170           DCA MOD+1
163 4235 7300           CLA CLL
164 4236 1177           TAD DELX+2
165 4237 1171           TAD MOD+2
166 4240 3167           DCA MOD
167 4241 7004           RAL
168 4242 1170           TAD MOD+1
169 4243 1176           TAD DELX+1
170 4244 7510           SPA
171 4245 5255           JMP BSTGOB
172 4246 3170           DCA MOD+1
173 4247 1167           TAD MOD
174 4250 3171           DCA MOD+2
175 4251 7240           STA
176 4252 3320           DCA MINI
177 4253 1144           TAD MINOR
```

```
178 4254   5264         JMP BSTG09
179
180 4255   7200 BSTG08, CLA
181 4256   3320         DCA MINI 182 4257   3320         DCA MINI
183 4260   3320         DCA MINI
184 4261   3320         DCA MINI
185 4262   1143         TAD MAJOR
186 4263   7000         NOP
187
188 4264   6362 BSTG09, 6362
189 4265   7200         CLA
190 4266   2166         ISZ COUNT+2
191 4267   5273         JMP .+4
192 4270   2165         ISZ COUNT+1
193 4271   7410         SKP
194 4272 L 5777         JMP BSTLMR
195 4273   1146         TAD RAMPS
196 4274   3151         DCA RAMPT
197 4275   7344         STA CLL RAL
198 4276   1320         TAD MINI
199 4277   3152         DCA RAMPQ
200 4300   2152         ISZ RAMPQ
201 4301   5300         JMP .-1
202 4302   2151         ISZ RAMPT
203 4303   5275         JMP .-6
204 4304   2150         ISZ SPNOW
205 4305   5313         JMP .+6
206 4306   1145         TAD SRSET
207 4307   3150         DCA SPNOW
208 4310   1147         TAD RAMPI
209 4311   1146         TAD RAMPS
210 4312   3146         DCA RAMPS
211 4313   2155         ISZ UPDOWN+1
212 4314   5225         JMP BSTGO+1
213 4315   2154         ISZ UPDOWN
214 4316   5225         JMP BSTGO+1
215 4317   5624         JMP I BSTGO
216
217 4320   0000 MINI,   0
218
219        0150         SPNOW=150
220        0151         RAMPT=151
221        0152         RAMPQ=152
222
223                     FORM 224 4321   0000 TAPNCH, 0
225 4322   3012         DCA XR3
226 4323 L 1776         TAD PDONE
227 4324   7650         SNA CLA
228 4325   5323         JMP .-2
229 4326 L 3776         DCA PDONE
230 4327   1012         TAD XR3
231 4330   6046         TLS
232 4331   7200         CLA
233 4332   5721         JMP I TAPNCH
234
235 4333   0000 TAPRR,  0
236 4334 L 3775         DCA CDONE
237 4335 L 1775         TAD CDONE
238 4336   7450         SNA
239 4337   5335         JMP .-2
240 4340   1374         TAD (-202)
241 4341   7450         SNA
242 4342 L 5773         JMP CLEAR       /EOT
243 4343   7001         IAC
244 4344   7450         SNA
245 4345   5353         JMP TAPRC       /12
```

```
246  4346    7001           IAC
247  4347    7640           SZA CLA
248  4350 L  1775           TAD CDONE
249  4351    0372           AND (77)
250  4352    5733           JMP I TAPRR
251
252  4353    1371   TAPRC,  TAD (12)
253  4354    5733           JMP I TAPRR
254                         FORM 4371 ( 0012
     4372 ( 0077
     4373 L 1272
     4374 ( 7576
     4375 L 0562
     4376 L 0561
     4377 L 4136

1           4400           *IHA+4000
 2
 3    4400   4407   CYCIR,  FENT
 4    4401   5000           FGET WXPOS
 5    4402   2037           FSUB XPOSA
 6    4403   0001           FSQ
 7    4404   6025           FPUT TPY0
 8    4405   5001           FGET WYPOS
 9    4406   2040           FSUB YPOSA
10    4407   0001           FSQ
11    4410   1025           FADD TPY0
12    4411   0002           FSQRT
13    4412 L 2777           FSUB FOUR
14    4413 L 2777           FSUB FOUR
15    4414 L 7776           FJMP CIRNG
16    4415   0002           GTZ
17    4416   5004           FGET FXPOS
18    4417   2037           FSUB XPOSA
19    4420   6025           FPUT TPY0
20    4421   4346           FDIV CIRTWO
21    4422   1037           FADD XPOSA
22    4423   6021           FPUT CIRXM
23    4424   2037           FSUB XPOSA
24    4425   0001           FSQ
25    4426   6024           FPUT CIRMC
26    4427   5005           FGET FYPOS
27    4430   2040           FSUB YPOSA
28    4431   6026           FPUT TPY1
29    4432   4346           FDIV CIRTWO
30    4433   1040           FADD YPOSA
31    4434   6022           FPUT CIRYM
32    4435   2040           FSUB YPOSA
33    4436   0001           FSQ
34    4437   1024           FADD CIRMC
35    4440   6024           FPUT CIRMC
36    4441   5007           FGET FRAD
37    4442   0001           FSQ
38    4443   2024           FSUB CIRMC
39    4444   0002           FSQRT
40    4445   6024           FPUT CIRMC
41    4446   3025           FMPY TPY0
42    4447   6027           FPUT TPY2
43    4450   5026           FGET TPY1
44    4451   3024           FMPY CIRMC
45    4452   6030           FPUT TPY3
46    4453   5026           FGET TPY1
47    4454   0001           FSQ
48    4455   6023           FPUT CIRAB
49    4456   5025           FGET TPY0
50    4457   0001           FSQ
51    4460   1023           FADD CIRAB
52    4461   0002           FSQRT
```

```
53  4462    6023            FPUT CIRAB
54  4463    2351            FSUB CF40
55  4464    7333            FJMP CYCIRX
56  4465    0005            LTZ ETZ
57  4466    5023            FGET CIRAB
58  4467    2007            FSUB FRAD
59  4470    2007            FSUB FRAD
60  4471    7342            FJMP CIRROR
61  4472    0002            GTZ
62  4473    0000            FEXT
63  4474    1041            TAD FCNTR
64  4475    7640            SZA CLA
65  4476    5305            JMP .+7
66  4477    4407            FENT
67  4500    5030            FGET TPY3
68  4501    0014            FNEG
69  4502    6030            FPUT TPY3
70  4503    0000            FEXT
71  4504    5312            JMP .+6
72  4505    4407            FENT
73  4506    5027            FGET TPY2
74  4507    0014            FNEG
75  4510    6027            FPUT TPY2
76  4511    0000            FEXT
77  4512    4407            FENT
78  4513    5027            FGET TPY2
79  4514    4023            FDIV CIRAB
80  4515    1022            FADD CIRYM
81  4516    0012            FRND
82  4517    0011            UNNOR
83  4520    0017            FNOR
84  4521    6012            FPUT YCNTR
85  4522    5030            FGET TPY3
86  4523    4023            FDIV CIRAB
87  4524    1021            FADD CIRXM
88  4525    0012            FRND
89  4526    0011            UNNOR
90  4527    0017            FNOR
91  4530    6011            FPUT XCNTR
92  4531    0000            FEXT
93  4532    4447            JMS I CIRCLE
94
95  4533    0000  CYCIRX,   FEXT
96  4534    1030            TAD FXYSP
97  4535    0375            AND (10)
98  4536    7450            SNA
99  4537    1030            TAD FXYSP
100 4540    3030            DCA FXYSP
101 4541 L  5774            JMP CYXYF
102
103 4542    0000  CIRROR,   FEXT
104 4543 L  4773            JMS ERRDSP 105 4544    0004            4
106 4545 L  5772            JMP RUNNER
107
108 4546    0002  CIRTWO,   2;2000;0
    4547    2000
    4550    0000
109 4551    0006  CF40,     6;2400;0
    4552    2400
    4553    0000
110                         FORM

4572 L  2600
    4573 L  1400
    4574 L  3422
    4575 (  0010
    4576 L  2103
    4577 L  2730
```

```
111        4600            *IHA+4200
112
113 4600   0000   PGMAID,  0
114 4601   3053            DCA AIDON
115 4602   1150            TAD WRPTX
116 4603   1151            TAD WRPTY
117 4604   1153            TAD WRPTN
118 4605   1152            TAD WRPTP
119 4606   7650            SNA CLA
120 4607   5600            JMP I PGMAID
121 4610   1022            TAD ATEND
122 4611   7650            SNA CLA
123 4612 L 5777            JMP PGME8
124 4613 L 4776            JMS LTSOFF
125 4614   1400            1400
126 4615   1152            TAD WRPTP
127 4616   7640            SZA CLA
128 4617   5225            JMP PGMA
129 4620   1153            TAD WRPTN
130 4621   7650            SNA CLA
131 4622   5600            JMP I PGMAID
132 4623   1144            TAD WNCNT
133 4624   7041            CIA
134
135 4625   3144   PGMA,    DCA WNCNT
136 4626   1021            TAD DISSEQ
137 4627   3054            DCA TDISQ
138 4630   3055            DCA RCNT
139
140 4631   7240   PGMD,    STA
141 4632   1054            TAD TDISQ
142 4633   7510            SPA
143 4634   5251            JMP PGMJ
144 4635   3054            DCA TDISQ
145 4636   1054            TAD TDISQ
146 4637 L 4775            JMS FETCH
147 4640   0001            1
148 4641   1035            TAD FEOP
149 4642   7640            SZA CLA
150 4643   5250            JMP PGMJ-1
151 4644   2055            ISZ RCNT
152 4645   2144            ISZ WNCNT
153 4646   5231            JMP PGMD
154 4647   7410            SKP
155 4650   2054            ISZ TDISQ
156
157 4651   1144   PGMJ,    TAD WNCNT
158 4652   7710            SPA CLA
159 4653 L 5774            JMP PGME7
160
161 4654   1055   PGMF,    TAD RCNT
162 4655   7450            SNA 163 4656 L 5774            JMP PGME7
164 4657   1044            TAD MAXFS
165 4660   1020            TAD NRECS
166 4661   7740            SMA SZA CLA
167 4662 L 5773            JMP SQSA
168 4663   4407            FENT
169 4664   5004            FGET FXPOS
170 4665   6021            FPUT XLAST
171 4666   5005            FGET FYPOS
172 4667   6022            FPUT YLAST
173 4670   0000            FEXT
174 4671   2053            ISZ AIDON
175 4672   5600            JMP I PGMAID
176
177 4673   1055   PGIMP,   TAD RCNT
178 4674   7041            CIA
179 4675   3055            DCA RCNT
180 4676   1043            TAD FTYPE
181 4677   3056            DCA TFTYPE
```

```
182 4700    4407           FENT
183 4701    5004           FGET FXPOS
184 4702    6023           FPUT FSTX
185 4703    5005           FGET FYPOS
186 4704    6024           FPUT FSTY
187 4705    0000           FEXT
188 4706    1054           TAD TDISQ
189 4707 L  4775           JMS FETCH
190 4710    0001           1
191 4711    1043           TAD FTYPE
192 4712    7041           CIA
193 4713    1056           TAD TFTYPE
194 4714    7640           SZA CLA
195 4715 L  5774           JMP PGME7
196 4716    3051           DCA VMASK
197 4717 L  4772           JMS DMIGP
198
199 4720    1021  PGIME,   TAD DISSEQ
200 4721 L  4771           JMS BINBCD
201 4722 L  4770           JMS STORE
202 4723    2021           ISZ DISSEQ
203 4724    2054           ISZ TDISQ
204 4725    2055           ISZ RCNT
205 4726    7410           SKP
206 4727    5337           JMP PGIMF
207 4730    2020           ISZ NRECS
208 4731    1054           TAD TDISQ
209 4732 L  4775           JMS FETCH
210 4733    0001           1
211 4734    4344           JMS PGCOMP
212 4735 L  4772           JMS DMIGP
213 4736    5320           JMP PGIME
214

215 4737    1021  PGIMF,   TAD DISSEQ
216 4740    1044           TAD MAXFS
217 4741    7650           SNA CLA
218 4742    7240           STA
219 4743 L  5767           JMP AIDRET
220
221 4744    0000  PGCOMP,  0
222 4745    1056           TAD TFTYPE
223 4746    1366           TAD (TAD FTXFRM)
224 4747    3350           DCA .+1
225 4750    7402           HLT
226 4751    3017           DCA XR8
227 4752    1043           TAD FTYPE
228 4753    1366           TAD (TAD FTXFRM)
229 4754    3355           DCA .+1
230 4755    7402           HLT
231 4756    7041           CIA
232 4757    1017           TAD XR8
233 4760    7640           SZA CLA
234 4761    2344           ISZ PGCOMP
235 4762    5744           JMP I PGCOMP
236
237 4763    0000  FTXFRM,  0
238 4764    0000           0
239 4765    0001           1
240
241         0021           XLAST=DELTAZ
242         0022           YLAST=ZINK
243         0023           FSTX=ZINC
244         0024           FSTY=ZDETL
245
246                        FORM 4766 ( 1363
         4767 L 2536
         4770 L 2000
```

```
                4771 L 1305
                4772 L 1703
                4773 L 1261
                4774 L 0347
                4775 L 1600
                4776 L 1453
                4777 L 0352

247         5000                    *IHA+4400
248
249  5000    6442    TAPER,   6442              /TAPE ROUTINES
250  5001    3023             DCA LIGHTV
251  5002 L  4777             JMS LTSON
252  5003    2000             2000
253  5004    1376             TAD (100)
254  5005    3051             DCA VMASK
255  5006    3050             DCA DISQT
256  5007    1173             TAD WPNCH
257  5010    7640             SZA CLA
258  5011    5243             JMP TAPEP         /PUNCH
259  5012    1375             TAD (CLEAR)
260  5013 L  3774             DCA STOPS
261  5014    3020             DCA NRECS
262  5015    6032             KCC
263
264  5016    1046    TAPRA,   TAD RSIZE
265  5017    3016             DCA XR7
266  5020    1050             TAD DISQT
267  5021 L  4773             JMS BINBCD
268  5022    1372             TAD (FBFFR-1)
269  5023    3017             DCA XR8
270
271  5024 L  4771    TAPRB,   JMS TAPRR
272  5025    7106             CLL RTL
273  5026    7006             RTL
274  5027    7006             RTL
275  5030    3015             DCA XR6
276  5031 L  4771             JMS TAPRR
277  5032    1015             TAD XR6
278  5033    3417             DCA I XR8
279  5034    2016             ISZ XR7
280  5035    5224             JMP TAPRB
281  5036    1050             TAD DISQT
282  5037 L  4770             JMS PUTR
283  5040    1727             FBFFR
284  5041    2050             ISZ DISQT
285  5042    5216             JMP TAPRA
286
287  5043    1367    TAPEP,   TAD (TAPPD)
288  5044 L  3774             DCA STOPS
289  5045    1020             TAD NRECS
290  5046    7450             SNA
291  5047 L  5766             JMP CLEARR
292  5050    7041             CIA
293  5051    3014             DCA XR5
294  5052    6046             TLS
295  5053 L  3765             DCA PDONE
296  5054    4334             JMS TAPBL
297
298  5055    1046    TAPPA,   TAD RSIZE 299  5056    3016             DCA XR7
300  5057    1050             TAD DISQT
301  5060 L  4773             JMS BINBCD
302  5061    1050             TAD DISQT
303  5062 L  4764             JMS GETR
304  5063    1727             FBFFR
305  5064    1372             TAD (FBFFR-1)
306  5065    3017             DCA XR8
```

```
307
308 5066      1417 TAPPB,  TAD I XR8
309 5067      3015         DCA XR6
310 5070      1015         TAD XR6
311 5071      7012         RTR
312 5072      7012         RTR
313 5073      7012         RTR
314 5074      4312         JMS TCODE
315 5075      1015         TAD XR6
316 5076      4312         JMS TCODE
317 5077      2016         ISZ XR7
318 5100      5266         JMP TAPPB
319 5101      2050         ISZ DISQT
320 5102      2014         ISZ XR5
321 5103      5255         JMP TAPPA
322
323 5104      1363 TAPPD,  TAD (132)
324 5105      4334         JMS TAPBL
325 5106      1362         TAD (202)
326 5107 L    4761         JMS TAPNCH
327 5110      4334         JMS TAPBL
328 5111 L    5766         JMP CLEARR
329
330 5112      0000 TCODE,  0
331 5113      0360         AND (77)
332 5114      3013         DCA XR4
333 5115      1013         TAD XR4
334 5116      7450         SNA
335 5117      5332         JMP TCODEZ
336 5120      1357         TAD (-12)
337 5121      7450         SNA
338 5122      5331         JMP TCODEZ-1
339 5123      1356         TAD (12-40)
340 5124      7700         SMA CLA
341 5125      1376         TAD (100)
342 5126      1013         TAD XR4
343 5127 L    4761         JMS TAPNCH
344 5130      5712         JMP I TCODE
345 5131      7001         IAC
346
347 5132      1355 TCODEZ, TAD (200)
348 5133      5327         JMP .-4
349
350 5134      0000 TAPBL,  0
351 5135      1354         TAD (-144)
352 5136      3011         DCA XR2
353 5137 L    4761         JMS TAPNCH
354 5140      2011         ISZ XR2
355 5141      5337         JMP .-2
356 5142      5734         JMP I TAPBL
357
358                        $
    5154 (   7634
    5155 (   0200
    5156 (   7752
    5157 (   7766
    5160 (   0077
    5161 L   4321
    5162 (   0202
    5163 (   0132
    5164 L   1463
    5165 L   0561
    5166 L   1300
    5167 (   5104
    5170 L   1502
    5171 L   4333
    5172 (   1726
    5173 L   1305
    5174 L   1450
    5175 (   1272
    5176 (   0100
    5177 L   1437
```

```
 1              /HAMILL CO.
 2              /J. C. KILBANE
 3              /18 JUN 74
 4
 5                      TABSET 10,20
 6
 7      0000            FIFLD 0
 8
 9      0120            *120
10
11 0120 0000 SPEED,    0
12 0121 0000 RSPEED,   0
13 0122 0000 SCORE,    0
14 0123 0000 DX,       0;0
   0124 0000
15 0125 0000 DY,       0;0
   0126 0000
16           MOD,
17 0127 0000 XT,       0;0
   0130 0000
18 0131 0000 COUNT,    0;0
   0132 0000
19 0133 0000 SHF,      0
20 0134 0000 SHN,      0
21 0135 0000 XS,       0
22 0136 0000 YS,       0
23 0137 0000 XSL,      0
24 0140 0000 YSL,      0
25 0141 0000 FY,       0;0
   0142 0000
26 0143 0000 FX,       0;0
   0144 0000
27 0145 0000 XL,       0;0;0
   0146 0000
   0147 0000
28 0150 0000 YL,       0;0;0
   0151 0000
   0152 0000
29 0153 0000 SRX,      0;0;0
   0154 0000
   0155 0000
30 0156 0000 SRY,      0;0;0
   0157 0000
   0160 0000
31 0161 0000 SWITCH,   0
32 0162 0000 MAJOR,    0
33 0163 0000 MINOR,    0
34 0164 0000 XCARRY,   0
35 0165 0000 YCARRY,   0
36                     FORM 37      0000            XPOS=WXPOS
38      0001            YPOS=WYPOS
39      0042            DRCTN=FCCW
40      0007            RADIUS=FRAD
41
42      5200            *5200
43
44 5200 0000 A,        0              /CIRCULAR INTERPOLATION
45 5201 4407           FENT
46 5202 5000           FGET XPOS
47 5203 2011           FSUB XCNTR
48 5204 0011           UNNOR
49 5205 6144           FPUT XL-1
50 5206 5001           FGET YPOS
51 5207 2012           FSUB YCNTR
52 5210 0011           UNNOR
53 5211 6147           FPUT YL-1
54 5212 5004           FGET FXPOS
55 5213 6035           FPUT XDEST
56 5214 2011           FSUB XCNTR
```

```
 57 5215    0011         UNNOR
 58 5216    0014         FNEG
 59 5217    6142         FPUT FX-1
 60 5220    5005         FGET FYPOS
 61 5221    6036         FPUT YDEST
 62 5222    2012         FSUB YCNTR
 63 5223    0011         UNNOR
 64 5224    0014         FNEG
 65 5225    6140         FPUT FY-1
 66 5226    5007         FGET RADIUS
 67 5227    0000         FEXT
 68 5230    1030         TAD FXYSP
 69 5231    1377         TAD (STAB-1)
 70 5232    3017         DCA XR8
 71 5233    1417         TAD I XR8
 72 5234    7041         CIA
 73 5235    3121         DCA RSPEED
 74 5236    3152         DCA YL+2
 75 5237    3147         DCA XL+2
 76 5240    3161         DCA SWITCH
 77 5241    1370         TAD N9
 78 5242    1024         TAD EXP
 79 5243    7550         SPA SNA
 80 5244    5252         JMP AA
 81 5245    1371         TAD P6
 82 5246    7110         CLL RAR
 83 5247    7430         SZL
 84 5250    7001         IAC
 85 5251    7410         SKP
 86
 87 5252    7325  AA,    CLA STL RAL IAC
 88 5253    3133         DCA SHF 89
 90 5254    1133  AB,    TAD SHF
 91 5255    7001         IAC
 92 5256    3134         DCA SHN
 93
 94 5257    7240  AC,    STA
 95 5260  L 1776         TAD STAB+17
 96 5261    1121         TAD RSPEED
 97 5262    3120         DCA SPEED
 98 5263    1145         TAD XL
 99 5264    3153         DCA SRX
100 5265    1146         TAD XL+1
101 5266    3154         DCA SRX+1
102 5267    1147         TAD XL+2
103 5270    3155         DCA SRX+2
104 5271    1150         TAD YL
105 5272    3156         DCA SRY
106 5273    1151         TAD YL+1
107 5274    3157         DCA SRY+1
108 5275    1152         TAD YL+2
109 5276    3160         DCA SRY+2
110 5277    1042         TAD DRCTN
111 5300    7640         SZA CLA
112 5301    5304         JMP AD
113 5302    4762         JMS I COMPX
114 5303    7410         SKP
115
116 5304    4763  AD,    JMS I COMPY
117 5305    1133         TAD SHF
118 5306    4764         JMS I SHFTX
119 5307    1153         TAD SRX
120 5310    3127         DCA XT
121 5311    1154         TAD SRX+1
122 5312    3130         DCA XT+1
123 5313    1155         TAD SRX+2
124 5314    3131         DCA XT+2
125 5315    1134         TAD SHN
126 5316    4764         JMS I SHFTX
127 5317    1042         TAD DRCTN
128 5320    7640         SZA CLA
129 5321    4762         JMS I COMPX
```

```
130 5322    1133           TAD SHF
131 5323    4765           JMS I SHFTY
132 5324    7100           CLL
133 5325    1160           TAD SRY+2
134 5326    1155           TAD SRX+2
135 5327    3155           DCA SRX+2
136 5330    7004           RAL
137 5331    1157           TAD SRY+1
138 5332    1154           TAD SRX+1
139 5333    3154           DCA SRX+1
140 5334    7004           RAL 141 5335    1156           TAD SRY
142 5336    1153           TAD SRX
143 5337    3153           DCA SRX
144 5340    1134           TAD SHN
145 5341    4765           JMS I SHFTY
146 5342    1042           TAD DRCTN
147 5343    7650           SNA CLA
148 5344    4763           JMS I COMPY
149 5345    7100           CLL
150 5346    1160           TAD SRY+2
151 5347    1131           TAD XT+2
152 5350    3160           DCA SRY+2
153 5351    7004           RAL
154 5352    1157           TAD SRY+1
155 5353    1130           TAD XT+1
156 5354    3157           DCA SRY+1
157 5355    7004           RAL
158 5356    1156           TAD SRY
159 5357    1127           TAD XT
160 5360    3156           DCA SRY
161 5361    5766           JMP I NEXT
162
163 5362    5527 COMPX,    XCOMP
164 5363    5547 COMPY,    YCOMP
165 5364    5600 SHFTX,    XSHFT
166 5365    5606 SHFTY,    YSHFT
167 5366    5400 NEXT,     AI
168 5367    5600 EXIT,     JMP I A
169
170 5370    7767 N9,       -11
171 5371    0006 P6,       6
172                        FORM

5376 L 6336
    5377 ( 6316

1          5400          *A+200
  2
  3 5400    7100 AI,       CLL
  4 5401    1155           TAD SRX+2
  5 5402    1147           TAD XL+2
  6 5403    3147           DCA XL+2
  7 5404    7004           RAL
  8 5405    3164           DCA XCARRY
  9 5406    1164           TAD XCARRY
 10 5407    1154           TAD SRX+1
 11 5410    1146           TAD XL+1
 12 5411    3146           DCA XL+1
 13 5412    7004           RAL
 14 5413    1153           TAD SRX
 15 5414    1145           TAD XL
 16 5415    3145           DCA XL
 17 5416    7100           CLL
 18 5417    1160           TAD SRY+2
 19 5420    1152           TAD YL+2
```

```
20  5421      3152           DCA YL+2
21  5422      7004           RAL
22  5423      3165           DCA YCARRY
23  5424      1165           TAD YCARRY
24  5425      1157           TAD SRY+1
25  5426      1151           TAD YL+1
26  5427      3151           DCA YL+1
27  5430      7004           RAL
28  5431      1156           TAD SRY
29  5432      1150           TAD YL
30  5433      3150           DCA YL
31  5434      7100           CLL
32  5435      1144           TAD FX+1
33  5436      1146           TAD XL+1
34  5437      7204           CLA RAL
35  5440      1143           TAD FX
36  5441      1145           TAD XL
37  5442      7710           SPA CLA
38  5443      7001           IAC
39  5444      3137           DCA XSL
40  5445      7100           CLL
41  5446      1142           TAD FY+1
42  5447      1151           TAD YL+1
43  5450      7204           CLA RAL
44  5451      1141           TAD FY
45  5452      1150           TAD YL
46  5453      7710           SPA CLA
47  5454      7001           IAC
48  5455      3140           DCA YSL
49  5456      1137           TAD XSL
50  5457      7041           CIA
51  5460      1135           TAD XS
52  5461      7650           SNA CLA 53  5462      5313           JMP AJ
54  5463      1140           TAD YSL
55  5464      7041           CIA
56  5465      1136           TAD YS
57  5466      7650           SNA CLA
58  5467      5304           JMP AK
59
60  5470      1161  AL,      TAD SWITCH
61  5471      7640           SZA CLA
62  5472      5767           JMP I AR
63
64  5473      1137  AM,      TAD XSL
65  5474      3135           DCA XS
66  5475      1140           TAD YSL
67  5476      3136           DCA YS
68  5477 L    4777           JMS PAWS
69  5500      4770           JMS I BSTLA
70  5501      7001           IAC
71  5502      3161           DCA SWITCH
72  5503      5771           JMP I CP
73
74  5504      1141  AK,      TAD FY
75  5505      7710           SPA CLA
76  5506      7130           STL RAR
77  5507      1150           TAD YL
78  5510      7700           SMA CLA
79  5511      5273           JMP AM
80  5512      5270           JMP AL
81
82  5513      1140  AJ,      TAD YSL
83  5514      7041           CIA
84  5515      1136           TAD YS
85  5516      7650           SNA CLA
86  5517      5273           JMP AM
87  5520      1143           TAD FX
88  5521      7710           SPA CLA
89  5522      7130           STL RAR
90  5523      1145           TAD XL
91  5524      7700           SMA CLA
92  5525      5273           JMP AM
```

```
 93  5526    5270           JMP AL
 94
 95  5527    0000  XCOMP,   0
 96  5530    7100           CLL
 97  5531    1155           TAD SRX+2
 98  5532    7041           CIA
 99  5533    3155           DCA SRX+2
100  5534    1154           TAD SRX+1
101  5535    7040           CMA
102  5536    7430           SZL
103  5537    7101           CLL IAC
104  5540    3154           DCA SRX+1

105  5541    1153           TAD SRX
106  5542    7040           CMA
107  5543    7430           SZL
108  5544    7101           CLL IAC
109  5545    3153           DCA SRX
110  5546    5727           JMP I XCOMP
111
112  5547    0000  YCOMP,   0
113  5550    7100           CLL
114  5551    1160           TAD SRY+2
115  5552    7041           CIA
116  5553    3160           DCA SRY+2
117  5554    1157           TAD SRY+1
118  5555    7040           CMA
119  5556    7430           SZL
120  5557    7101           CLL IAC
121  5560    3157           DCA SRY+1
122  5561    1156           TAD SRY
123  5562    7040           CMA
124  5563    7430           SZL
125  5564    7101           CLL IAC
126  5565    3156           DCA SRY
127  5566    5747           JMP I YCOMP
128
129  5567    5367  AR,      EXIT
130  5570    6000  BSTLA,   ABSTL
131  5571    5257  CP,      AC
132
133                         FORM

5577 L  5650
  1           5600          *A+400
  2
  3  5600    0000  XSHFT,   0
  4  5601    1331           TAD M9
  5  5602    7041           CIA
  6  5603    1270           TAD XJMP
  7  5604    3205           DCA .+1
  8  5605    7402           HLT
  9
 10  5606    0000  YSHFT,   0
 11  5607    1331           TAD M9
 12  5610    7041           CIA
 13  5611    1304           TAD YJMP
 14  5612    3213           DCA .+1
 15  5613    7402           HLT
 16
 17  5614    0000  SXR,     0
 18  5615    7100           CLL
 19  5616    1153           TAD SRX
 20  5617    7510           SPA
 21  5620    7120           STL
 22  5621    7010           RAR
 23  5622    3153           DCA SRX
 24  5623    1154           TAD SRX+1
 25  5624    7010           RAR
 26  5625    3154           DCA SRX+1
 27  5626    1155           TAD SRX+2
```

```
28 5627   7010          RAR
29 5630   3155          DCA SRX+2
30 5631   5614          JMP I SXR
31
32 5632   0000 SYR,     0
33 5633   7100          CLL
34 5634   1156          TAD SRY
35 5635   7510          SPA
36 5636   7120          STL
37 5637   7010          RAR
38 5640   3156          DCA SRY
39 5641   1157          TAD SRY+1
40 5642   7010          RAR
41 5643   3157          DCA SRY+1
42 5644   1160          TAD SRY+2
43 5645   7010          RAR
44 5646   3160          DCA SRY+2
45 5647   5632          JMP I SYR
46
47 5650   0000 PAWS,    0
48 5651   1133          TAD SHF
49 5652   1320          TAD DTAB
50 5653   3254          DCA .+1
51 5654   7402          HLT 52 5655   3330          DCA CNT
53
54 5656   2330 PAWSA,   ISZ CNT
55 5657   7410          SKP
56 5660   5650          JMP I PAWS
57 5661   0400          AND I
58 5662   0400          AND I
59 5663   0400          AND I
60 5664   0400          AND I
61 5665   0400          AND I
62 5666   0400          AND I
63 5667   5256          JMP PAWSA
64
65 5670   5271 XJMP,    JMP .+1
66 5671   4214          JMS SXR
67 5672   4214          JMS SXR
68 5673   4214          JMS SXR
69 5674   4214          JMS SXR
70 5675   4214          JMS SXR
71 5676   4214          JMS SXR
72 5677   4214          JMS SXR
73 5700   4214          JMS SXR
74 5701   4214          JMS SXR
75 5702   4214          JMS SXR
76 5703   5600          JMP I XSHFT
77
78 5704   5305 YJMP,    JMP .+1
79 5705   4232          JMS SYR
80 5706   4232          JMS SYR
81 5707   4232          JMS SYR
82 5710   4232          JMS SYR
83 5711   4232          JMS SYR
84 5712   4232          JMS SYR
85 5713   4232          JMS SYR
86 5714   4232          JMS SYR
87 5715   4232          JMS SYR
88 5716   4232          JMS SYR
89 5717   5606          JMP I YSHFT
90
91 5720   1316 DTAB,    TAD .-2
92 5721   7763          -15
93 5722   7765          -13
94 5723   7767          -11
95 5724   7771          -7
96 5725   7773          -5
97 5726   7775          -3
98 5727   7777          -1
99 5730   0000 CNT,     0
100 5731  7766 M9,      -12
101
102                     FORM
```

```
 1            6000            *A+600
 2
 3  6000    0000  ABSTL,    0
 4  6001    7100            CLL
 5  6002    1164            TAD XCARRY
 6  6003    1154            TAD SRX+1
 7  6004    3154            DCA SRX+1
 8  6005    7004            RAL
 9  6006    1153            TAD SRX
10  6007    3153            DCA SRX
11  6010    7100            CLL
12  6011    1165            TAD YCARRY
13  6012    1157            TAD SRY+1
14  6013    3157            DCA SRY+1
15  6014    7004            RAL
16  6015    1156            TAD SRY
17  6016    3156            DCA SRY
18  6017    3122            DCA SCORE
19  6020    1153            TAD SRX
20  6021    7700            SMA CLA
21  6022    5236            JMP STLA
22  6023    2122            ISZ SCORE
23  6024    7100            CLL
24  6025    1154            TAD SRX+1
25  6026    7041            CIA
26  6027    3154            DCA SRX+1
27  6030    1153            TAD SRX
28  6031    7040            CMA
29  6032    7430            SZL
30  6033    7101            IAC CLL
31  6034    3153            DCA SRX
32  6035    7410            SKP
33
34  6036    4326  STLA,     JMS NOPR
35  6037    1156            TAD SRY
36  6040    7700            SMA CLA
37  6041    5256            JMP STLB
38  6042    2122            ISZ SCORE
39  6043    2122            ISZ SCORE
40  6044    7100            CLL
41  6045    1157            TAD SRY+1
42  6046    7041            CIA
43  6047    3157            DCA SRY+1
44  6050    1156            TAD SRY
45  6051    7040            CMA
46  6052    7430            SZL
47  6053    7101            CLL IAC
48  6054    3156            DCA SRY
49  6055    7410            SKP
50
51  6056    4326  STLB,     JMS NOPR
52  6057    7100            CLL 53  6060    1157            TAD SRY+1
54  6061    7041            CIA
55  6062    3126            DCA DY+1
56  6063    1156            TAD SRY
57  6064    7040            CMA
58  6065    7430            SZL
59  6066    7001            IAC
60  6067    3125            DCA DY
61  6070    7100            CLL
62  6071    1154            TAD SRX+1
63  6072    1126            TAD DY+1
64  6073    7204            CLA RAL
65  6074    1153            TAD SRX
66  6075    1125            TAD DY
67  6076    7700            SMA CLA
68  6077    5312            JMP STLC
69  6100    1156            TAD SRY
70  6101    3123            DCA DX
71  6102    1157            TAD SRY+1
```

```
72 6103   3124         DCA DX+1
73 6104   1153         TAD SRX
74 6105   3125         DCA DY
75 6106   1154         TAD SRX+1
76 6107   3126         DCA DY+1
77 6110   1335         TAD XMTAB+1
78 6111   5323         JMP STLD
79
80 6112   1153 STLC,   TAD SRX
81 6113   3123         DCA DX
82 6114   1156         TAD SRY
83 6115   3125         DCA DY
84 6116   1154         TAD SRX+1
85 6117   3124         DCA DX+1
86 6120   1157         TAD SRY+1
87 6121   3126         DCA DY+1
88 6122   1334         TAD XMTAB
89
90 6123   3162 STLD,   DCA MAJOR
91 6124 L 4777         JMS MOVE
92 6125   5600         JMP I ABSTL
93
94 6126   0000 NOPR,   0
95 6127   0400         AND I
96 6130   0400         AND I
97 6131   0400         AND I
98 6132   0400         AND I
99 6133   5726         JMP I NOPR
100
101 6134  3000 XMTAB,  3000
102 6135  0300         300
103
104                    FORM

6177 L 6200
 1         6200        *A+1000
 2
 3 6200   0000 MOVE,   0
 4 6201   1124         TAD DX+1
 5 6202   7040         CMA
 6 6203   3132         DCA COUNT+1
 7 6204   1123         TAD DX
 8 6205   7040         CMA
 9 6206   3131         DCA COUNT
10 6207   1123         TAD DX
11 6210   7110         CLL RAR
12 6211   3127         DCA MOD
13 6212   1124         TAD DX+1
14 6213   7010         RAR
15 6214   3130         DCA MOD+1
16 6215   7101         CLL IAC
17 6216   1132         TAD COUNT+1
18 6217   3124         DCA DX+1
19 6220   7004         RAL
20 6221   1131         TAD COUNT
21 6222   3123         DCA DX
22 6223   1122         TAD SCORE
23 6224   1337         TAD CTAB
24 6225   3226         DCA .+1
25 6226   7402         HLT
26 6227   1065         TAD LASTZ
27 6230   3163         DCA MINOR
28 6231   1163         TAD MINOR
29 6232   0377         AND (4400)
30 6233   3066         DCA LASTXY
31 6234   1066         TAD LASTXY
32 6235   1065         TAD LASTZ
33 6236   6362         6362
34 6237   1162         TAD MAJOR
35 6240   3162         DCA MAJOR
36
37 6241   2132 MOVC,   ISZ COUNT+1
38 6242   5246         JMP .+4
39 6243   2131         ISZ COUNT
```

```
40 6244    7410           SKP
41 6245    5600           JMP I MOVE
42 6246    7300           CLA CLL
43 6247    1130           TAD MOD+1
44 6250    1126           TAD DY+1
45 6251    3130           DCA MOD+1
46 6252    7004           RAL
47 6253    1127           TAD MOD
48 6254    1125           TAD DY
49 6255    3127           DCA MOD
50 6256    7300           CLA CLL
51 6257    1124           TAD DX+1

52 6260    1130           TAD MOD+1
53 6261    3017           DCA XR8
54 6262    7004           RAL
55 6263    1127           TAD MOD
56 6264    1123           TAD DX
57 6265    7510           SPA
58 6266    5276           JMP MOV8
59 6267    3127           DCA MOD
60 6270    1017           TAD XR8
61 6271    3130           DCA MOD+1
62 6272    7240           STA
63 6273    3344           DCA MINI
64 6274    1163           TAD MINOR
65 6275    5303           JMP MOV9
66
67 6276    3344 MOV8,    DCA MINI
68 6277    3344           DCA MINI
69 6300    3344           DCA MINI
70 6301    3344           DCA MINI
71 6302    1162           TAD MAJOR
72
73 6303    6362 MOV9,    6362
74 6304    7200           CLA
75 6305    7344           STA CLL RAL
76 6306    1344           TAD MINI
77 6307    3017           DCA XR8
78 6310    2017           ISZ XR8
79 6311    5310           JMP .-1
80 6312    2120           ISZ SPEED
81 6313    5305           JMP .-6
82 6314    1121           TAD RSPEED
83 6315    3120           DCA SPEED
84 6316    5241           JMP MOVC
85
86 6317    7400 STAB,    7400
87 6320    3700           3700
88 6321    1700           1700
89 6322    0750           750
90 6323    0410           410
91 6324    0300           300
92 6325    0210           210
93 6326    0150           150
94 6327    0125           125
95 6330    0110           110
96 6331    0100           100
97 6332    0100           100
98 6333    0100           100
99 6334    0100           100
100 6335   0100           100
101 6336   0100           100
102
103 6337   1340 CTAB,    TAD .+1

104 6340   3300           3300
105 6341   7300           7300
106 6342   3700           3700
107 6343   7700           7700
```

```
108  6344   0000 MINI,    0
109
     6377 ( 4400
110         0047          *CIRCLE
111  0047   5200          A
112                       S

1                   /HAMILL CO.
  2                   /J. C. KILBANE
  3                   /13 OCT 73
  4
  5                       TABSET 10,20
  6
  7         0000          FIELD 0
  8
  9         7400          *7400
 10
 11  7400   6002          IOF
 12  7401   3340          DCA ACCUM
 13  7402   6201          CDF 00
 14
 15  7403   1342 S,       TAD C215
 16  7404   4305          JMS CHOUT
 17  7405   3344          DCA LOCN
 18
 19  7406   3372 R,       DCA PSUM
 20  7407   6031          KSF
 21  7410   5207          JMP .-1
 22  7411   6036          KRB
 23  7412   3367          DCA TERM
 24  7413   1367          TAD TERM
 25  7414   4305          JMS CHOUT
 26  7415   1346          TAD COMPI
 27  7416   3221          DCA RA
 28  7417   1357          TAD JMPI
 29  7420   3226          DCA RB
 30
 31  7421   7402 RA,      HLT
 32  7422   7450          SNA
 33  7423   5232          JMP NBR
 34  7424   1367          TAD TERM
 35  7425   7650          SNA CLA
 36
 37  7426   5360 RB,      JMP JMPI+1
 38  7427   2226          ISZ RB
 39  7430   2221          ISZ RA
 40  7431   5221          JMP RA
 41
 42  7432   1372 NBR,     TAD PSUM
 43  7433   7104          CLL RAL
 44  7434   7104          CLL RAL
 45  7435   7104          CLL RAL
 46  7436   3372          DCA PSUM
 47  7437   1367          TAD TERM
 48  7440   0373          AND M7
 49  7441   1372          TAD PSUM
 50  7442   3343          DCA N
 51  7443   1343          TAD N
 52  7444   5206          JMP R
 53

54  7445   1372 RO,      TAD PSUM
 55  7446   0373          AND M7
 56  7447   7106          CLL RTL
 57  7450   7004          RAL
 58  7451   1376          TAD CDFI
 59  7452   3202          DCA S-1
 60  7453   5202          JMP S-1
 61
 62  7454   7126 R1,      STL RTL
 63  7455   1202          TAD S-1
```

```
64 7456    3260         DCA .+2
65 7457    1340         TAD ACCUM
66 7460    7402         HLT
67 7461    5772         JMP I PSUM
68
69 7462    1372 R2,     TAD PSUM
70 7463    5201         JMP S-2
71
72 7464    1343 R4,     TAD N
73 7465    3744         DCA I LOCN
74 7466    2344         ISZ LOCN
75 7467    1344         TAD LOCN
76 7470    4316         JMS NOUT
77 7471    1344         TAD LOCN
78 7472    3343         DCA N
79
80 7473    1743 R3,     TAD I N
81 7474    4316         JMS NOUT
82 7475    1343         TAD N
83 7476    3344         DCA LOCN
84 7477    1743         TAD I N
85 7500    3343         DCA N
86 7501    5206         JMP R
87
88 7502    1343 R5,     TAD N
89 7503    3744         DCA I LOCN
90 7504    5203         JMP S
91
92 7505    0000 CHOUT,  0
93 7506    6046         TLS
94 7507    6041         TSF
95 7510    5307         JMP .-1
96 7511    1353         TAD M215
97 7512    7640         SZA CLA
98 7513    5705         JMP I CHOUT
99 7514    1370         TAD C212
100 7515   5306         JMP CHOUT+1
101
102 7516   0000 NOUT,   0
103 7517   3345         DCA NSTR
104 7520   1341         TAD M4
105 7521   3371         DCA NCNT 106
107 7522   1345 NOUTA,  TAD NSTR
108 7523   7006         RTL
109 7524   7004         RAL
110 7525   3345         DCA NSTR
111 7526   1345         TAD NSTR
112 7527   7004         RAL
113 7530   0373         AND M7
114 7531   1375         TAD C260
115 7532   4305         JMS CHOUT
116 7533   2371         ISZ NCNT
117 7534   5322         JMP NOUTA
118 7535   1374         TAD SP
119 7536   4305         JMS CHOUT
120 7537   5716         JMP I NOUT
121
122 7540   0000 ACCUM,  0
123 7541   7774 M4,     -4
124 7542   0215 C2M5,   215
125 7543   0000 N,      0
126 7544   0000 LOCN,   0
127 7545   0000 NSTR,   0
128 7546   1347 COMPI,  TAD .+1
129 7547   7476         -302
130 7550   7466         -312
131 7551   7452         -326
132 7552   7540         -240
133 7553   7563 M215,   -215
134 7554   7522         -256
135 7555   7401         -377
136 7556   0000         0
```

```
137  7557  5360 JMPI,    JMP .+1
138  7560  5245          JMP R0
139  7561  5254          JMP R1
140  7562  5262          JMP R2
141  7563  5273          JMP R3
142  7564  5264          JMP R4
143  7565  5302          JMP R5
144  7566  5203          JMP S
145  7567  0000 TERM,    0
146  7570  0212 C212,    212
147  7571  0000 NCNT,    0
148  7572  0000 PSUM,    0
149  7573  0007 M7,      7
150  7574  0240 SP,      240
151  7575  0260 C260,    260
152  7576  6201 CDFI,    CDF 00
153                      $

1               /HAMILL CO.
2               /J. C. KILBANE
3               /22 OCT 73
4
5                       TABSET 0,0
6
7          0001         FIELD 1
8
9          0050         *50
10
11 0050   7000 A,       7000;7003;7006;7011
   0051   7003
   0052   7006
   0053   7011
12 0054   7014          7014;7017;7022;7025
   0055   7017
   0056   7022
   0057   7025
13 0060   7030          7030;7033;7036;7041
   0061   7033
   0062   7036
   0063   7041
14 0064   7044          7044;7047;7052;7055
   0065   7047
   0066   7052
   0067   7055
15 0070   7060          7060;7063;7066;7071
   0071   7063
   0072   7066
   0073   7071
16 0074   7074          7074;7077;7102;7105
   0075   7077
   0076   7102
   0077   7105
17 0100   7110          7110;7113;7116;7121
   0101   7113
   0102   7116
   0103   7121
18 0104   7124          7124;7127;7132;7135
   0105   7127
   0106   7132
   0107   7135
19 0110   7140          7140;7143;7146;7151
   0111   7143
   0112   7146
   0113   7151
20 0114   7154          7154;7157;7162;7165
   0115   7157
   0116   7162
   0117   7165
21 0120   7170          7170;7173;7176;7201
   0121   7173
   0122   7176
```

```
         0123   7201
22       0124   7204         7204;7207;7212;7215
         0125   7207
         0126   7212
         0127   7215
23       0130   7220         7220;7223;7226;7231
         0131   7223
         0132   7226
         0133   7231
24       0134   7234         7234;7237;7242;7245
         0135   7237
         0136   7242
         0137   7245
25       0140   7250         7250;7253;7256;7261
         0141   7253
         0142   7256
         0143   7261
26       0144   7264         7264;7267;7272;7275
         0145   7267
         0146   7272
         0147   7275
27
28              0042         *42
29
30       0042   7732         -46
31       0043   0050         A
32                           $
```

```
1                    /HAMILL CO.
2                    /J. C. KILBANE
3                    /22 OCT 73
4
5                           TABSET 7,14
6
7              0001         FIELD 1
8
9              0020         *20
10
11   0020      0000  EX1,    0          /OPERAND STORAGE
12   0021      0000  AC1H,   0
13   0022      0000  AC1L,   0
14   0023      0000  OVER1,  0
15   0024      0000  EXP,    0          /F.A.
16   0025      0000  HORD,   0
17   0026      0000  LORD,   0
18   0027      0000  OVER2,  0
19   0030      0000  EXP1,   0
20   0031      0000  QUOL,   0
21   0032      0000  DRCTY,  0
22   0033      0000  JUMP,   0
23   0034      0000  SAVE,   0
24   0035      0000  ADDR,   0
25   0036      0000  NORML,  0          /NE 0 IF UNNORM ADD, SUB.
26   0037      0000  DF1,    0          /DATA FIELD CURRENT LEVEL
27   0040      0000  DF0,    0          /DATA FIELD PUSHED LEVEL
28   0041      0000  PC0,    0          /PGM CNTR, PUSHED LEVEL
29   0042      0000  LIMT,   0          /NR OF DIRECTORY VBLES
30   0043      0000  DIRECT, 0          /LOCN OF DIRECTORY
31
32                           FORM
```

```
1              0007         *7
2    0007      0200         FPNT
3
4                           TABSET 2,21
5
6
7              0200         *200
```

```
 8
 9 0200   0000 FPNT,  0
10 0201   7300         CLA CLL
11 0202   6214         RDF
12 0203   1356         TAD RDFI
13 0204   3037         DCA DF1
14 0205   3023         DCA OVER1
15 0206   3027         DCA OVER2
16 0207   1600         TAD I FPNT        /GET NEXT INSTRUCTION
17 0210   2200         ISZ FPNT
18 0211   3033         DCA JUMP
19 0212   1033         TAD JUMP
20 0213   0361         AND MASK5
21 0214   7450         SNA
22 0215   5271         JMP PUSH
23 0216   0363         AND PAGENO        /GET PAGE BIT
24 0217   7650         SNA CLA           /PAGE ZERO?
25 0220   5223         JMP .+3           /YES
26 0221   1361         TAD MASK5         /NO
27 0222   0200         AND FPNT          /C(FPNT)0-4 CONTAINS PAGE BITS
28 0223   3035         DCA ADDR
29 0224   1362         TAD MASK7         /GET 7 BIT ADDRESS
30 0225   0033         AND JUMP
31 0226   1035         TAD ADDR
32 0227   3035         DCA ADDR
33 0230   1364         TAD INDRCT        /INDIRECT BIT=1?
34 0231   0033         AND JUMP
35 0232   7650         SNA CLA
36 0233   5236         JMP DVY
37 0234   1435         TAD I ADDR        /YES DEFER
38 0235   3035         DCA ADDR
39
40 0236   3032 DVY,    DCA DRCTY
41 0237   1035         TAD ADDR
42 0240   7100         CLL
43 0241   1042         TAD LIMT
44 0242   7630         SZL CLA
45 0243   5253         JMP LOOP01
46 0244   1035         TAD ADDR
47 0245   1043         TAD DIRECT
48 0246   3032         DCA DRCTY
49 0247   6211         CDF 10
50 0250   1432         TAD I DRCTY
51 0251   3035         DCA ADDR
52 0252   6201         CDF 00

53 0253   7132 LOOP01, STL RTR
54 0254   1033         TAD JUMP
55 0255   7630         SZL CLA
56 0256   5271         JMP PUSH          /OP 6 OR 7
57 0257   1035         TAD ADDR
58 0260   3034         DCA SAVE
59 0261   1435         TAD I ADDR
60 0262   3020         DCA EX1           /EXPONENT
61 0263   2034         ISZ SAVE
62 0264   1434         TAD I SAVE
63 0265   3021         DCA AC1H          /HIGH ORDER MANTISSA
64 0266   2034         ISZ SAVE
65 0267   1434         TAD I SAVE
66 0270   3022         DCA AC1L          /LOW ORDER MANTISSA
67 0271   6211 PUSH,   CDF 10
68 0272   1033         TAD JUMP
69 0273   7106         CLL RTL
70 0274   7006         RTL
71 0275   0360         AND MASK3         /GET BITS 0-2, IE OPCODE
72 0276   1365         TAD TABLE         /LOOKUP IN TABLE
73 0277   3357         DCA JUMP2
74 0300   1757         TAD I JUMP2
75 0301   3357         DCA JUMP2
76 0302   4757         JMS I JUMP2       /GO THERE
77 0303   4312 FOO,    JMS CDFP
78 0304   5201         JMP FPNT+1
```

```
 79
 80 0305   7126 FOUT,   STL RTL
 81 0306   1037         TAD DF1
 82 0307   3310         DCA .+1
 83 0310   0000         0
 84 0311   5600         JMP I FPNT
 85
 86 0312   0000 CDFP,   0
 87 0313   1037         TAD DF1
 88 0314   3315         DCA .+1
 89 0315   0000         0
 90 0316   5712         JMP I CDFP
 91
 92 0317   0000 FCMP,   0
 93 0320   4312         JMS CDFP
 94 0321   1600         TAD I FPNT
 95 0322   6211         CDF 10
 96 0323   3357         DCA JUMP2
 97 0324   3355         DCA CNDT
 98 0325   1025         TAD HORD
 99 0326   7550         SPA SNA
100 0327   5346         JMP FCMPA
101 0330   7410         SKP
102 0331   2355         ISZ CNDT
103
104 0332   2355 FCMPB,  ISZ CNDT 105 0333   2355         ISZ CNDT
106 0334   7300         CLA CLL
107 0335   1357         TAD JUMP2
108 0336   0355         AND CNDT
109 0337   7640         SZA CLA
110 0340   5343         JMP .+3
111 0341   2200         ISZ FPNT
112 0342   5717         JMP I FCMP
113
114 0343   1035 FCMPC,  TAD ADDR
115 0344   3200         DCA FPNT
116 0345   5717         JMP I FCMP
117
118 0346   2355 FCMPA,  ISZ CNDT
119 0347   7710         SPA CLA
120 0350   5331         JMP FCMPB-1
121 0351   1026         TAD LORD
122 0352   7650         SNA CLA
123 0353   5334         JMP FCMPB+2
124 0354   5333         JMP FCMPB+1
125
126                     TABSET 7,14
127
128 0355   0000 CNDT,   0                   /1 EQ 0; 2 GT 0; 4 LT 0
129 0356   6201 RDFI,   CDF 00
130 0357   0000 JUMP2,  0
131 0360   0017 MASK3,  0017
132 0361   7600 MASK5,  7600
133 0362   0177 MASK7,  0177
134 0363   0200 PAGENO, 0200
135 0364   0400 INDRCT, 0400
136 0365   0366 TABLE,  .+1
137 0366   0465         EXIT                /TABLE USED IN INTERPRETING
138 0367   0432         FLAD                /BITS 0-2 OF PSEUDO
139 0370   0460         FLSU                /INSTRUCTION
140 0371   0511         FLMY
141 0372   1105         FLDV                /IF OPCODE=0, GO TO EXIT
142 0373   0400         FLGT                /AND INTERPRET BITS 8-11
143 0374   0410         FLPT
144 0375   0317         FCMP
145                     FORM
```

```
 1                        TABSET 2,21
 2
 3
 4          0400          *FPNT+200
 5
 6  0400    0000 FLGT,    0
 7  0401    1020          TAD EX1                /FGET=5
 8  0402    3024          DCA EXP
 9  0403    1021          TAD AC1H
10  0404    3025          DCA HORD
11  0405    1022          TAD AC1L
12  0406    3026          DCA LORD
13  0407    5600          JMP I FLGT
14
15  0410    0000 FLPT,    0
16  0411    1032          TAD DRCTY
17  0412    7650          SNA CLA
18  0413    5216          JMP FLPTQ
19  0414    6201          CDF 00
20  0415    5221          JMP .+4
21
22  0416    1037 FLPTQ,   TAD DF1
23  0417    3220          DCA .+1
24  0420    0000          0
25  0421    1024          TAD EXP                /FPUT=6
26  0422    3435          DCA I ADDR
27  0423    2035          ISZ ADDR
28  0424    1025          TAD HORD
29  0425    3435          DCA I ADDR
30  0426    2035          ISZ ADDR
31  0427    1026          TAD LORD
32  0430    3435          DCA I ADDR
33  0431    5610          JMP I FLPT
34  0432    0303 FLAD,    F00
35  0433    4740          JMS I ALGN             /FLAD=1 - FIRST ALIGN EXPONENTS
36  0434    5632          JMP I FLAD
37  0435    1036          TAD NORML
38  0436    7650          SNA CLA
39  0437    4741          JMS I UNORM            /LARGER OF THE TWO IS IN F.A.
40  0440    7100          CLL
41  0441    1023          TAD OVER1              /TRIPLE PRECISION ADDITION
42  0442    1027          TAD OVER2              /SINCE BITS ARE SHIFTED
43  0443    3027          DCA OVER2              /RIGHT
44  0444    7004          RAL
45  0445    1022          TAD AC1L
46  0446    1026          TAD LORD
47  0447    3026          DCA LORD
48  0450    7004          RAL
49  0451    1021          TAD AC1H
50  0452    1025          TAD HORD
51  0453    3025          DCA HORD
52  0454    1036          TAD NORML 53  0455    7650          SNA CLA
54  0456    4746          JMS I NORM             /NORMALIZE THE RESULT
55  0457    5632          JMP I FLAD
56
57  0460    0000 FLSU,    0
58  0461    4664          JMS I OPMINS           /FSUB=2 - NEGATE THE OPERAND
59  0462    4232          JMS FLAD
60  0463    5660          JMP I FLSU
61  0464    1200 OPMINS,  MINUS2
62  0465    0000 EXIT,    0
63  0466    1033          TAD JUMP               /OPCODE=0
64  0467    0345          AND MASKT              /ARE BITS8-11=0?
65  0470    7450          SNA
66  0471    5356          JMP XFOUT              /YES=FEXT
67  0472    1310          TAD ACON6              /LOOKUP ON TABLE
68  0473    3344          DCA JUMPT
69  0474    1744          TAD I JUMPT
70  0475    3344          DCA JUMPT
71  0476    1743          TAD I FPNTP
```

```
72 0477   3041          DCA PCO
73 0500   1037          TAD DF1
74 0501   3040          DCA DF0
75 0502   4744          JMS I JUMPT      /CALL AS A SUBROUTINE
76 0503   1041          TAD PCO
77 0504   3743          DCA I FPNTP
78 0505   1040          TAD DF0
79 0506   3037          DCA DF1
80 0507   5665          JMP I EXIT
81 0510   1345 ACON6,   TABLE6-1
82
83 0511   0000 FLMY,    0
84 0512   7201          CLA IAC          /FMPY=3
85 0513   1020          TAD EX1
86 0514   1024          TAD EXP          /ADD EXPONENTS TOGETHER
87 0515   3024          DCA EXP
88 0516   4737          JMS I MULT       /MULTIPLY
89 0517   5711          JMP I FLMY
90
91 0520   0000 FRNDR,   0                /ROUND FLOATING AC
92 0521   1025          TAD HORD
93 0522   7710          SPA CLA
94 0523   1333          TAD C1000
95 0524   1332          TAD INCR
96 0525   3327          DCA .+2
97 0526   4407          JMS I 7
98 0527   1000          FADD             /OR FSUB
99 0530   0000          FEXT
100 0531  5720          JMP I FRNDR
101
102                     TABSET 7,14
103
104 0532  1334 INCR,    FADD FPH 105 0533  1000 C1000,   1000
106 0534  0000 FPH,     0
107 0535  2000          2000
108 0536  0000          0
109 0537  1021 MULT,    DMULT
110 0540  0620 ALGN,    ALIGN
111 0541  1365 UNORM,   DUNORM
112 0542  0305 FPEX,    FOUT
113 0543  0200 FPNTP,   FPNT
114 0544  0000 JUMPT,   0
115 0545  0017 MASKT,   17
116 0546  1400 NORM,    DNORM
117
118                     TABSET 2,21
119
120 0547  0000 PSUNM,   0                /SET UNNORMALIZED MODE
121 0550  7001          IAC
122 0551  3036          DCA NORML
123 0552  5747          JMP I PSUNM
124
125 0553  0000 PRNM,    0                /RESET TO NORMALIZED MODE
126 0554  3036          DCA NORML
127 0555  5753          JMP I PRNM
128
129 0556  6201 XFOUT,   CDF 00
130 0557  1026          TAD LORD
131 0560  3767          DCA I LORP
132 0561  1025          TAD HORD
133 0562  3766          DCA I HORP
134 0563  1024          TAD EXP
135 0564  3770          DCA I EXPP
136 0565  5742          JMP I FPEX
137
138 0566  0025 HORP,    HORD
139 0567  0026 LORP,    LORD
140 0570  0024 EXPP,    EXP
141                     FORM
```

```
1              0600                   *FPNT+400
2   0600       0000    ACMINS,  0                      /ROUTINE TO PERFORM
3   0601       7300             CLL CLA
4   0602       1027             TAD OVER2              /TRIPLE PRECISION NEGATION
5   0603       7041             CMA IAC                /OF FLOATING AC
6   0604       3027             DCA OVER2
7   0605       1026             TAD LORD
8   0606       7040             CMA
9   0607       7430             SZL
10  0610       7101             CLL IAC
11  0611       3026             DCA LORD
12  0612       1025             TAD HORD
13  0613       7040             CMA
14  0614       7430             SZL
15  0615       7101             CLL IAC
16  0616       3025             DCA HORD
17  0617       5600             JMP I ACMINS
18  0620       0000    ALIGN,   0                      /SUBROUTINE TO ALIGN
19  0621       1020             TAD EX1
20  0622       7041             CMA IAC
21  0623       1024             TAD EXP
22  0624       7450             SNA                    /ARE EXPONENTS EQUAL?
23  0625       5300             JMP DONE               /YES
24  0626       7500             SMA
25  0627       7041             CMA IAC
26  0630       3323             DCA AMOUNT
27  0631       1323             TAD AMOUNT
28  0632       1324             TAD TEST2
29  0633       7700             SMA CLA                /CAN EXPONENTS BE ALIGNED?
30  0634       5242             JMP .+6                /YES
31  0635       4302             JMS OUTGO              /NO
32  0636       7430             SZL
33  0637       1331             TAD TAG2
34  0640       1330             TAD TAG1
35  0641       5311             JMP NOGO
36  0642       4302             JMS OUTGO
37  0643       7420             SNL                    /SET UP ADDRESSES
38  0644       1331             TAD TAG2
39  0645       1330             TAD TAG1
40  0646       3325             DCA TEST3
41  0647       1323             TAD AMOUNT
42  0650       7041             CMA IAC
43  0651       1725             TAD I TEST3
44  0652       3725             DCA I TEST3
45  0653       2325             ISZ TEST3
46  0654       1325             TAD TEST3
47  0655       3326             DCA TEST4
48  0656       2326             ISZ TEST4
49  0657       1326             TAD TEST4
50  0660       3327             DCA TEST5
51  0661       2327             ISZ TEST5
52

54  0662       7100    SHIFT,   CLL                    /THIS ROUTINE DOES
55  0663       1725             TAD I TEST3            /THE ACTUAL SHIFTING
56  0664       7510             SPA
57  0665       7020             CML
58  0666       7010             RAR
59  0667       3725             DCA I TEST3
60  0670       1726             TAD I TEST4
61  0671       7010             RAR
62  0672       3726             DCA I TEST4
63  0673       1727             TAD I TEST5
64  0674       7010             RAR
65  0675       3727             DCA I TEST5
66  0676       2323             ISZ AMOUNT
67  0677       5262             JMP SHIFT
68  0700       2220    DONE,    ISZ ALIGN
69  0701       5620             JMP I ALIGN
70  0702       0000    OUTGO,   0                      /DETERMINE WHICH TO SHIFT
71  0703       1020             TAD EX1
```

```
72 0704    7041            CMA IAC
73 0705    1024            TAD EXP
74 0706    7004            RAL
75 0707    7200            CLA
76 0710    5702            JMP I OUTGO
77 0711    3325  NOGO,     DCA TEST3      /CAN'T BE ALIGNED
78 0712    1725            TAD I TEST3    /LARGEST GOES INTO FAC
79 0713    3024            DCA EXP
80 0714    2325            ISZ TEST3
81 0715    1725            TAD I TEST3
82 0716    3025            DCA HORD
83 0717    2325            ISZ TEST3
84 0720    1725            TAD I TEST3
85 0721    3026            DCA LORD
86 0722    5620            JMP I ALIGN
87
88                         FORM 89
90                         TABSET 7,14
91
92 0723    0000  AMOUNT,   0
93 0724    0030  TEST2,    0030
94 0725    0000  TEST3,    0
95 0726    0000  TEST4,    0
96 0727    0000  TEST5,    0
97 0730    0024  TAG1,     EXP
98 0731    7774  TAG2,     EX1-EXP
99 0732    0303  RETN2,    FOO
100
101                        TABSET 2,21
102
103 0733   1342  ERROR1,   TAD GOOF       /DIVISION BY ZERO
104 0734   3024            DCA EXP        /SET TO LARGEST + VALUE
105 0735   1342            TAD GOOF
106 0736   3025            DCA HORD
107 0737   7040            CMA
108 0740   3026            DCA LORD
109 0741   5732            JMP I RETN2
110 0742   3777  GOOF,     3777
111 0743   0000  SQUARE,   0
112 0744   4407            JMS I 0007
113 0745   6353            FPUT FPACX
114 0746   3353            FMPY FPACX
115 0747   0000            FEXT
116 0750   5743            JMP I SQUARE
117 0751   0000  EXIT6,    0              /DUMMY SUBROUTINE
118 0752   5751            JMP I EXIT6
119 0753   0000  FPACX,    0
120 0754   0000            0
121 0755   0000            0
122
123 0756   0000  UNORF,    0              /UNNORMALIZE FP ACCUM
124 0757   3200            DCA ACMINS
125 0760   1025            TAD HORD
126 0761   7710            SPA CLA
127 0762   4200            JMS ACMINS
128 0763   1376            TAD C27
129 0764   3020            DCA EX1
130 0765   3021            DCA AC1H
131 0766   3022            DCA AC1L
132 0767   4220            JMS ALIGN
133 0770   7000            NOP
134 0771   3027            DCA OVER2
135 0772   1200            TAD ACMINS
136 0773   7640            SZA CLA
137 0774   4200            JMS ACMINS
138 0775   5756            JMP I UNORF
139 0776   0027  C27,      27
140                        FORM
```

```
  1           1000            *FPNT+600
  2  1000  0000  DIV1,  0                       /SHIFT FAC RIGHT
  3  1001  7300         CLA CLL
  4  1002  1025         TAD HORD
  5  1003  7510         SPA
  6  1004  7120         CLL CML
  7  1005  7010         RAR
  8  1006  3025         DCA HORD
  9  1007  1026         TAD LORD
 10  1010  7010         RAR
 11  1011  3026         DCA LORD
 12  1012  1027         TAD OVER2
 13  1013  7010         RAR
 14  1014  3027         DCA OVER2
 15  1015  7100         CLL
 16  1016  2024         ISZ EXP
 17  1017  7000         NOP
 18  1020  5600         JMP I DIV1
 19  1021  0000  DMULT, 0                       /DOUBLE PRECISION MULTIPLY
 20  1022  7300         CLA CLL                 /SAVE PRODUCT TRIPLE PRECISION
 21  1023  1365         TAD SMACLA
 22  1024  3351         DCA SNSWIT              /CALLS A SINGLE PRECISION
 23  1025  4340         JMS SIGN                /MULTIPLY 3 TIMES
 24  1026  1022         TAD AC1L
 25  1027  3760         DCA I MP2PT
 26  1030  1026         TAD LORD
 27  1031  4757         JMS I MP4PT
 28  1032  7200         CLA
 29  1033  1761         TAD I MP5PT
 30  1034  3027         DCA OVER2
 31  1035  1025         TAD HORD
 32  1036  3760         DCA I MP2PT
 33  1037  1022         TAD AC1L
 34  1040  4757         JMS I MP4PT
 35  1041  1027         TAD OVER2
 36  1042  3027         DCA OVER2
 37  1043  7004         RAL
 38  1044  1761         TAD I MP5PT
 39  1045  3371         DCA D
 40  1046  7004         RAL
 41  1047  3372         DCA KEEP
 42
 43
 44
 45                     FORM 46  1050  1021         TAD AC1H
 47  1051  3760         DCA I MP2PT
 48  1052  1026         TAD LORD
 49  1053  4757         JMS I MP4PT
 50  1054  1027         TAD OVER2
 51  1055  3027         DCA OVER2
 52  1056  7004         RAL
 53  1057  1761         TAD I MP5PT
 54  1060  1371         TAD D
 55  1061  3371         DCA D
 56  1062  7004         RAL
 57  1063  1372         TAD KEEP
 58  1064  3372         DCA KEEP
 59  1065  1025         TAD HORD
 60  1066  3760         DCA I MP2PT
 61  1067  1021         TAD AC1H
 62  1070  4757         JMS I MP4PT
 63  1071  1371         TAD D
 64  1072  3026         DCA LORD
 65  1073  7004         RAL
 66  1074  1761         TAD I MP5PT
 67  1075  1372         TAD KEEP
 68  1076  3025         DCA HORD
 69  1077  4762         JMS I NORMF
 70  1100  3027         DCA OVER2
```

```
 71 1101  2367           ISZ SGN
 72 1102  5621           JMP I DMULT
 73 1103  4775           JMS I MINS
 74 1104  5621           JMP I DMULT
 75 1105  0000 FLDV,     0
 76 1106  1021           TAD AC1H
 77 1107  7640           SZA CLA
 78 1110  5314           JMP .+4
 79 1111  1022           TAD AC1L
 80 1112  7650           SNA CLA
 81 1113  5776           JMP I ERROR     /DIVISION BY ZERO
 82 1114  1020           TAD EX1
 83 1115  7041           CMA IAC
 84 1116  1024           TAD EXP
 85 1117  7001           IAC
 86 1120  3024           DCA EXP         /SUBTRACT EXPONENTS
 87 1121  1364           TAD SPACLA
 88 1122  3351           DCA SNSWIT
 89 1123  4340           JMS SIGN        /SET UP SIGNS
 90 1124  4763           JMS I DIVIDE    /DIVIDE
 91 1125  7630           SZL CLA
 92 1126  7001           IAC
 93 1127  3022           DCA AC1L
 94 1130  3021           DCA AC1H
 95 1131  2367           ISZ SGN         /TEST SIGN
 96 1132  5335           JMP .+3
 97 1133  5734           JMP I .+1       /ADD ROUNDING 98 1134  0437           FLAD+5
 99 1135  4775           JMS I MINS
100 1136  4773           JMS I MINS2
101 1137  5734           JMP I .-3
102
103 1140  0000 SIGN,     0               /TEST SIGN OF RESULT
104 1141  1370           TAD REST        /SET UP BY MULTIPLY AND
105 1142  3367           DCA SGN         /DIVIDE
106 1143  1025           TAD HORD
107 1144  7700           SMA CLA
108 1145  5350           JMP .+3
109 1146  4775           JMS I MINS
110 1147  2367           ISZ SGN
111 1150  1021           TAD AC1H
112 1151  7700 SNSWIT,   SMA CLA         /OR SPA CLA
113 1152  5740           JMP I SIGN
114 1153  4773           JMS I MINS2
115 1154  2367           ISZ SGN
116 1155  7000           NOP
117 1156  5740           JMP I SIGN
118
119                      TABSET 7,14
120
121 1157  1237 MP4PT,    MP4
122 1160  1271 MP2PT,    MP2
123 1161  1265 MP5PT,    MP5
124 1162  1400 NORMF,    DNORM
125 1163  1272 DIVIDE,   DUBDIV
126 1164  7710 SPACLA,   SPA CLA
127 1165  7700 SMACLA,   SMA CLA
128 1166  0303 RETURN,   FOO
129 1167  0000 SGN,      0
130 1170  7776 REST,     7776
131 1171  0000 D,        0
132 1172  0000 KEEP,     0
133 1173  1200 MINS2,    MINUS2          /-AC1H,AC1L
134 1174  1220 RAR2,     DIV2            /AC1H,AC1L/2
135 1175  0600 MINS,     ACMINS
136 1176  0733 ERRCR,    ERROR1
137                      FORM
```

```
 1                              TABSET 2,21
 2
 3              1200            *FPNT+1000
 4  1200        0000    MINUS2, 0                   /NEGATE OPERAND
 5  1201        7300            CLA CLL             /TRIPLE PRECISION
 6  1202        1023            TAD OVER1
 7  1203        7041            CMA IAC
 8  1204        3023            DCA OVER1
 9  1205        1022            TAD AC1L
10  1206        7040            CMA
11  1207        7430            SZL
12  1210        7101            CLL IAC
13  1211        3022            DCA AC1L
14  1212        1021            TAD AC1H
15  1213        7040            CMA
16  1214        7430            SZL
17  1215        7101            CLL IAC
18  1216        3021            DCA AC1H
19  1217        5600            JMP I MINUS2
20  1220        0000    DIV2,   0                   /SHIFT OPERAND RIGHT
21  1221        7300            CLA CLL             /TRIPLE PRECISION
22  1222        1021            TAD AC1H
23  1223        7510            SPA
24  1224        7120            CLL CML
25  1225        7010            RAR
26  1226        3021            DCA AC1H
27  1227        1022            TAD AC1L
28  1230        7010            RAR
29  1231        3022            DCA AC1L
30  1232        1023            TAD OVER1
31  1233        7010            RAR
32  1234        3023            DCA OVER1
33  1235        7100            CLL
34  1236        5620            JMP I DIV2
35
36
37                              FORM 38  1237        0000    MP4,    0                   /SINGLE PRECISION MULTIPLY
39  1240        3266            DCA MP1             /12 BITS BY 12 BITS
40  1241        3265            DCA MP5
41  1242        1270            TAD THIR
42  1243        3267            DCA MP3
43  1244        7100            CLL
44  1245        1266            TAD MP1
45  1246        7010            RAR
46  1247        3266            DCA MP1
47  1250        1265            TAD MP5
48  1251        7420            SNL
49  1252        5255            JMP .+3
50  1253        7100            CLL
51  1254        1271            TAD MP2
52  1255        7010            RAR
53  1256        3265            DCA MP5
54  1257        2267            ISZ MP3
55  1260        5245            JMP MP4+6
56  1261        1266            TAD MP1
57  1262        7010            RAR
58  1263        7100            CLL
59  1264        5637            JMP I MP4
60
61                              TABSET 7,14
62
63  1265        0000    MP5,    0
64  1266        0000    MP1,    0
65  1267        0000    MP3,    0
66  1270        7764    THIR,   7764
67  1271        0000    MP2,    0
68
69
70                              FORM
```

```
 71                        TABSET 2,21
 72
 73 1272  0000 DUBDIV, 0                    /DOUBLE PRECISION DIVIDE
 74 1273  7300       CLA CLL
 75 1274  3031       DCA QUOL
 76 1275  1345       TAD MIF
 77 1276  3267       DCA MP3
 78 1277  5306       JMP DVX
 79 1300  1026 DV3,  TAD LORD
 80 1301  7004       RAL
 81 1302  3026       DCA LORD
 82 1303  1025       TAD HORD
 83 1304  7004       RAL
 84 1305  3025       DCA HORD
 85 1306  1022 DVX,  TAD AC1L
 86 1307  1026       TAD LORD
 87 1310  3271       DCA MP2
 88 1311  7004       RAL
 89 1312  1025       TAD HORD
 90 1313  1021       TAD AC1H
 91 1314  7420       SNL
 92 1315  5321       JMP DV2-1
 93 1316  3025       DCA HORD
 94 1317  1271       TAD MP2
 95 1320  3026       DCA LORD
 96 1321  7200       CLA
 97 1322  1031 DV2,  TAD QUOL
 98 1323  7004       RAL
 99 1324  3031       DCA QUOL
100 1325  1027       TAD OVER2
101 1326  7004       RAL
102 1327  3027       DCA OVER2
103 1330  2267       ISZ MP3
104 1331  5300       JMP DV3
105 1332  1031       TAD QUOL
106 1333  3026       DCA LORD
107 1334  1025       TAD HORD
108 1335  7106       CLL RTL
109 1336  3265       DCA MP5
110 1337  1027       TAD OVER2
111 1340  3025       DCA    HORD
112 1341  3027       DCA OVER2
113 1342  1265       TAD MP5
114 1343  1265       TAD MP5
115 1344  5672       JMP I DUBDIV
116 1345  7751 MIF,  7751
117
118                  FORM

119                        TABSET 7,14
120
121 1346  0743 TABLE6, SQUARE    /TABLE FOR INTERPRETATION
122 1347  1464        SQROOT    /OF BITS 8-11
123 1350  0751        EXIT6     /CONTAINS ABSOLUTE ADDRESSES
124 1351  0751        EXIT6     /OF PROGRAMS CALLED AS
125 1352  0751        EXIT6     /SUBROUTINES
126 1353  1457        ABSF      /ABSOLUTE VALUE
127 1354  0751        EXIT6
128 1355  0751        EXIT6
129 1356  0756        UNORF     /FLOATING UNNORMALIZE
130 1357  0520        FRNDR     /FLOATING ROUND
131 1360  0751        EXIT6     /RESERVED FOR FNOP
132 1361  0600        ACMINS    /FNEG
133 1362  0547        PSUNM     /SET UNORMALIZED MODE
134 1363  0553        PRNM      /RESET NORMALIZED MODE
135 1364  1400        DNORM     /NORMALIZE FPAC
136
137                        TABSET 2,21
138
139 1365  0000 DUNORM, 0
140 1366  4220        JMS DIV2    /SHIFT OPERAND RIGHT
141 1367  4773        JMS I RAR1
```

```
142  1370  2020           ISZ EX1
143  1371  7000           NOP
144  1372  5765           JMP I DUNORM
145  1373  1000  RAR1,    DIV1
146
147
148
149                       FORM 1            1400         *FPNT+1200
2    1400    0000 DNORM,  0              /SUBROUTINE TO NORMALIZE
3    1401    7300         CLA CLL         /FLOATING ACCUMULATOR
4    1402    3256         DCA AMT1
5    1403    3255         DCA SIGN1
6    1404    1025         TAD HORD
7    1405    7510         SPA             /IS MANTISSA NEGATIVE
8    1406    2255         ISZ SIGN1       /YES
9    1407    7640         SZA CLA         /IS MANTISSA=0
10   1410    5217         JMP GO6         /NO
11   1411    1026         TAD LORD
12   1412    7640         SZA CLA
13   1413    5217         JMP GO6
14   1414    1027         TAD OVER2
15   1415    7650         SNA CLA
16   1416    5252         JMP EXIT2       /YES
17   1417    1255 GO6,    TAD SIGN1       /NO
18   1420    7640         SZA CLA         /NEGATIVE?
19   1421    4654         JMS I NEG       /YES
20   1422    1025 LOP,    TAD HORD        /WILL SHIFT BE TOO FAR?
21   1423    7104         RAL CLL
22   1424    7710         SPA CLA
23   1425    5241         JMP EXIT1       /YES
24   1426    1027         TAD OVER2
25   1427    7104         CLL RAL
26   1430    3027         DCA OVER2
27   1431    1026         TAD LORD        /NO SHIFT MANTISSA LEFT
28   1432    7004         RAL
29   1433    3026         DCA LORD
30   1434    1025         TAD HORD
31   1435    7004         RAL
32   1436    3025         DCA HORD
33   1437    2256         ISZ AMT1        /COUNT NO. OF TIMES SHIFTED
34   1440    5222         JMP LOP
35   1441    1256 EXIT1,  TAD AMT1        /CORRECT EXPONENT
36   1442    7041         CMA IAC
37   1443    1024         TAD EXP
38   1444    3024         DCA EXP
39   1445    3027         DCA OVER2
40   1446    1255         TAD SIGN1       /NEGATIVE?
41   1447    7640         SZA CLA
42   1450    4654         JMS I NEG       /YES
43   1451    5600         JMP I DNORM
44   1452    3024 EXIT2,  DCA EXP         /SET TO ZERO
45   1453    5600         JMP I DNORM
46
47                        TABSET 7,14
48
49   1454    0600 NEG,    ACMINS
50   1455    0000 SIGN1,  0
51   1456    0000 AMT1,   0
52

54                        TABSET 2,21
55
56   1457    0000 ABSF,   0              /FORM ABSOLUTE VALUE
57   1460    1025         TAD HORD
58   1461    7710         SPA CLA
59   1462    4654         JMS I NEG
60   1463    5657         JMP I ABSF
61
62   1464    0000 SQROOT, 0
```

```
 63 1465   1025         TAD HORD
 64 1466   7710         SPA CLA
 65 1467   4654         JMS I NEG
 66 1470   4407         FENT
 67 1471   7334         FJMP SQUEND
 68 1472   0001         ETZ
 69 1473   6356         FPUT FPACQ
 70 1474   6353         FPUT ITER1
 71 1475   0000         FEXT
 72 1476   1361         TAD M4
 73 1477   3362         DCA CNT
 74 1500   1024         TAD EXP
 75 1501   7010         RAR
 76 1502   7620         SNL CLA
 77 1503   5336         JMP EVEN
 78 1504   7240         STA
 79 1505   1024         TAD EXP
 80 1506   7100         CLL
 81 1507   7510         SPA
 82 1510   7120         STL
 83 1511   7010         RAR
 84 1512   3353         DCA ITER1
 85 1513   1353         TAD ITER1
 86 1514   3350         DCA FPHH
 87
 88 1515   4407 CMMN,   FENT
 89 1516   5350         FGET FPHH
 90 1517   1353         FADD ITER1
 91 1520   0000         FEXT
 92
 93 1521   4407 LOOP,   FENT
 94 1522   6353         FPUT ITER1
 95 1523   5356         FGET FPACQ
 96 1524   4353         FDIV ITER1
 97 1525   1353         FADD ITER1
 98 1526   0000         FEXT
 99 1527   7240         STA
100 1530   1024         TAD EXP
101 1531   3024         DCA EXP
102 1532   2362         ISZ CNT
103 1533   5321         JMP LOOP
104
105 1534   0000 SQUEND, FEXT 106 1535   5664         JMP I SQROOT
107
108 1536   1024 EVEN,   TAD EXP
109 1537   7100         CLL
110 1540   7510         SPA
111 1541   7120         STL
112 1542   7010         RAR
113 1543   3350         DCA FPHH
114 1544   7240         STA
115 1545   1350         TAD FPHH
116 1546   3353         DCA ITER1
117 1547   5315         JMP CMMN
118
119 1550   0000 FPHH,   0;2000;0
    1551   2000
    1552   0000
120 1553   0000 ITER1,  0;0;0
    1554   0000
    1555   0000
121 1556   0000 FPACQ,  0;0;0
    1557   0000
    1560   0000
122 1561   7774 M4,     -4
123 1562   0000 CNT,    0
124                     $
```

We claim:
1. In a numerically controlled machine tool system including a machine tool, said machine tool having a cutting element and a workpiece positioning table, wherein said cutting element rotates about a first axis and translates along said first axis, and wherein said workpiece positioning table has a planar top surface lying in a reference plane perpendicular to said first ($z$) axis and said table translates along a second ($x$) and a third ($y$) axis, said second and third axes lying at right angles in said plane, a control system for controlling said translating motions of said cutting element and said workpiece positioning table comprising:
   A. an operator controlled positioning control means including axes drive means for positioning the cutting element of said machine tool relative to the point of intersection of said $x$ and $y$ axes to a succession of spatial points, said points having $x$, $y$, and $z$ coordinates defined with respect to said point of intersection of said $x$ and $y$ axes and said reference plane, wherein each of said spatial points corresponds to a point at which a subsequent machining operation is to be performed,
   B. a position encoding means for generating $x$, $y$ and $z$ coordinate data signals, each being representative of the corresponding coordinate of the current position of said cutting element with respect to said intersection point and said reference plane,
   C. an operator controlled X-Y sequence entry means including a digital computer, interface and operator control/programming station, said X-Y sequence entry means being for generating and storing in the memory of said digital computer memory at least one X-Y sequence of digital data comprising a set of digital signals for an associated one of said succession of spatial points, said set of digital signals being related to:
      the $x$, $y$ coordinate data signal representative of the associated one of said succession of spatial points,
   D. an operator controlled Z sequence entry means including said digital computer, said interface and said operator control/programming station, said Z sequence entry means being for generating and storing in said memory of said digital computer at least one Z sequence of digital data comprising a set of digital signals for an associated one of said succession of spatial points, said set of digital signals being related to:
      the $z$ coordinate data signal representative of the associated one of said succession of spatial points,
   E. a sequence transformation means including said digital computer, said interface, and said operator control/programming station, said transformation means being for selectively transforming each of said stored X-Y and Z sequences of digital data into a corresponding series of encoded machine tool control signals, wherein each of said series is for directing the relative position of said cutting element toward an associated one of said spatial points, and
   F. a computer controlled positioning means responsive to said control signals and including said axes drive means, said computer controlled positioning means for successively controlling the relative position of said cutting element to be at each of said spatial points

2. The system according to claim 1 wherein said operator controlled positioning control means includes transducing means for generating a $z$ displacement signal representative of an incremental displacement of said cutting element from said reference plane along said $z$ axis, and for generating $x$ and $y$ displacement signals representative of incremental displacements of said positioning table from said point of intersection along said $x$ and $y$ axes.

3. The system according to claim 2 wherein said computer controlled positioning means comprises:
   A. a stepping motor means associated with each of said $z$, $x$ and $y$ axes, said $z$ axis motor means for translating said cutting element along said $z$ axis, said $x$ and $y$ axis motor means for translating said positioning table along said $x$ and $y$ axes, the respective ones of said motor means being selectively responsive to associated ones of said series of encoded machine tool control signals whereby the relative position of said cutting element is controlled to translate a predetermined incremental distance parallel to the associated ones of said axes in response to each of said associated control signals,
   B. an actual position indicating means associated with each of said $z$, $x$, and $y$ axes, each of said actual position indicating means being responsive to the corresponding ones of said $x$, $y$ and $z$ incremental displacement signals applied from said transducing means to generate and display a cumulative count of said incremental displacements, said cumulative count for each axis being representative of the actual relative position of said cutting element measuring from said point of intersection of said $x$ and $y$ axes and from said reference plane.

4. The system according to claim 3 wherein said computer controlled positioning means further comprises:
   a stall indicating means associated with at least one of said $z$, $x$, and $y$ axes, said stall indicating means being responsive to the control signals associated with said motor means and being further responsive to the corresponding one of said $x$, $y$, and $z$ incremental displaceent signals to generate a stall signal for each of said series of machine tool control signals when the number of said control signals in said series differs from the number of said corresponding displacement signals by a predetermined number.

5. The system according to claim 4 wherein said stall indicating means includes a display means, said display means being illuminated in response to said stall signal and non-illuminated otherwise.

6. The system according to claim 4 wherein said sequence transformation means further comprises a means responsive to said stall signal to interrupt said transformation performed by said transformation means.

7. A system according to claim 1 wherein said X-Y and Z sequence entry means further comprise:
   a sequence numbering means for automatically storing in said digital computer memory in association with each X-Y and Z sequence a unique reference number, said successively stored X-Y and Z sequences forming an ordered succession of sequences in said computer memory with said reference number being related to the order of said stored X-Y and Z sequences in said memory.

8. In the system of claim 7 wherein said means for selectively transforming said stored sequences to said series of encoded machine tool control signals further comprises:
an operator controlled current sequence selection means for selecting as a current sequence to be transformed, a sequence from said stored sequences in said computer memory.

9. In the system of claim 8 wherein said operator controlled selection means includes:
A. an operator controlled current sequence number entry means for generating and storing a digital signal representative of the reference number associated with said current sequence, and
B. a current sequence indicating means for displaying the reference number associated with said current sequence.

10. A system according to claim 7 wherein said means for selectively transforming said stored sequences to said series of encoded machine tool control signals further comprises: an automatic current sequence selection means for automatically selecting as a current sequence to be transformed, each of a succession of current sequences from said stored sequences in said computer memory.

11. A system according to claim 10 wherein said automatic current sequence selection means includes:
A. a current sequence number generating means for generating and storing digital signal representative of the reference number associated with each current sequence in said succession of sequences to be transformed, and
B. a current sequence indicating means for displaying the reference number associated with each current sequence in said succession of sequences to be transformed.

12. A system according to claim 10 wherein said means for selectively transforming said stored sequences to said series of encoded machine tool control signals comprises: a Z sequence identifying means for determining for each current sequence when said sequence is a Z sequence.

13. A system according to claim 12 wherein said Z sequence identifying means includes a display means being illuminated when said current sequence is a Z sequence, and being non-illuminated otherwise.

14. A system according to claim 12 wherein said Z sequence entry means further comprises:
an operator controlled z data entry means for generating and storing in said computer memory a further set of digital signals associated with each X–Y sequence, said further set including:
a z speed data signal representative of the speed at which said positioning table is to approach the $x$, $y$ coordinates associated with each X–Y sequence.

15. A system according to claim 12 wherein said Z sequence entry means further comprises:
an operator controlled z-step data entry means for generating and storing in said computer memory a further set of digital signals associated with each Z sequence, said further set including:
a z-step data signal representative of the number of approach movements that said cutting element is to follow in approaching the z coordinate associated with a current Z sequence.

16. A system according to claim 15 wherein said sequence transformation means further comprises:
a means for transforming said identified Z sequences to Z sequence machine tool control signals, said means including:
a peck cycle control signal generating means generating for each of said current selected Z sequences a series of machine tool control signals for controlling said computer controlled positioning means to displace said cutting element along said $z$ axis and said positioning table along said $x$ and $y$ axes in accordance with an ordered succession of zero, $z$, $x$-major, $y$-major and $xy$-minor moves,
each of said zero moves comprising no movement of said cutting element along said $z$ axis and said positioning table along said $x$ and $y$ axes,
each of said $z$ moves comprising a displacement of said cutting element a predetermined incremental distance along said $z$ axis,
each of said $x$-major moves comprising a displacement of said positioning table a predetermined distance along said $x$ axis,
each of said $y$-major moves comprising a displacement of said positioning table of a predetermined distance along said $y$ axis,
each of said $xy$-minor moves comprising a simultaneous displacement of said positioning table said predetermined incremental distance along each of said $x$ and $y$ axes,
wherein the members of said ordered succession are selected such that:
said cutting element is controlled to move from a current $z$ coordinate to the $z$ coordinate associated with the next previous Z sequence stored in said computer memory, said positioning table remaining stationary,
said positioning table is controlled to move from the $x$ and $y$ coordinates of a current spatial point to the $x$ and $y$ coordinates associated with the next previous X–Y sequence stored in said computer memory, said cutting element remaining stationary, said members being further selected such that the position of said positioning table is within one minor move of the straight line path connecting the $x$, $y$ coordinates of the spatial point associated with the next previous X–Y sequence and the current spatial point, and
said cutting element is controlled to alternately move toward the z coordinate associated with said current sequence and return to said z coordinate associated with said next previous z sequence, each of said successive approach movements being longer than the previous of said movements by a predetermined incremental distance such that said cutting element reaches the z coordinate associated with said current z sequence after a selected number of approach movements, said selected number of movements beng selected in accordance with said z-step data, said positioning table remaining stationary.

17. A system according to claim 15 wherein said sequence transformation means further comprises:
a means for transforming said identified Z sequences to Z sequence machine tool control signals, said means including:
- a peck cycle control signal generating means generating for each of said current selected Z sequences a series of machine tool control signals for controlling said computer controlled positioning means to displace said cutting element along said $z$ axis in accordance with an ordered succession of $z$ moves,
- each of said $z$ moves comprising a displacement of said cutting element a predetermined incremental distance along said $z$ axis, wherein the members of said ordered succession are selected such that:
- said cutting element is controlled to alternately move toward the $z$ coordinate associated with said current sequence and return to said $z$ coordinate associated with said next previous $z$ sequence, each of said successive approach movements being longer than the previous of said movement by a predetermined incremental distance such that said cutting element reaches the $z$ coordinate associated with said current $z$ sequence after a selected number of approach movements, said selected number of movements being selected in accordance with said $z$-step data.

18. A system according to claim 17 wherein said z sequence entry means further comprises:
- an operator controlled z data entry means for generating and storing in said computer memory a further set of digital signals associated with each X-Y sequence, said further set including:
  - a z speed data signal representative of the speed at which said positioning table is to approach the $x$, $y$ coordinates associated with each X-Y sequence.

19. A system according to claim 18 wherein said ordered succession includes zero moves, each of said zero moves comprising no movement of said cutting element along said z axis.

20. A system according to claim 19 wherein said means for transformng said identified Z sequences to Z sequence machine tool control signals further includes means for selecting the members of:
- said ordered succession such that the cutting element is translated along said z axis at a speed corresponding to said z-speed data signal when said element is advancing toward said spatial point associated with the current sequence and at a predetermined speed when moving otherwise.

21. A system according to claim 10 wherein said means for selectively transforming said stored sequences to said series of encoded machine tool control signals comprises:
- an X-Y sequence identifying means for determining for each current seqence when said sequence is an X-Y sequence.

22. A system according to claim 21 wherein said X-Y sequence identifying means includes a display means, said display means being illuminated when said current sequence is a X-Y sequence and being non-illuminated otherwise.

23. A system according to claim 21 wherein said X-Y sequence entry means further comprises:
- an operator controlled $x$, $y$ data entry means for generating and storing in said computer memory a further set of digital signals associated with each X-Y sequence, said further set including: an $x$-$y$ speed data signal representative of the speed at which said positioning table is to approach the $x$, $y$ coordinates associated with each X-Y sequence.

24. A system according to claim 21 wherein said sequence transformation means further comprises:
- a path determining means for determining for each identified current X-Y sequence the path to be followed by said cutting element from said stored data associated with said X-Y sequence, said path to be followed being relative to said point of intersection of said $x$ and $y$ axes positioning table and connecting the current $x$, $y$ coordinates of said cutting element and the $x$, $y$ coordinates associated with said current X-Y sequence.

25. A system according to claim 24 wherein said sequence transformation means further comprises:
- a means for transforming said identified X-Y sequences to X-Y sequence machine tool control signals, said means including:
  - means for generating a series of machine tool control signals for each of said selected X-Y sequences, said series for displacing said cutting element along said first axis and said positioning table along said second and third axes in accordance with an ordered succession of zero, z, $x$-major, $y$-major, and $xy$-minor moves,
  - each of said zero moves comprising no movement of said table along said second and third axes,
  - each of said z moves comprising a displacement of said cutting element a predetermined incremental distance along said first axis,
  - each of said $x$-major moves comprising a displacement of said positioning table a predetermined incremental distance along said second axis,
  - each of said $y$-major moves comprising a displacement of said positioning table a predetermined incremental distance along said third axis, and
  - each of said $xy$-minor moves comprising a simultaneous displacement of said positioning table a predetermined incremental distance along each of said second and said third axes, wherein said series generating means includes means for selecting the members of said ordered succession such that;
- said cutting element is controlled to move from a current z coordinate to a predetermined reference z coordinate, said positioning table remaining stationary,
- said positioning table is controlled to move from the $x$ and $y$ coordinates of a current spatial point to the $x$ and $y$ coordinates associated with the current sequence, said movement being such that said positioning table is at all times within one $xy$-minor move from said path to be followed determined by said path determining means, said cutting element remaining stationary, and
- said cutting element is controlled to move along said z axis from said reference z-coordinate to the z coordinate associated with the next previous Z sequence, said positioning table remaining stationary.

26. A system according to claim 24 wherein said sequence transformation means further comprises:

a means for transforming said identified X–Y sequences to X–Y sequence machine tool control signals, said means including:
means for generating a series of machine tool control signals for each of said selected X–Y sequences, said series for displacing said positioning table along said *x* and *y* axes in accordance with an ordered succession of *x*-major, *y*-major, and *xy-miner moves*,
each of said *x*-major moves comprising a displacement of said positioning table a predetermined incremental distance along said *x* axis, and
each of said *y*-major moves comprising a displacement of said positioning table a predetermined incremental distance along said *y* axis, and
each of said *xy*-minor moves comprising a simultaneous displacement of said positioning table a predetermined incremental distance along each of said second and said third axes,
wherein said series generating means includes means for selecting the members of said ordered succession such that:
said positioning table is controlled to move from the *x y* coordinates of a current spatial point to the *x* and *y* coordinates associated with the current sequence, said movement being such that said positioning table is at all times within one *xy*-minor move from said path to be followed determined by said path determining means.

27. A system according to claim 26 wherein said X–Y sequence entry means further comprises:
an operator controlled *x, y* data entry means for generating and storing in said computer memory a further set of digital signals associated with each x–Y sequence, said further set including:
a *x–y* speed data signal representative of the speed at which said positioning table is to approach the *x, y* coordinates associated with each X–Y sequence.

28. A system according to claim 27 wherein said ordered succession includes zero moves, each of said zero moves comprising no movement of said table along said *x* and *y* axes.

29. A system according to claim 28 wherein said means for transforming said identified X–Y sequences to X–Y sequence machine tool control signals further includes:
means for selecting the members of said ordered succession such that said positioning table is translated along said path to be followed at a speed corresponding to said *x–y* speed data signal stored in association with said current X–Y sequence and such that said cutting element is translated along said first axis at a predetermined speed.

30. A system according to claim 26 wherein said sequence transformation means further comprises:
an operator controlled backlash take-up data entry means for generating and storing in said digital computer memory a backlash take-up digital signal when the final approach of said cutting element to the *x, y* coordinates associated with each of said X–Y sequences is to be in accordance with a controlled direction of approach.

31. A system according to claim 30 wherein said X–Y sequence entry means further comprises:
an operator controlled approach direction data entry means for generating and storing in said digital computer memory a further set of digital signals associated with each X–Y sequence, said further set including:
a direction of approach data signal representative of the relative direction from which said cutting element approached the respective ones of said succession of spatial points during said operator controlled positioning, said direction being measured in said plane relative to said *x* and *y* axes.

32. A system according to claim 31 wherein said path determining means further comprises:
a backlash take-up sequence identifying means for determining for each identified current X–Y sequence as a backlash take-up sequence when said backlash signal is stored in said memory.

33. A system according to claim 32 wherein said backlash take-up sequence identifying means comprises:
a display means, said display means being illuminated when said current sequence is a backlash take-up sequence, and being non-illuminated otherwise.

34. A system according to claim 32 wherein said path determining means comprises:
A. a means for determining for said identified backlash take-up current sequence, an intermediate spatial point being a predetermined distance along said *x* and *y* axes from the spatial point associated with said current sequence, said intermediate point being further defined so that movement from said intermediate point to said associated point is in accordance with said direction signal stored in association with said current sequence, B. a means for determining for said identified backlash take-up sequence, said path to be followed to be along the straight line segment connecting said intermediate point and said spatial point associated with said current sequence when said current *x, y* coordinates of said cutting element lie on said line segment, and to be the combination of the straight line segment connecting the current *x, y* coordinates of said cutting element with said intermediate point and the straight line segment connecting said intermediate point and said spatial point associated with said current sequence the current *x, y* coordinates of said cutting element are otherwise.

35. The system according to claim 26 wherein said X–Y sequence entry means further comprises:
an operator controlled circular interpolation data entry means for generating and storing in said computer memory a further set of digital signals associated with each circular interpolation X–Y sequence for which the associated *x, y* coordinates are to be approached along a circular path by said cutting element, said further set being representative of:
A. circular interpolation select data for identifying said circular interpolation X–Y sequence,
B. circular direction data for identifying the direction of approach along said circular path, and
C. radius and center location data for defining said circular path.

36. A system according to claim 35 wherein said path determining means further comprises:
a circular interpolation sequence identifying means for determining for each identified current X–Y sequence when said sequence is a circular interpolation sequence.

37. A system according to claim 36 wherein said circular interpolation identifying means further comprises:
   a display means, said display means being illuminated when said current sequence is a circular interpolation sequence, and being non-illuminated otherwise.

38. A system according to claim 36 wherein said path determining means further comprises:
   a means for determining for an identified current circular interpolation X-Y sequence said path to be followed to be a circular arc,
   said path comprising a circular arc segment connecting the spatial point associated with the next previous X-Y sequence and the spatial point associated with said current sequence, said arc having a radius of curvature in accordance with said stored radius data signal, having a center located in accordance with said stored center location data and being such that movement along said arc toward the spatial point associated with the current sequence is in accordance
   with said circular direction data signal stored in association with said current sequence,
when said current $x, y$ coordinates of said cutting element are identical to the $x, y$ coordinates of the spatial point associated with said next previous X-Y sequence.

39. A system according to claim 36 wherein said path determining means comprises:
   a means for determining for an identified current circular interpolation X-Y sequence said path to be followed to be a combination of a straight line and a circular arc, said path comprising a combination of:
      A. the line segment connecting the current $x, y$ coordinates of said cutting element and an intermediate point lying on the circular arc segment connecting the spatial points associated with the next previous X-Y sequence and the current sequence, said arc having a radius of curvature in accordance with said stored radius data signal, having a center located in accordance with said stored center location data and being such that movement along said arc toward the spatial point associated with the current sequence is in accordance with said circular direction data signal stored in association with said current sequence, said intermediate point lying on the line segment extending from the center of said circular arc and passing through the current $x, y$ coordinates of said cutting element, and
      B. the arc segment of said circular arc, said arc segment connecting said intermediate point and the spatial point associated with said current sequence, when the current $x, y$ coordinates of said cutting element lie within the region bounded by a first line segment extending from the center of said circular arc and passing through the spatial point associated with said next previous sequence and a second line segment extending from the center of said circular arc and passing through the spatial point associated with said current sequence.

40. A system according to claim 36 wherein said path determining means comprises:
   a means for determining for an identified current circular interpolation X-Y sequence said path to be followed to be a combination of a straight line and a circular arc, said path comprising a combination of:
      A. the line segment connecting the current $x, y$ coordinates of said cutting element and the $x, y$ coordinates of the spatial point associated with the next previous X-Y sequence, and
      B. the circular arc segment connecting the spatial points associated with said next previous X-Y and current sequences, said arc having a radius of curvature in accordance with said stored radius signal, having a center located in accordance with said stored center location data and being such that movement along said arc toward the spatial point associated with said current sequence is in accordance with said circular direction data signal stored in association with said current sequence,
when the current $x, y$ coordinates of said cutting element lie within the region bounded by a first line segment extending from the center of said circular arc and passing through the spatial point associated with said previous X-Y sequence and bounded by a second line segment extending from the center of said circular arc and being perpendicular to the line segment connecting the spatial points associated with said previous and current sequences.

41. A system according to claim 36 wherein said path determining means comprises:
   a means for determining for an identified current circular interpolation X-Y sequence said path to be followed to be a straight line, said path comprising a line segment connecting the current $x, y$ coordinates of said cutting element and the spatial point associated with said current sequence,
when the current $x, y$ coordinates of said cutting element lie within the region bounded by a first line segment passing through the spatial point associated with said current sequence and extending from the center of a circular arc, said arc passing through the spatial point associated with said current sequence and the next previous sequence, having a radius of curvature in accordance with said stored radius data signal and having a center located in accordance with said stored center location data, and a second line segment extending from said center of said circular arc and being perpendicular to the line segment connecting the spatial points associated with said previous and current sequences.

42. A system according to claim 36 wherein said path determining means further comprises:
   a means for determining for an identified current circular interpolation X-Y sequence said path to be followed,
   said path comprising a circular arc segment connecting the spatial point associated with the next previous
   X-Y sequence and the spatial point associated with said current sequence, said arc having a radius of curvature in accordance with said stored radius data signal, having a center located in accordance with said stored center location data and being such that movement along said arc toward the spatial point associated with the current sequence is in accordance with said circular direction data signal stored in association with said current sequence,
when said curent x, y coordinates of said cutting element are within a predetermined distance from the x, y coordinates of the spatial point associated with said next previous X-Y sequence, and said path comprising a straight line segment between said current x, y coordinates of said cutting element and the x, y coordinates associated with said current sequence, when said current x, y coordinates of said cutting element are more than said predetermined distance from the x, y coordinates of the spatial point associated with said next previous X-Y sequence.

43. A system according to claim 26 wherein said path determining means comprises a means for determining from said stored data associated with said current X-Y sequence said path to be followed to be a straight line.

44. A system according to claim 26 wherein said X-Y sequence entry means further comprises:
an operator controlled tool offset data entry means for generating and storing in said computer memory a further set of digital signals associated with each X-Y sequence for which the spatial point to be approached is offset from the spatial point associated with said X-Y sequence, said further set being representative of:
A. tool offset select data for identifying said tool offset X-Y sequence,
B. offset magnitude data for defining the magnitude of the tool offset and,
C. offset direction data for defining the direction of the tool offset.

45. A system according to claim 44 wherein said path determining means further comprises:
a tool offset sequence identifying means for determining for each identified X-Y sequence when said sequence is a tool offset sequence.

46. A system according to claim 45 wherein said tool offset sequence identifying means further comprises:
a display means, said display means being illuminated when said current sequence is a tool offset sequence, and being non-illuminated otherwise.

47. The system according to claim 45 wherein said path determining means further comprises:
a tool offset path means for determining for an identified current tool offset X-Y sequence said path to be followed,
said path comprising the combination of a first line segment extending from the current x, y coordinates of said cutting element to an intermediate point and a second line segment extending from said intermediate point to a final point along a path parallel to a first reference line segment connecting the spatial points associated with the current and next previous sequences, said path being separated from said first reference line segment by an amount in accordance with said offset magnitude data and in the direction in accordance with said offset direction data, wherein said intermediate point is defined by the intersection of said second line segment and a first offset line segment parallel to a second reference line segment connecting the spatial points associated with the two previous X-Y sequences, and said final point is defined by the intersection of said second line segment and a second offset line segment parallel to a third reference line segment connecting the spatial points associated with said current and next following sequences, said first and second offset line segments being separated from the respective ones of said second and third reference line segments when the corresponding X-Y sequence has associated offset data, and said offset line segments being identical to the respective ones of said reference line segments otherwise.

48. The system according to claim 47 wherein said tool offset path means includes an error detection means for generating an error signal when said second line segment and said second offset line segment, and extensions thereof, have no point of intersection.

49. The system according to claim 48 wherein said error detection means includes a display means, said display means being illuminated in response to said error signal, and non-illuminated otherwise.

50. A system according to claim 26 wherein said means for generating said series of machine tool control signals for each of said selected X-Y sequences further comprises:
means for selecting said members of said ordered succession such that said positioning table is translated along said x and y axes to displace said cutting element along said path to be followed:
A. from said current spatial point to an intermediate spatial point, said intermediate spatial point lying on said path at a predetermined distance from said spatial point associated with said identified current X-Y sequence, at a speed corresponding to said x-y speed data signal stored in association with said current X-Y sequence, and
B. from said intermediate spatial point to said spatial point associated with said current X-Y sequence, at a controlled speed, said controlled speed being a decreasing function of time such that said speed is substantially zero when said cutting element reaches the spatial point associated with said current X-Y sequence.

51. A system according to claim 7 wherein said control system further comprises:
an operator controlled mode selection means for controlling said control system to operate in a PROGRAM-EDIT mode, said X-Y and Z sequence entry means being operative in said PROGRAM-EDIT mode, and being non-operative otherwise.

52. A system according to claim 51 wherein said X-Y and Z sequence entry means further comprise:
an operator controlled means selectively operative in said PROGRAM-EDIT mode to generate and store a current sequence at a selected intermediate position in said ordered succession of stored sequences in said computer memory, said order being otherwise unchanged.

53. A system according to claim 51 wherein said X-Y and Z sequence entry means further comprise:
an operator controlled means selectively operative in said PROGRAM-EDIT mode to modify said data signals stored in association with a selected current sequence in said ordered succession of stored sequences in said computer memory.

54. A system according to claim 51 wherein said X-Y and Z sequence entry means further comprise:
an operator controlled data CANCEL means selectively operative in said PROGRAM-EDIT mode to delete from said computer memory for a current sequence all data signals stored in association with said current sequence except said coordinate data and direction signals.

55. A system according to claim 51 wherein said control system further comprises:
an operator controlled mode selection means for controlling said control system to operate in a RUN mode, said selective sequence transforming means and said computer controlled positioning means being operative in said RUN mode and non-operative otherwise.

56. A system according to claim 55 wherein said X-Y and Z sequence entry means further comprise:
an operator controlled current sequence selection means selectively operative in said PROGRAM-EDIT mode to select as a current sequence to be programmed, a sequence from said ordered succession of stored sequences in said computer memory.

57. A system according to claim 56 wherein said X-Y and Z sequence entry means further comprise:
an operator controlled means selectively operative in said PROGRAM-EDIT mode to remove said current sequence and all following ones of said succession of stored sequences from said computer memory.

58. A system according to claim 56 wherein said sequence transformation means further comprises:
an operator controlled current sequence selection means selectively operative in said RUN mode to select as a current sequence to be transformed, a sequence from said ordered succession of stored sequences in said computer memory.

59. A system according to claim 56 wherein said X-Y and Z sequence entry means further comprise:
an operator controlled repeat sequence entry means selectively operative in said PROGRAM-EDIT mode to generate and store at least one repeat sequence in said computer memory, each of said repeat sequences being related to one of said stored succession of sequences so that:
A. the x coordinate data signals associated with each of said repeat sequences differ from the x coordinate data signals associated with the related sequence,
said difference being representative of the difference between the x coordinate of the current spatial point of said cutting element and the x coordinate of the spatial point associated with the related sequence related to the first repeat sequence, and
B. the data signals associated with each of said repeat sequences being otherwise identical to the data signals associated with the related one of said stored succession of sequences.

60. A system according to claim 56 wherein said X-Y and Z sequence entry means further comprise:
an operator controlled repeat sequence entry means selectively operative in said PROGRAM-EDIT mode to generate and store at least one repeat sequence in said computer memory, each of said repeat sequences being related to one of said stored succession of sequences so that:
A. the y coordinate data signals associated with each of said repeat sequences differ from the y coordinate data signals associated with the related sequence,
said difference being representative of the difference between the y coordinate of the current spatial point of said cutting element and the y coordinate of the spatial point associated with the related sequence related to the first repeat sequence, and
B. the data signals associated with each of said repeat sequences being otherwise identical to the data signals associated with the related one of said stored succession of sequences.

61. A system according to claim 56 wherein said X-Y and Z sequence entry means further comprise:
an operator controlled repeat sequence entry means selectively operative in said PROGRAM-EDIT mode to generate and store at least one repeat sequence in said computer memory, each of said repeat sequences being related to one of said stored succession of sequences so that:
A. the x and y coordinate data signals associated with each of said repeat sequences differ from the x and y coordinate data signals associated with the related sequence,
said difference being representative of the difference between the x and y coordinates of the current spatial point of said cutting element and the x and y coordinates of the spatial point associated with the related sequence related to the first repeat sequence, and
B. the data signals associated with each of said repeat sequences being otherwise identical to the data signals associated with the related one of said stored succession of sequences.

62. A system according to claim 56 wherein said sequence transformation means further comprises:
an automatic current sequence selection means selectively operative in said RUN mode to select as a current sequence to be transformed, each of a succession of sequences from said ordered succession of stored sequences in said computer memory.

63. A system according to claim 62 wherein said X-Y and Z sequence entry means further comprise;
an operator controlled means selectively operative in said PROGRAM-EDIT mode to generate and store in said digital computer memory a digital PASS signal associated with selected ones of said current sequences.

64. A system according to claim 63 wherein said X-Y and Z sequence entry means further comprise:
a display means, said display means being illuminated when said current sequence has a PASS signal stored in association therewith, and being non-illuminated otherwise.

65. A system according to claim 63 wherein said automatic current sequence select means including in said transformation means comprises:
A. means for identifying said stored PASS signals associated with said current sequences, and
B. means for replacing a former current sequence as the current sequence with the next sequence in said ordered succession following the positioning of said cutting element by said computer controlled positioning means to the spatial point associated with said former current sequence, said replacing means being operative when said former current sequence has a PASS signal associated therewith, and being inoperative to interrupt said selection of said succession of current sequences otherwise.

66. A system according to claim 62 wherein said X-y and Z sequence entry means further comprise:

an operator controlled means selectively operative in said PROGRAM-EDIT mode to generate and store in said digital computer memory a digital END OF PROGRAM signal associated with selected ones of said current sequences.

67. A system according to claim 66 wherein said X-Y and Z sequence entry means further comprise:

a display means, said display means being illuminated when said current sequence has an END OF PROGRAM signal stored in association therewith, and being non-illuminated otherwise.

68. A system according to claim 66 wherein said automatic current sequence select means included in said transformation means comprises:

A. an EOP identifying means for identifying said stored END OF PROGRAM signals associated with said current sequences, and B. an EOP interrupt means for interrupting said selection of said succession of current sequences following the positioning of said cutting element by said computer controlled positioning means to the spatial point associated with a current sequence, said interrupting means being operative when said current sequence has and END OF PROGRAM signal associated therewith, and being inoperative otherwise, said automatic current sequence select means being operative to continue said selection of said succession of current sequences.

69. A system according to claim 68 wherein said EOP interrupt means includes means for automatically selecting as a current sequence the first sequence in said stored succession of sequences following said interruption of said automatic sequence select means.

70. A system according to claim 62 wherein said X-Y and Z sequence entry means further comprise:

an operator controlled means selectively operative in said PROGRAM-EDIT mode to generate and store in said digital computer memory a digital SEQUENCE DELETE signal associated with selected ones of said current sequences.

71. A system according to claim 70 wherein said X-Y and Z sequence entry means further comprise:

a display means, said display means being illuminated when said current sequence has a SEQUENCE DELETE signal stored in association therewith, and being non-illuminated otherwise.

72. A system according to claim 70 wherein said automatic current sequence select means included in said transformation means comprises:

A. means for identifying said SEQUENCE DELETE signals associated with said current sequences, and B. means for altering said selection of said succession of current sequences by said automatic current sequence select means so that said sequence having a SEQUENCE DELETE signal associated therewith are not included in said succession includes sequences having no SEQUENCE DELETE signal associated therewith.

73. A system according to claim 62 wherein said sequence transformation means further comprises:

an operator controlled x-mirror function entry means selectively operative in said RUN mode to generate and store an x-mirror function signal in said computer memory.

74. A system according to claim 73 wherein said sequence transformation means further comprises:

a means operative in said RUN mode when said x-mirror function signal is stored in said memory for transforming said current sequence into a mirror series of machine tool control signals for positioning said cutting element to a spatial point related to the spatial point associated with said current sequence, said related spatial point having a x coordinate with the same magnitude and opposite sign as said associated spatial point, and said related spatial point having a y coordinate with the same magnitude and sign as said associated spatial point.

75. A system according to claim 62 wherein said sequence transformation means further comprises:

an operator controlled y-mirror function entry means selectively operative in said RUN mode to generate and store a y-mirror function signal in said computer memory.

76. A system according to claim 75 wherein said sequence transformation means further comprises:

a means operative in said RUN mode when said y-mirror function signal is stored in said memory for transforming said current sequence into a mirror series of machine tool control signals for positioning said cutting element to a spatial point related to the spatial point associated with said current sequence, said related spatial point having an x coordinate with the same magnitude and sign as said associated spatial point, and said related spatial point having a y coordinate with the same magnitude and opposite sign as said associated spatial point.

77. A system according to claim 62 wherein said sequence transformatin means further comprises:

an operator controlled xy-mirror function entry means selectively operative in said RUN mode to generate and store an xy-mirror function signal in said computer memory.

78. A system according to claim 77 wherein said sequence transformation means further comprises:

a means operative in said RUN mode when said xy-mirror function signal is stored in said memory for transforming said current sequence into a mirror series of machine tool control signals for positioning said cutting element to a spatial point related to the spatial point associated with said current sequence, said related spatial point having an x coordinate with the same magnitude and opposite sign as said associated spatial point, and said related spatial point having a y coordinate with the same magnitude and opposite sign as said associated spatial point.

79. A system according to claim 1 wherein said control system further comprises:

means to control the translating motion of the cutting element and positioning table of at least two numerically controlled machine tool systems.

80. In a numerically controlled machine tool system including a machine tool, said machine tool including a cutting element and a workpiece positioning element, a control system for controlling the relative position of said cutting element and workpiece positioning element comprising:

A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed, B. a position encoding means for generating a coordinate data signal representative of the coordinates corresponding to the current position of said cutting element with respect to said reference point, C. an operator controlled sequence entry means including a digital computer, interface means and operator control/programming station, said sequence entry means being for generating and storing in the memory of said digital computer at least one sequence of digital data comprising a set of digital signals for an associated one of said seccession of spatial points, said set of digital signals being related to:
the coordinate data signal representative of the associated one of said succession of spatial points, D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and E. a computer controlled positioning means responsive to said control signal and including said axes drive means, said computer controlled positioning means being for successively controlling the relative position of said cutting element to be at each of said spatial points.

81. A system according to claim 80 wherein said sequence entry means further comprises:
a sequence numbering means for automatically storing in said digital computer memory in association with each sequence a unique reference number, said successively stored sequences forming an ordered succession of sequences in said computer memory with said reference number being related to the order of said stored sequences in said memory.

82. A system according to claim 81 wherein said means for selectively transforming said stored sequences to said series of encoded machine tool control signals further comprises:
an automatic current sequence selection means for automatically selecting as a current sequence to be transformed, each of a succession of current sequences from said stored sequences in said computer memory.

83. A system according to claim 82 wherein said sequence transformation means further comprises:
a path determining means for determining for each identified current sequence form said stored data associated with said sequence the relative path to be followed by said cutting element said path to be followed being relative to said reference point and connecting the current coordinates of said cutting element and the coordinates associated with said current sequence.

84. A system according to claim 83 wherein said sequence transformation means further comprises:
a means for transforming said identified sequences to machine tool control signals, said means including:
means for generating a series of machine tool control signals for each of said selected sequences, said series for displacing said cutting element relative to said reference point in accordance with an ordered succession of $x$-major, $y$-major and $xy$-minor moves,
each of said $x$-major moves comprising a relative displacement of said cutting element a predetermined incremental distance along in a first predetermined direction,
each of said $y$-major moves comprising a relative displacement of said cutting element a predetermined incremental distance in a second predetermined direction, and
each of said $xy$-minor moves comprising a simultaneous relative displacement of said positioning table a predetermined incremental distance in each of said first and said second predetermined direction,
wherein said series generating means for selecting the members of said ordered succession such that:
said positioning element is controlled to move from the coordinates of a current spatial point to the coordinates associated with the current sequence, said movement being such that the relative position of said cutting element is at all times within one $xy$-minor move from said path to be followed determined by said path determining means.

85. A system according to claim 84 wherein said sequence entry means further comprises:
an operator controlled data entry means for generating and storing in said computer memory a further set of digital signals associated with each sequence, said further set including:
a speed data signal representative to the speed at which said positioning table is to approach the coordinates associated with each sequence.

86. A system according to claim 85 wherein said ordered succession includes zero moves, each of said zero moves comprising no movement of said cutting element.

87. A system according to claim 86 wherein said means for transforming said identified sequences to sequence machine tool control signals further includes:
means for selecting the members of said ordered succession such that said cutting element relative position is moved along said path to be followed at a speed corresponding to said speed data signal stored in association with said current sequence.

88. A system according to claim 84 wherein said path determining means comprises a means for determining from said stored data associated with said current sequence said path to be followed to be a straight line.

89. A system according to claim 84 wherein said sequence transformation means further comprises:
an operator controlled backlash take-up data entry means for generating and storing in said digital computer memory a backlash take-up digital signal when the final approach of said cutting element to the coordinates associated with each of said sequences is to be in accordance with a controlled direction of approach.

90. A system according to claim 89 wherein said sequence entry means further comprises:
an operator controlled approach direction data entry means for generating and storing in said digital computer memory a further set of digital signals associated with each sequence, said further set including:
a direction of approach data signal representative of the relative direction from which said cutting element approached the said ones of said succession of spatial points during the operator controlled positioning, said direction being measured relative to said reference point.

91. A system according to claim 90 wherein said path determining means further comprises:
a backlash take-up sequence identifying means for determining for each identified current sequence as a backlash take-up sequence when said backlash signal is stored in said memory.

92. A system according to claim 91 wherein said backlash take-up sequence identifying means comprises:
a display means, said display means being illuminated when said current sequence is a backlash take-up sequence, and being non-illuminated otherwise.

93. A system according to claim 91 wherein said path determing means comprises:
A. a means for determining for said identified backlash take-up current sequence, and intermediate spatial point being a predetermined distance from the spatial point associated with said current sequence, said intermediate point being further defined so that movement from said intermediate point to said associated point is in accordance with said direction signal stored in association with said current sequence,
B. a means for determining for said identified backlash take-up sequence, said path to be followed to be the combination of the straight line segment connecting the current coordinates of said cutting element with said intermediate point and the straight line segment connecting said intermediate point and said spatial point associated with said current sequence.

94. The system according to claim 84 wherein said sequence entry means further comprises:
an operator controlled circular interpolation data entry means for generating and storing in said computer memory a further set of digital signals associated with each circular interpolation sequence for which the associated coordinates are to be approached along a ciruclar path by said cutting element, said further set being representative of:
A. circular interpolation select data for identifying said circular interpolation sequence,
B. circular direction data for identifying the direction of approach along said circular path, and
C. radius and center location data for defining said circular path.

95. A system according to claim 94 wherein said path determining means further comprises:
a circular interpolation sequence identifying means for determining for each identified current sequence when said sequence in a circular interpolation sequence.

96. A system according to claim 95 wherein said circular interpolation identifying means further comprises:
a display means, said display means being illuminated when said current sequence is a circular interpolation sequence, and being non-illuminated otherwise.

97. A system according to claim 95 wherein said path determining means further comprises:
a means for determining for an identified current circular interpolation sequence said path to be followed,
said path comprising a circular arc segment connecting the spatial point associated with the next previous sequence and the spatial point associated with said current sequence, said arc having a radius of curvature in accordance with said stored radius data signal, having a center located in accordance with said stored center location data and being such that movement along said arc toward the spatial point associated with the current sequence is in accordance with said circular direction data signal stored in association with said current sequence,
when said current coordinates of said cutting element are within a predetermined distance from the coordinates of the spatial point associated with said next previous sequence, and
said path comprising a straight line segment between said current coordinates of said cutting element and the coordinates associated with said current sequence, when said current coordinates of said cutting element are more than said predetermined distance from the coordinates of the spatial point associated with said next previous sequence.

98. A system according to claim 81 wherein said control system further comprises:
an operator controlled mode selection means for controlling said control system to operate in a PROGRAM-EDIT mode, said sequence entry means being operative in said PROGRAM-EDIT mode, and being non-operative otherwise.

99. A system according to claim 98 wherein said control system further comprises:
an operator controlled mode selection means for controlling said control system to operate in a RUN mode, said selective sequence transforming means and said computer controlled positioning means being operative in said RUN mode and non-operative otherwise.

100. A system according to claim 99 wherein said sequence entry means further comprises:
an operator controlled current sequence selection means selectively operative in said PROGRAM-EDIT mode to select as a current sequence to be programmed, a sequence from said ordered succession of stored sequences in said computer memory.

101. A system according to claim 100 wherein said sequence transformation means further comprises:
an automatic current sequence selection means selectively operative in said RUN mode to select as a current sequence to be transformed, each of a succession of sequences from said ordered succession of stored sequences in said computer memory.

* * * * *